US012469109B2

(12) United States Patent
Dehkordi et al.

(10) Patent No.: US 12,469,109 B2
(45) Date of Patent: Nov. 11, 2025

(54) APPARATUS, SYSTEMS, AND METHODS FOR IMMERSIVE TELECONFERENCING AND VIDEO EXPERIENCES USING OPTICAL DISPLAYS AND COMPUTATIONAL OPTICS

(71) Applicant: Brelyon, Inc., San Mateo, CA (US)

(72) Inventors: Barmak Heshmat Dehkordi, San Mateo, CA (US); Christopher Barsi, Lee, NH (US); Albert Redo Sanchez, San Mateo, CA (US); Tarushree Gandhi, San Mateo, CA (US)

(73) Assignee: Brelyon Inc., San Mateo, CA (US)

( * ) Notice: Subject to any disclaimer, the term of this patent is extended or adjusted under 35 U.S.C. 154(b) by 185 days.

(21) Appl. No.: 18/437,178

(22) Filed: Feb. 8, 2024

(65) Prior Publication Data
US 2025/0259267 A1    Aug. 14, 2025

(51) Int. Cl.
*G02B 27/14* (2006.01)
*G02B 27/28* (2006.01)
*G06T 5/20* (2006.01)
*G06T 5/60* (2024.01)
*G06F 3/01* (2006.01)

(52) U.S. Cl.
CPC .............. *G06T 5/20* (2013.01); *G02B 27/144* (2013.01); *G02B 27/286* (2013.01); *G06T 5/60* (2024.01); *G06F 3/013* (2013.01); *G06T 2207/10024* (2013.01); *G06T 2207/10028* (2013.01); *G06T 2207/10048* (2013.01); *G06T 2207/20084* (2013.01)

(58) Field of Classification Search
CPC ............... G02B 27/144; G02B 27/286; G06T 2207/10024
USPC .......................................................... 362/359
See application file for complete search history.

(56) References Cited

U.S. PATENT DOCUMENTS

| | | |
|---|---|---|
| 10,768,442 B1 | 9/2020 | Dehkordi |
| 11,067,825 B2 | 7/2021 | Dehkordi |
| 11,196,976 B2 | 12/2021 | Dehkordi |
| 11,320,668 B2 | 5/2022 | Khorasaninejad et al. |
| 11,592,684 B2 | 2/2023 | Dehkordi |
| 11,662,591 B1 * | 5/2023 | Dehkordi ........... G02B 27/0172 359/630 |
| 11,774,762 B1 * | 10/2023 | Dehkordi ............. G02B 5/3083 359/630 |
| 12,025,798 B1 * | 7/2024 | Dehkordi ............... B60K 35/00 |
| 2012/0212499 A1 * | 8/2012 | Haddick ............ G02B 27/0093 345/589 |

\* cited by examiner

*Primary Examiner* — Toan C Ly
(74) *Attorney, Agent, or Firm* — Hsuanyeh Law Group, PC

(57) ABSTRACT

Systems and methods are described for immersive teleconferencing applications using a display system and a camera or camera system. In some embodiments, a display and optical system produces a virtual image for a viewer to view, ambient light (reflected) from the viewer entering the optical system is captured by a camera. A reflection removal module optically or computationally removes stray light from the camera image. In some embodiments, a plurality of cameras computationally produces a fused image of a viewer or viewer's environment.

33 Claims, 31 Drawing Sheets

39 Switchable black mirror with quarter waveplate (SBMQ)

40 Electro-optical reflector stack (EORS)

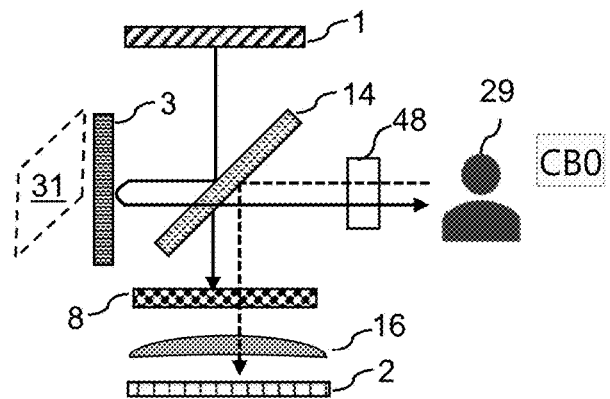
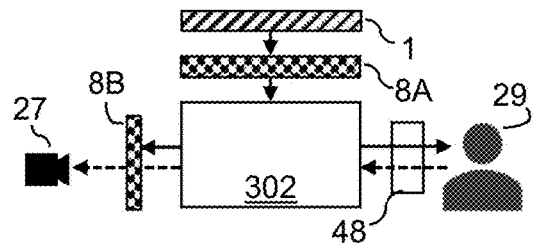
FIG. 5A  FIG. 5B
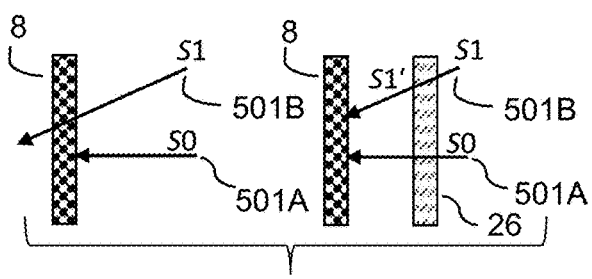
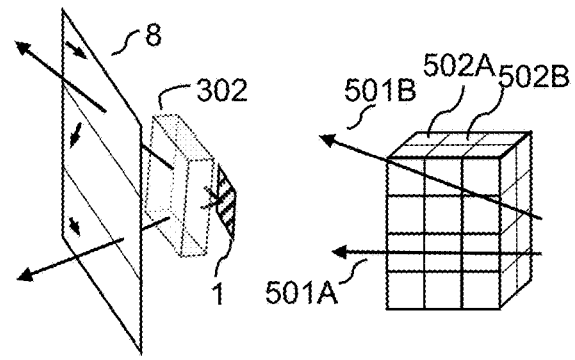
FIG. 5C  FIG. 5D  FIG. 5E
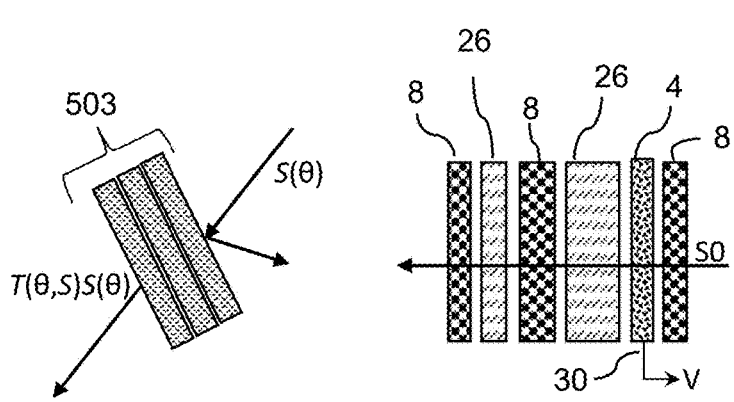
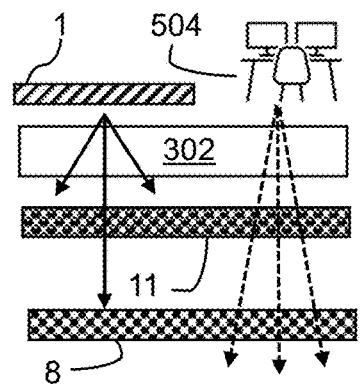
FIG. 5F  FIG. 5G  FIG. 5H

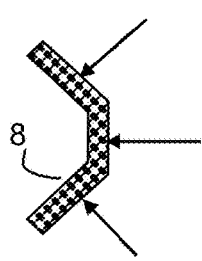
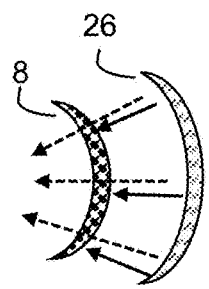
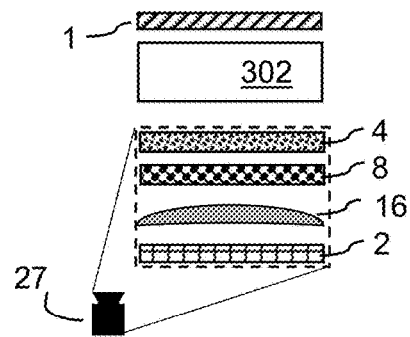
FIG. 5I      FIG. 5J      FIG. 5K
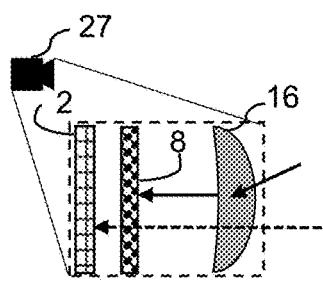
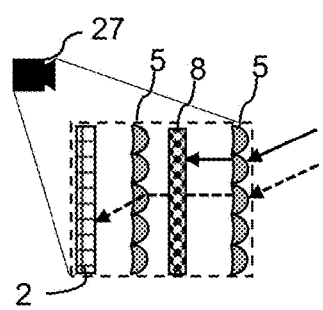
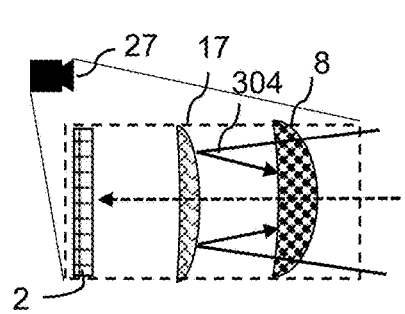
FIG. 5L      FIG. 5M      FIG. 5N
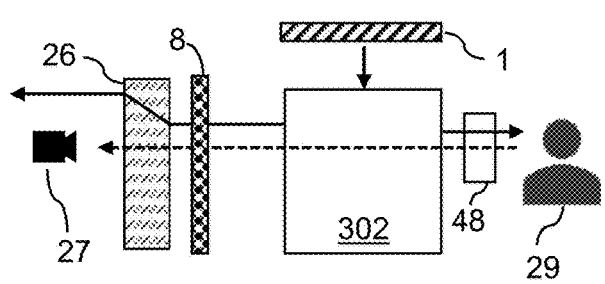
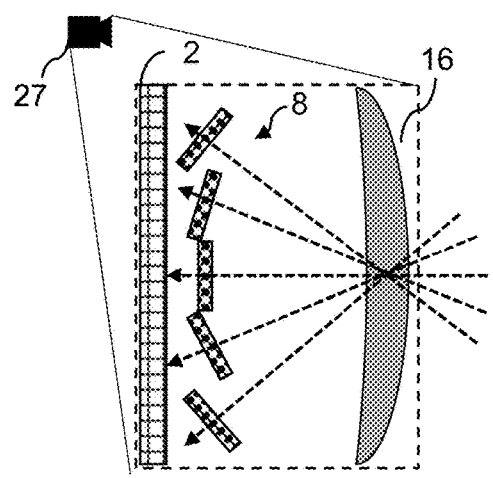
FIG. 5O      FIG. 5P

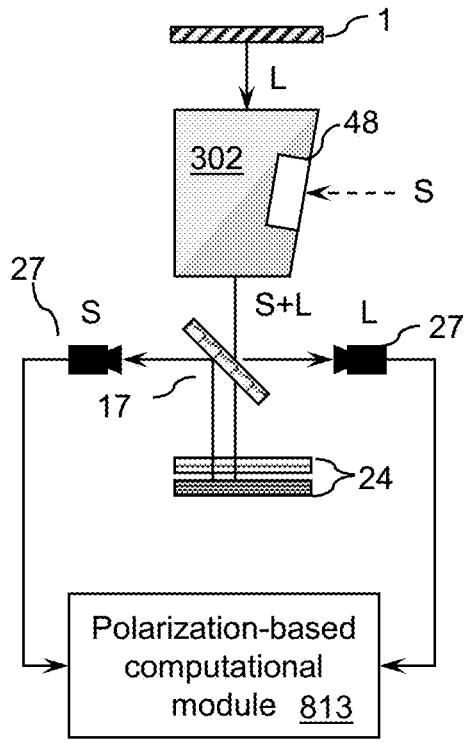
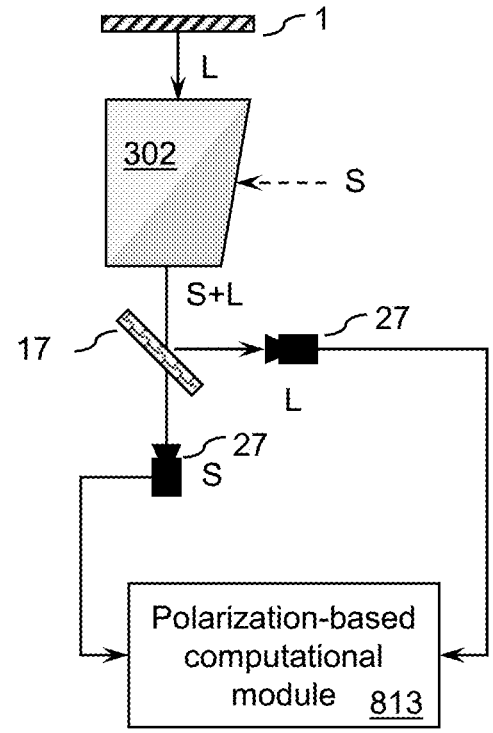
FIG. 8E
FIG. 8F
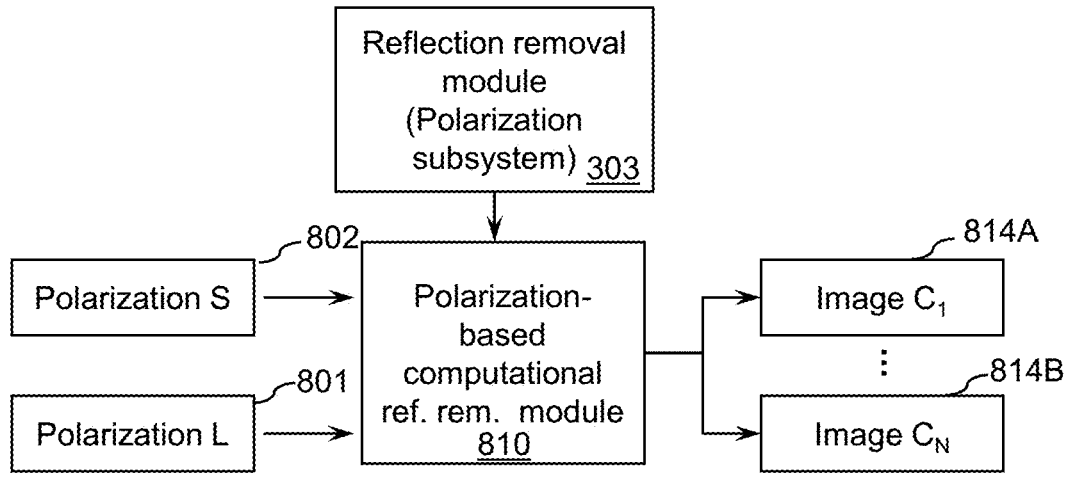
FIG. 8G

APPARATUS, SYSTEMS, AND METHODS FOR IMMERSIVE TELECONFERENCING AND VIDEO EXPERIENCES USING OPTICAL DISPLAYS AND COMPUTATIONAL OPTICS

TECHNICAL FIELD

The present invention relates generally to optical displays and optical imaging apparatuses and, more specifically, to immersive teleconferencing using virtual display systems with integrated imaging or camera systems. In some embodiments computational methods are integrated with optical architectures for immersive experiences.

BACKGROUND

With current modes of communication and content creation, there has been an increasing need for immersive displays and imaging systems. There is a desire for teleconferencing applications in which a user of the teleconferencing application sees teleconferencing partners while simultaneously making eye contact through a camera system.

Virtual display systems are designed and implemented with various specifications. For example, in U.S. Pat. Nos. 11,067,825 B2 and 10,768,442 B1, Dehkordi described a virtual display system providing monocular and binocular depth cues to achieve realistic depth perception effects. In U.S. Pat. No. 11,592,684 B2, Dehkordi disclosed an optical component called a field evolving cavity, which folds light back and forth for multiple round trips with the cavity, to make the light source appear farther from the viewer compared to the distance to the physical display system. In U.S. Pat. No. 11,196,976 B2, Dehkordi further disclosed a virtual display system directed to tessellating a light field into a size or depth that is extended beyond the pupil size of a display system. In U.S. Pat. No. 11,662,591 B1, Dehkordi et al disclosed an apparatus for modifying the monocular depth of virtual images dynamically and for producing a multifocal virtual image. In U.S. Pat. No. 11,320,668 B2, Dehkordi et al disclosed a method of modifying the optical quality or the properties of a display system using optical fusion, which combines computational methods with optical architectures to remove visual artifacts from the images produced by the display system.

SUMMARY

The present disclosure employs optical and computational methods for increased immersion in optical systems for communication and content sharing and creation. In some embodiments, the systems disclosed are used in teleconferencing, educational, training simulation, or content creation applications and simultaneously display image content to a viewer and capture images of said user with a camera system such that in the captured images, the user is making eye contact.

A main challenge in immersive teleconferencing is camera placement: a viewer looking at display content, such as conversation partners in a video call, is by necessity not looking into the camera because his eyes are not pointed toward a webcam, which is often located at the edge of the display, outside the viewing direction of the display content. Consequently, the viewer is not making eye contact with the remote participants through the camera. This result is a lack of immersion and connectedness with those conversation partners. Furthermore, the display content is often viewed directly on a screen, such as a computer or laptop monitor. The display content therefore does not provide the sensation of depth and immersion that an in-person conversation naturally has. The present invention addresses both challenges and provides immersive imagery to a viewer while simultaneously producing direct-eye-contact images of the viewer.

A physical camera may be placed over the display content, but it consequently blocks some of the display image; a static camera also does not respond to the display image content or to the viewer's input. A display may be partially transparent or have gaps, such that camera elements placed behind it captures an image of a viewer while the viewer looks at the display, but the result is lower brightness, contrast, or resolution.

The present disclosure describes a set of embodiments for enhanced immersion for applications involving camera and display systems. In some embodiments, the display imagery and the ambient light captured by the camera travel through the same optical components or optical system. In the case of a virtual display system, the respective light rays are folded within the system or travel multiple round trips between components. In some embodiments, stray light from the display content is thus susceptible to capture by the camera system. Described herein are optical components, optical architectures, and associated computational methods for eliminating stray light from the camera image while maintaining immersion. Such systems include virtual display systems, for which the virtual images are located at respective image depths.

In some embodiments, a coaxial teleconferencing system comprises a display to emit light corresponding to a display image; an optical subsystem including an aperture optic and a semi-reflector, the semi-reflector positioned to direct the light through the aperture optic; a reflection removal module to (i) transmit ambient light incident on the reflection removal module and to (ii) remove at least a portion of stray light incident on the reflection removal module, the stray light from the display and having an optical property; and an imaging sensor (i) to receive the ambient light transmitted through the reflection removal module and (ii) to generate a captured image from the received ambient light.

In some embodiments of the coaxial teleconferencing system, the light corresponding to the display image travels along an optical path within the optical subsystem and exits the aperture optic to form a virtual image viewable from within a headbox, the virtual image having a monocular depth that is different from a distance between the headbox and the display.

In some embodiments of the coaxial teleconferencing system, the optical subsystem further comprises a curved semi-reflector to lengthen the optical path of the light, and the light is incident on both the semi-reflector and the curved semi-reflector at least twice, thereby forming the virtual image.

In some embodiments of the coaxial teleconferencing system, the captured image is an eye-contact image of a viewer.

In some embodiments of the coaxial teleconferencing system, the reflection removal module comprises a polarizer, and the optical property is a polarization state of the stray light from the display.

In some embodiments of the coaxial teleconferencing system, the polarizer has a curved surface.

In some embodiments of the coaxial teleconferencing system, the reflection removal module further comprises a birefringent plate disposed on a light receiving side of the polarizer to modify the polarization state of the stray light from the display before the stray light is incident on the polarizer.

In some embodiments of the coaxial teleconferencing system, the reflection removal module comprises a wavelength-dependent filter, and the optical property is a wavelength of the stray light from the display.

In some embodiments of the coaxial teleconferencing system, the reflection removal module comprises a nonlinear material, and the optical property is an intensity of the stray light from the display.

In some embodiments, the coaxial teleconferencing system further comprises a computational module to filter out the stray light from the display after it is received by the imaging sensor based on a temporal or spatial frequency of the display image.

In some embodiments, the coaxial teleconferencing system further comprises a computational module that (i) receives the display image and computes an expected stray light on the imaging sensor and (ii) subtracts from the captured image the expected stray light.

In some embodiments, the coaxial teleconferencing system further comprises a computational module that uses a neural network to computationally remove stray light from the captured image.

In some embodiments of the coaxial teleconferencing system, the imaging sensor is part of a camera, and the reflection removal module is disposed between a lens group of the camera and the imaging sensor.

In some embodiments, the coaxial teleconferencing system is configured for teleconferencing, education, or simulation training applications, and the display image is updated to include at least a part of the captured image.

In some embodiments of the coaxial teleconferencing system, the polarizer is an absorptive polarizer, and the reflection removal module further comprises a reflective polarizer disposed after the absorptive polarizer, both the absorptive polarizer and the reflective polarizer having a curved shape and having parallel pass angles.

In some embodiments, a virtual teleconferencing system comprises a display to emit light; an optical subsystem including a semi-reflector and a reflector to direct the light along a path within the optical subsystem to produce a virtual image, the light incident on the semi-reflector at least twice; and an imaging sensor to receive ambient light, the ambient light being directed to the imaging sensor by the semi-reflector, thereby forming a captured image.

In some embodiments of the virtual teleconferencing system, the reflector has a curved shape.

In some embodiments of the virtual teleconferencing system, the semi-reflector is polarization dependent.

In some embodiments of the virtual teleconferencing system, the reflector includes a primary reflector and a secondary reflector, the secondary reflector controlled by a mechanical actuator, and the imaging sensor is disposed behind the secondary reflector.

In some embodiments, the virtual teleconferencing system further comprises a reflection removal module between the semi-reflector and the imaging sensor to remove at least a portion of stray light from the display before being captured by the imaging sensor.

In some embodiments of the virtual teleconferencing system, the reflection removal module comprises a polarizer.

In some embodiments of the virtual teleconferencing system, the reflection removal module further comprises a birefringent plate to modify a polarization state of the stray light before being incident on the polarizer.

In some embodiments of the virtual teleconferencing system, the captured image is an image of a viewer.

In some embodiments, the virtual teleconferencing system further comprises a network connection to receive a video stream, the light emitted by the display corresponding to the video stream, and the virtual teleconferencing system is for teleconferencing, education, or simulation training applications, the video stream including the captured image.

In some embodiments of the virtual teleconferencing system, a monocular depth of the virtual image is different from a distance between the viewer and the display.

In some embodiments, an immersive tele-video system comprises a display emitting light corresponding to a display image; an optical subsystem including an aperture optic and a semi-reflector, the semi-reflector positioned to direct the light through the aperture optic; a plurality of imaging sensors to capture ambient light, wherein the ambient light and stray light from the display enter the optical subsystem and are directed by the optical subsystem to the plurality of imaging sensors; and a computational reflection removal module to receive information from the plurality of imaging sensors and output a computed image of the ambient light.

In some embodiments of the immersive tele-video system, each plurality of imaging sensors comprises a polarizer and a camera, each polarizer being oriented with a different transmission axis, and the computational reflection removal module uses polarization diversity to remove stray light.

In some embodiments of the immersive tele-video system, each imaging sensor of the plurality of imaging sensors is part of a camera, and the computational reflection removal module renders a perspective image of the viewer based on a capture image from each camera.

In some embodiments, the immersive tele-video system further comprises a network connection to receive a video stream, the light emitted by the display corresponding to the video stream; and an eye tracking system to modify the display image based on an eye gaze of the viewer, wherein the immersive tele-video system is for a teleconferencing application.

In some embodiments of the immersive tele-video system, one of the plurality of imaging sensors is part of an infrared (IR) camera.

In some embodiments of the immersive tele-video system, a first imaging sensor of the plurality of imaging sensors is a depth camera and a second imaging sensor of the plurality of imaging sensors is a color camera.

In some embodiments of the immersive tele-video system, the ambient light includes information about a viewer, and the computed image is an eye-contact image of the viewer.

In some embodiments of the immersive tele-video system, the light corresponding to the display image travels along an optical path within the optical subsystem and exits the aperture optic to a viewer, thereby forming a virtual image, the virtual image having a monocular depth that is different from a distance between the viewer and the display.

DETAILED DESCRIPTION

Figure 1:
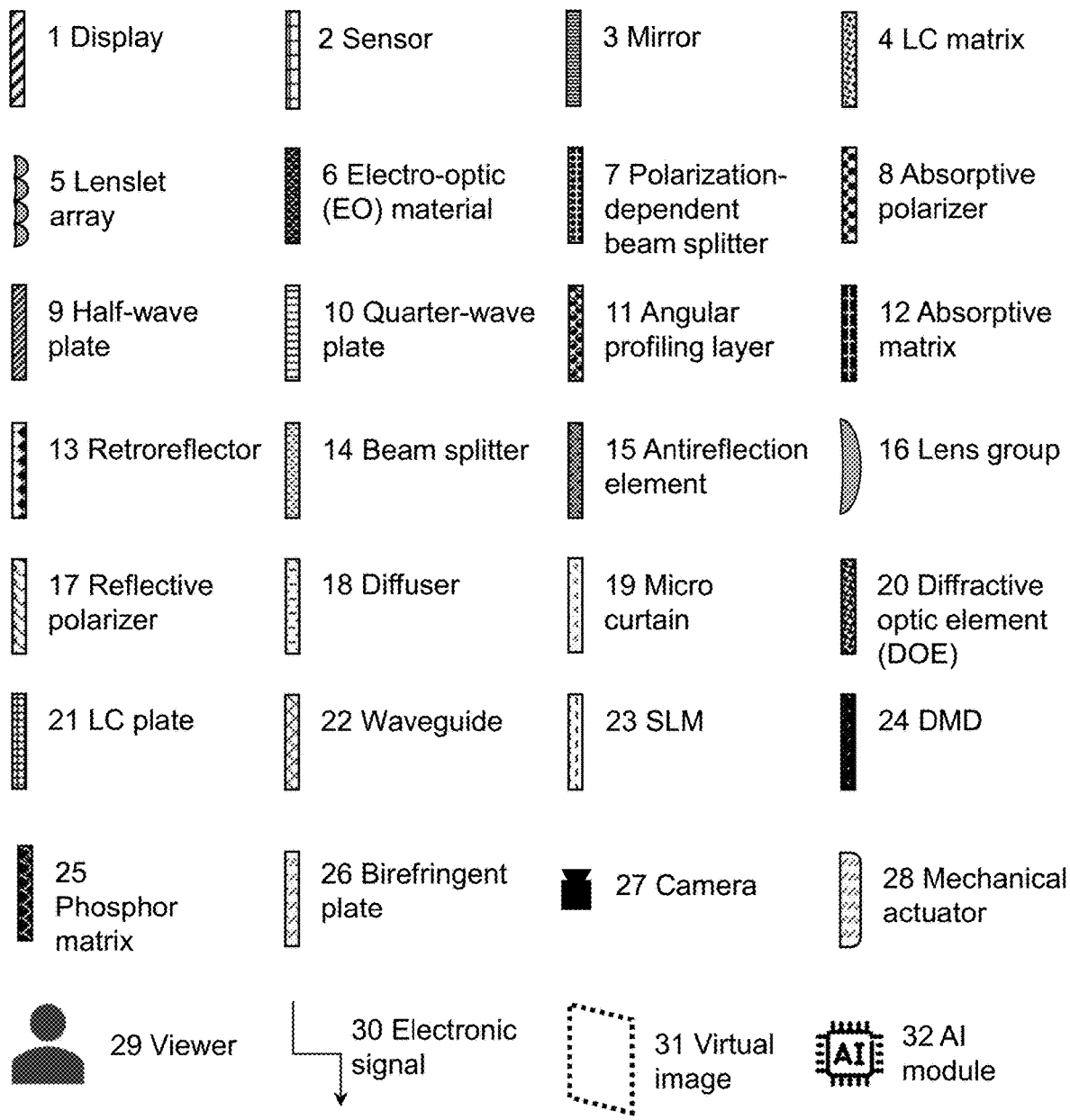
FIG. 1 illustrates a set of elements and wavefront-impacting components that compose the various embodiments and systems described in this disclosure.

This disclosure extends previous methods, which produce a single, continuous lightfield that enables simultaneous detection of monocular depth by each eye of a viewer who is positioned within the intended viewing region, where both the monocular depth can be greater than the physical distance between the display and the viewer, and where the apparent size of the display (as perceived by the viewer) is larger or smaller than the physical size of the display. As disclosed herein, display systems are integrated with camera systems to provide immersive teleconferencing experiences and use optical and computational means. The methods in this disclosure can be used in arbitrarily engineered display and imaging systems. These include, but are not limited to, large-scale lightfield display systems that do not require glasses, display systems that do require glasses, display systems that curve in front of the face and are closer to the user, lightfield displays with fractional lightfield, any type of head-mounted displays such as augmented reality (AR) displays, mixed reality (MR) displays, virtual reality (VR) displays, and monocular and multifocal displays.

Nomenclature

In this description, an "embodiment," "one embodiment," or similar words or phrases mean that the feature, function, structure, or characteristic being described is an example of the technique or invention introduced here. Such phrases in this specification do not necessarily all refer to the same embodiment. However, the embodiments referred to herein also are not necessarily mutually exclusive. All references to "user," "observer," or "viewer" pertain to either individual or individuals who would use the technique introduced here. All illustrations and drawings describe selected versions of the present invention and are not intended to limit the scope of the present invention.

The term "arbitrarily engineered" refers to being of any shape, size, material, feature, type or kind, orientation, location, quantity, components, and arrangements of single components or arrays of components that allow the present invention, or that specific component or array of components, to fulfill the invention's objectives and intents, or specific component's or components array's functionality. The term "optically coupled" refers to an element being adapted to impart, transfer, feed, or direct light to another element directly or indirectly.

In this disclosure, the "lightfield" at a plane refers to a vector field that describes the amount of light flowing in every or several selected directions through every point in that plane. The lightfield is the description of the angles and intensities of light rays traveling through or emitted from that plane. In this disclosure a "fractional lightfield" refers to a subsampled version of the lightfield such that full lightfield vector field is represented by a finite number of samples in different focal planes and/or angles. The term "concentric light field," or "curving light field," as used herein means a lightfield for which, for any two pixels of the display at a fixed radius from the viewer (called "first pixel" and "second pixel"), the chief ray of the light cone emitted from the first pixel in a direction perpendicular to the surface of the display at the first pixel intersects with the chief ray of the light cone emitted from the second pixel in a direction perpendicular to the surface of the display at the second pixel. A concentric lightfield produces an image that is focusable to the eye at all points, including pixels that are far from the optical axis of the system (the center of curvature), where the image is curved rather than flat, and the image is viewable within a specific viewing space (headbox) in front of the lightfield.

In this disclosure, "depth modulation" refers to the change, programming, or variation of monocular optical depth of the display or image. "Monocular optical depth" is the perceived distance, or apparent depth, between the observer and the apparent position of the source of light. It equals the distance to which an eye focuses to see a clear image. Thus, the monocular depth is the accommodation depth corresponding to the accommodation depth cue of the human vision system. Each eye separately experiences this depth cue, independent of the other eye.

For example, a point source of light emits light rays equally in all directions, and the tips of these light rays can be visualized as all lying on a spherical surface, called a wavefront, of expanding radius. In geometric optics, for example, free space or isotropic media, the wavefront is identical to the surface that is everywhere perpendicular to the light rays. When the point source is moved farther from an observer, emitted light rays travel a longer distance to reach the observer and therefore their tips lie on a spherical wavefront of larger radius and correspondingly smaller curvature, i.e., the wavefront is flatter. This flatter wavefront is focused by an eye differently than a less flat one. Equivalently, the light from a farther point source is focused differently than that from a closer point source. Consequently, the point source is perceived by an eye or a camera as being located at a farther distance, or deeper depth, to the eye or camera. Monocular optical depth does not require simultaneously both eyes, or stereopsis, to be perceived. An extended object can be considered as a collection of ideal point sources at varying positions and as consequently emitting a wavefront corresponding to the sum of the point-source wavefronts, so the same principles apply to, e.g., an illuminated object or emissive display panel. Evolution of a wavefront refers to changes in wavefront curvature due to optical propagation.

In this disclosure, the term "display" refers to an "emissive display," which can be based on any technology, including, but not limited to, liquid crystal displays (LCD), thin-film transistor (TFT), light emitting diode (LED), organic light emitting diode arrays (OLED), active matrix organic light emitting diode (AMOLED), plastic organic light emitting diode (POLED), micro organic light emitting diode (MOLED), or projection or angular-projection arrays on flat screens or angle-dependent diffusive screens or any other display technology and/or mirrors and/or half-mirrors and/or switchable mirrors or liquid crystal sheets arranged and assembled in such a way as to exit bundles of light with a divergence apex at different depths or one depth from the core plane or waveguide-based displays. The display may be an autostereoscopic display that provides stereoscopic depth with or without glasses. It might be curved or flat or bent or an array of smaller displays tiled together in an arbitrary configuration. The display may be a near-eye display for a headset, a near-head display, or a far-standing display.

A display system that produces a virtual image may be called a "virtual display system." A "virtual image" is an image whereby the imaging-forming light rays corresponding to a given point of the image do not physically intersect. Rather, they diverge or are collimated. When the image-forming light rays are geometrically projected backward, their projections do intersect. This intersection point is the location of the virtual image. (In contrast, the image that is formed by physically intersecting light rays is a real image that may be projected onto a screen or other physical surface without any other focusing elements.)

In some embodiments, a virtual image is viewed by a viewer. The light forming the virtual image has traveled an optical distance corresponding to the monocular depth at which a viewer perceives the image. That is, the monocular depth is the depth at which the viewers' eyes accommodate (focus to). The geometric plane in space in which the virtual image is located is called the "focal plane." In some embodiments, the monocular depth is modified by curved optical elements. In some embodiments, the focal plane is a non-flat geometric surface. A virtual image comprising a set of virtual images at different focal planes is called a "multifocal image." A virtual image whose focal plane can be adjusted dynamically, e.g., by varying an optical or electrical property of the display system, is also called a multifocal image. A virtual display system that produces multifocal images may be called a "multifocal display system." The monocular depth may be modified by elements with optical power, such as lenses or curved reflectors.

In some embodiments, a virtual image includes synthetic imagery resulting from combining different features or points of view of physical objects with data relevant to the context of the application in which the virtual image will be viewed by a viewer or an imaging system. A virtual image may be produced via a combination of hardware and software systems.

In some embodiments, a monocular depth is larger than the distance between the viewer and the light source. For example, the ratio between the monocular depth and the distance may be 1.1, 1.5, 2, 2.5, 3, 4.5, or 5. In some embodiments, the ratio may lie within a range, such as 1.1-2, 1.5-3, or 2-5. In some embodiments, a monocular depth is dynamically adjustable by modifying a property of the virtual display system.

In some embodiments, the virtual image is visible by both eyes of a viewer anywhere within a continuous region called the headbox. The region spans a lateral dimension at least, e.g., 8 cm, 10 cm, 15 cm, 20 cm, 30 cm, or 50 cm. A virtual image point being visible by both eyes means that light from that point enters both eyes simultaneously.

In some embodiments, the display system produces a real image in the space outside the display system. (A real image forms where the light rays physically intersect, such that a film placed at that location will record a (collection of) bright spot(s), corresponding to an image.) The light rays diverge beyond that intersection point, such that a viewer sees a virtual image. The focal plane of this virtual image will be the plane of the real image, so the virtual image will appear to the viewer as a floating, or hovering, image in front of the display panel. Such an image is called a "hovering real image."

An "addressable matrix" or "pixel matrix" is transmissive element divided into pixels that can be individually controlled as being "ON," to transmit light, or "OFF," to prevent light from passing, such that a light source passing through can modulated to create an image. The examples of displays above include such matrix elements. In some embodiments, a display comprises a broad light source and an addressable matrix.

Throughout this disclosure, an "imaging sensor" captures light or a property of it when exposed to the light. Examples of such arbitrary image sensing technologies include complementary-symmetry metal-oxide-semiconductor (CMOS), single photon avalanche diode (SPAD) array, charge-coupled device (CCD), intensified charge-coupled device (ICCD), ultrafast streak sensor, time-of-flight sensor (ToF), Schottky diodes, or any other light or electromagnetic sensing mechanism for shorter or longer wavelengths. An "imaging system" refers to any apparatus that acquires an image, which is a matrix of information about light intensity, phase, temporal character, spectral character, polarization, entanglement, or other properties used in any application or framework. Imaging systems include cellphone cameras, industrial cameras, photography or videography cameras, microscopes, telescopes, spectrometers, time-of-flight cameras, ultrafast cameras, thermal cameras, or any other type of imaging system. Imaging systems usually have an imaging sensor and a lens or lens group.

As used herein, the "aperture of a display system" is the surface where light exits a display system toward the exit pupil of the display system and to the outside world. The aperture is a physical surface, whereas the exit pupil is an imaginary surface that may or may not coincide with the aperture. The "aperture of an imaging system" is the area or surface where the light enters an imaging system after the entrance pupil of the imaging system travels toward a sensor. The entrance pupil is an imaginary surface or plane where the light first enters the imaging system.

"Aperture," "an aperture optic," or "aperture optics" correspond interchangeably to a set of optical elements located at an aperture surface. In some embodiments, the set contains only one element, such as a transparent window. Aperture optics protect the inside of an optical system from external contaminants and prevent unwanted light from entering the system. "Stray light" is unwanted light that interacts with a display or imaging system and travels along a substantially similar path as a desired image into a viewer or sensor. For example, stray light includes unwanted ambient light that enters a system and becomes visible to an observer or sensor, degrading image quality. Aperture optics prevents or mitigates stray light or its effects. In some embodiments, aperture optics includes a wave plate and a polarizer. In some embodiments, it includes an anti-reflection coating. In some embodiments, it includes an absorptive polarizer. In the context of stray-light mitigation, an aperture of a display system may also be called an "ambient light suppressor." Though these are just examples, and any suitable configuration of elements may be used as an aperture optic.

As used herein, the term "chief ray" refers to the center axis of the light cone that comes from a pixel or a point in space through the center of the aperture. The "optic axis" or "optical axis" of a display (imaging) system is an imaginary line between the light source and the viewer (sensor) that is perpendicular to the surface of the aperture or image plane. It corresponds to the path of least geometric deviation of a light ray.

As used herein, the terms "field evolving cavity" or "FEC" refer to a non-resonant (e.g., unstable) cavity that allows light to travel back and forth between its components to evolve the shape of the wavefront associated with the light in a physical space. One example of an FEC comprises two or more half-mirrors or semi-transparent mirrors facing each other and separated by a distance. As described herein, an FEC may be parallel to a display panel (in the case of display systems) or an entrance pupil plane (in the case of imaging systems). An FEC may be used for changing the apparent depth of a display or of a section of the display. In an FEC, the light bounces back and forth, or circulates, between components of the cavity. Each of these propagations is counted as a pass. For example, suppose there are two semi-reflective components for the FEC, one at the light source side and another one at the exit side. The first instance of light propagating from the first component to the second component is called a forward pass. When the light, or part of light, is reflected from the second component back to the first component, that propagation is called a backward pass, as the light is propagating backward toward the light source. In an FEC, a round trip occurs when the light completes one cycle and comes back to the first component. FECs can have infinitely many different architectures, but the principle is always the same. An FEC is an optical architecture that creates multiple paths for the light to travel, either by forcing the light to go through a higher number of round trips or by forcing the light from different sections of the same display to travel different distances before the light exits the cavity. If the light exits the cavity perpendicular to the angle it has entered the cavity, the FEC is referred to as an off-axis FEC or a "FEC with perpendicular emission." The term "round trips" denotes the number of times that light circulates or bounces back and forth between two components, elements, or layers of an FEC.

In the disclosed embodiments, light is profiled in different ways to enable the invention. "Angular profiling" is the engineering of light rays to travel in specified directions. Angular profiling may be achieved by holographic optical elements (HOEs), diffractive optical elements (DOEs), lenses, concave or convex mirrors, lens arrays, microlens arrays, aperture arrays, optical phase masks or amplitude masks, digital mirror devices (DMDs), spatial light modulators (SLMs), metasurfaces, diffraction gratings, interferometric films, privacy films, or other methods. "Intensity profiling" is the engineering of light rays to have specified values of brightness. It may be achieved by absorptive or reflective polarizers, absorptive coatings, gradient coatings, or other methods. The color or "wavelength profiling" is the engineering of light rays to have specified colors, or wavelengths. It may be achieved by color filters, absorptive notch filters, interference thin films, or other methods. "Polarization profiling" is the engineering of light rays to have specified polarizations. It might be achieved by metasurfaces with metallic or dielectric materials, micro- or nano-structures, wire grids or other reflective polarizers, absorptive polarizers, quarter-wave plates, half-wave plates, 1/x waveplates, or other nonlinear crystals with an anisotropy, or spatially profiled waveplates. Components can be arbitrarily engineered to deliver the desired profile.

As used herein, "arbitrary optical parameter variation" refers to variations, changes, modulations, programing, and/or control of parameters, which can be one or a collection of the following variations: optical zoom change, aperture size or brightness variation, focus variation, aberration variation, focal length variation, time-of-flight or phase variation (in the case of an imaging system with a time-sensitive or phase-sensitive imaging sensor), color or spectral variation (in the case of a spectrum-sensitive sensor), angular variation of the captured image, variation in depth of field, variation of depth of focus, variation of coma, or variation of stereopsis baseline (in stereoscopic acquisition).

The terms "active design," "active components," or, generally, "active" refer to a design or a component with optical properties that can be varied with an optical, electrical, magnetic, or acoustic signal. In some embodiments, the active component is an electro-optical component. "Passive designs" or "passive components" refer to designs that have no active component other than a display.

The "polarization state" of a light ray or light wave corresponds to its character of polarization. It may be quantified by a Jones vector, a Stokes vector, a position on the Poincaré sphere, and the like. Included in the polarization state is the degree of polarization, which quantifies how strongly or randomly the light is polarized. Each ray of a lightfield may have a different polarization. In some embodiments, the polarization state of a light ray is quantified by its polarization relative to the surface of a component.

Throughout this disclosure the "pass angle" of a polarizer is the angle at which normally incident light passes through the polarizer with maximum intensity. Two polarizers that are "cross polarized," are such that their pass angles are orthogonal. In some embodiments, the term describes orthogonal polarization of some light relative to other light or to a polarizer's pass angle.

Throughout this disclosure, the term "GRIN material," or "GRIN slab," refers to a material that possesses a graded refractive index, which is an arbitrarily engineered material that shows a variable index of refraction along a desired direction. The variation of the refractive index, direction of its variation, and its dependency with respect to the polarization or wavelength of the light can be arbitrarily engineered.

Throughout this disclosure, "transverse invariance" or "transversely invariant" are terms that refer to a property that does not vary macroscopically along a dimension that is perpendicular to the optic axis of that element. A transversely invariant structure or surface does not have any axis of symmetry in its optical properties in macro scale.

The light efficiency or optical efficiency is the ratio of the light energy the reaches the viewer to the light energy emitted by an initial display.

"Leakage" is a term to describe the performance of optical systems. The leakage of light corresponds to the deviation from ideal, on-axis behavior. For example, light that passes through crossed polarizers is ideally fully extinguished, but the extinction depends on the incident angle of the light: if the light is not normally incident, some of it is transmitted. Similarly, "stray light" is light that travels from a source along an undesired path, usually visible to a viewer or detected by an imaging sensor. For example, light that enters a camera system may bounce off a sidewall of the system and be directed to the sensor to create unwanted artifacts.

Similarly, light that exits a display system after multiple undesired reflections between components of the system may be considered stray light and produce a ghost image, which degrades the desired image's quality.

A "reflection removal module" is a hardware optical element to remove stray light or reduce leakage. This is similar to an aperture optic but is placed in front of a camera or imaging sensor or system. The reflection removal module removes unwanted light and transmits the desired image-forming light based on a difference in an optical property of the stray light versus the image-forming light. For example, the optical property may be polarization, intensity, direction, or spectrum (wavelength). The removed light may be, for example, absorbed or reflected away from any camera or sensor by the reflection removal module. A "computational reflection removal module" is a means of removing stray light computationally after the sensor captures the stray light and the ambient light. The stray light may be called the "reflection," and the ambient light may be called the "signal," such that this invention uses computational tools and optical hardware to separate the desired signal from the unwanted reflection in a captured image.

"Teleconferencing" is a technology that enables remote participants to communicate and collaborate in real-time conferences over a communication channel, such as the internet. The teleconferencing system usually includes both hardware and software components that allow participants to connect to the conference and interact with each other through a camera (system), microphone, speaker, display screen, and user interface. The system may also incorporate features such as screen sharing, file sharing, virtual whiteboards, and chat messaging to enhance the collaboration experience. Teleconferencing facilitates remote meetings, presentations, training sessions, and consultations, allowing participants to communicate and work together without the need for physical travel. Teleconferencing includes video calls and chats. "Educational applications" are those in which one or more instructors provide educational information to one or more students. An educational application may be a live or recorded webinar, online tutorial, or online class. "Content creation" is the capture of display content simultaneously with user input, such as a video of a user, to produce new content and forms of media. A social media post is an example of content creation.

"Simulation training" is a technology that replicates the experience of a task in a simulated environment, typically using computer software and specialized hardware, for training purposes. An example is flight simulation training, which simulates the task of flying an aircraft. The flight simulation system typically includes a cockpit simulator or control interface that mimics the controls and instruments of a real aircraft, as well as a visual display system that provides a realistic representation of the simulated environment. The simulator may also incorporate motion and sound effects to enhance the immersive experience. Flight simulations can be used for a variety of purposes, such as pilot training, aircraft design and testing, and entertainment. The simulation may be based on real-world data and physics models to accurately replicate the behavior of the aircraft and its environment, and it may also incorporate scenarios and events to simulate various flight conditions and emergencies. User inputs to a flight simulation training application include a yoke and throttle, physical panels, or touch screens.

In some embodiments, teleconferencing, simulation training, educational applications, and content creation involve a display system and a camera, or camera or imaging system. The display system produces images for the user, while the camera captures an image of the user to include in producing display content. For teleconferencing applications, the display content may be a set of images of the teleconferencing participants, including the user. Such systems are called "teleconferencing systems" or "tele-video systems." If the user can view display content produced by the by display system while simultaneously making eye contact with the camera or camera system (i.e., the captured image or computationally modified captured image of the user looks as though the user is looking directly into the camera), the teleconferencing system is called a "coaxial teleconferencing system." A coaxial teleconferencing system may use a virtual display system, which has an FEC in some embodiments. An image of a user who is making eye contact with the camera is called an "eye-contact image." In some embodiments, an eye-contact image is computed from other captured images of the user.

A "gesture" is a motion, facial expression, or posture orientation of a user, which are normally interpreted by a person or by a computer to indicate a certain desired change, emotion, or physical state. They are typically on a time scale observable by a human being. Micro-gestures are motions, expressions, or orientations that occur within a fraction of a second. They are usually involuntary and indicate similar features as gestures. They can include brief shifts in eye gaze, finger tapping, or other involuntary actions. Gestures may be captured by a camera and identified or classified by a deep learning algorithm or convolutional neural network.

FIG. 1 depicts icons representing elements that are used throughout all the disclosure figures and serve as dictionary elements or glossary elements.

Element 1 is the schematic representation of a display.

Element 2 depicts a generic sensor, which can be an imaging sensor, a temperature sensor, a pressure sensor, a motion sensor, and the like. In some embodiments, the sensor is an ambient-light sensor to measure the amount of ambient light present and output a corresponding electronic signal. An ambient light sensor may be a photodiode, a power meter, an imaging sensor, and the like. In some embodiments, a sensor is an imaging sensor as part of an imaging system.

Element 3 is the schematic representation of a mirror, which specularly reflects light. In some embodiments, the mirror comprises a reflective metal or a dielectric multilayer mirror. In some embodiments, a mirror relies on total internal reflection (TIR). Mirrors may be curved or flat. The term "reflector" is used interchangeably.

Element 4 represents a liquid crystal (LC) matrix. This is an example of an addressable matrix. The pixels of the of the LC matrix modulate the polarization of the incident light, such that a polarizer converts the polarization changes to intensity changes to produce an image.

Element 5 is a lenslet array, which is an array of lenses distributed transverse to an optical systems optical axis. A lenslet array may be a set of cylindrical lenses.

Element 6 is an electro-optic (EO) material such as a liquid crystal (LC) slab or plate. EO materials include LCs; liquid crystal as variable retarder (LCVR); or piezoelectric materials/layers exhibiting Pockel's effects (also known as electro-optical refractive index variation), such as lithium niobate ($LiNbO_3$), lithium tantalate ($LiTaO_3$), potassium titanyl phosphate (KTP), strontium barium niobate (SBN), and β-barium borate (BBO), with transparent electrodes on both sides to introduce electric fields to change the refractive index. EO materials can be arbitrarily engineered.

Element 7 is a polarization-dependent beam splitter (PBS). A PBS reflects light of one polarization and transmits light of the orthogonal polarization. A PBS can be arbitrarily engineered and made using reflective polymer stacks or nanowire grids or thin film technologies. In some embodiments, a PBS is interchangeable with a reflective polarizer.

Element 8 is an absorptive polarizer, which transmits light polarized along its pass angle and absorbs cross polarized light.

Element 9 is a half waveplate (HWP), which produces a relative phase shift of 180 degrees between perpendicular polarization components that propagate through it. For linearly polarized light, the effect is to rotate the polarization direction by an amount equal to twice the angle between the initial polarization direction and the axis of the waveplate. In some embodiments, horizontally polarized light is converted to vertically polarized light, and vice versa, after transmission through an HWP.

Element 10 is generic quarter waveplate (QWP), which produces a relative phase shift of 90 degrees. It transforms linearly polarized light into circularly polarized light, and it transforms circularly polarized light into linearly polarized light.

Element 11 is a generic angular profiling layer, which is an arbitrarily engineered layer to produce a specified angular distribution of light rays. In some embodiments, it allows the transmission of rays within a certain range of incident angles, whereas rays outside such a range of angles are blocked. In some embodiments an angular profiling layer is a directional film or layer. This element selectively transmits light rays that are oriented at angles within a specified angular range and blocks light rays directed outside that range. For example, the directional film may transmit light rays that are incident within a range from zero to 10 degrees, zero to 20 degrees, zero to 30 degrees, zero to 40 degrees, zero to 50 degrees, or zero to 60 degrees. The directional film does not provide optical (focusing) power. In some embodiments, the directional film transmits an angular range that does not start at zero degrees. The directional film may be placed after a display.

Element 12 is an absorptive matrix that absorbs incident light with each portion of the absorptive matrix having a varying property of absorbance. In some embodiments, the portions of the absorptive matrix all have the same property of absorptance and therefore acts as an attenuator.

Element 13 is a retroreflector, which is a mirror that reflects light rays in the exact same directions along which they are incident. The retroreflector can be fabricated with microstructures such as microspheres, micro corner cubes, or a stack of metasurfaces, or it can be a nonlinear element. A phase conjugating mirror can function as a retroreflector.

Element 14 represents a generic beam splitter, which partially reflects and partially transmits light. The ratio of reflected light to transmitted light can be arbitrarily engineered. In some embodiments, the transmission-to-reflection ratio is 50:50. In some embodiments, the transmission-to-reflection ratio is 70:30. A beam splitter is a semi-reflective layer that reflects a certain desired percentage of the intensity and transmits the rest of the intensity. A simple example of a beam splitter is a glass plate with a semi-transparent silver coating or dielectric coating on it, such that it allows 50% of the light to pass through it and reflects the other 50%. The term "semi-reflector" is used interchangeably.

Generally, both mirrors and beam splitters are used to direct light along a proscribed path in a display system. Both rely on specular reflection because their surfaces are smooth on the order of a wavelength. The term "specular reflector" therefore refers to both mirrors and beam splitters. The main difference is only the relative amount of light that is reflected. For example, with a perfect mirror, all the light is reflected, whereas in a standard beam splitter, about half the light is reflected. Though, a beam splitter may be designed to reflect other fractions of the light such as, for example, about 25% or 75%. How much light is reflected, the reflectance, may also vary by wavelength or polarization.

Element 15 is an antireflection (AR) element that eliminates reflections of light incident on its surface. A microstructure such as a nano-cone layer may be an AR element. In some embodiments an AR element is a thin-film coating.

Element 16 represents a lens group, which consists of one or multiple lenses of arbitrary focal length, concavity, and orientation. In some embodiments, a lens group forms a real image on an imaging sensor.

Element 17 is a generic reflective polarizer, which transmits light polarized along its pass angle and reflects cross polarized light. A wire grid polarizer (a reflective polarizer made with nano wires aligned in parallel) is an example.

Element 18 is a generic diffuser, which scatters light in a random or semi-random way. A diffuser can be a micro-beaded element/array or have another microstructure. Diffusers may reflect scattered light or transmit scattered light. The angular profile of the light may be arbitrarily engineered. In some embodiments, light scattered by a diffuser follows a Lambertian profile. In some embodiments, the light scattered forms a narrower profile.

Element 19 is a micro-curtain, which redirects light into specified directions or shields light from traveling in specified directions. A micro curtain can be made by embedding thin periodic absorptive layers in a polymer or glass substrate, or it can be made by fusing thin black coated glass and cutting cross-sectional slabs.

Element 20 is a diffractive optical element (DOE), which has microstructure to produce diffractive effects. The DOE can be of any material. In some embodiments, a DOE is a Fresnel lens.

Element 21 is an LC plate. In the "ON" state, the LC plate rotates the polarization of the light that passes through it. In the "OFF" state, the state of the light polarization is unchanged upon transmission through the layer. In some embodiments the LC is a nematic twisted crystal.

Element 22 is an optical waveguide. In some embodiments, a display is formed by optically coupling a light source, such as a backlight, to an optical waveguide. In some embodiments, the waveguide comprises multiple waveguides or is wavelength dependent.

Element 23 is a spatial light modulator (SLM), which spatially modulates the amplitude or phase of light incident on it. An SLM may operate in reflection mode or transmission made, and it may be electrically addressable or optically addressable. In some embodiments, an SLM is used as an addressable matrix. Element 24 is a digital micromirror device (DMD), which is an opto-electrical-mechanical mirror comprising mirror segments or pixels that each reflect light in a desired direction. Incident light on pixels corresponding to an image are directed in one direction, and unwanted light is directed into another direction. A DMD may be an addressable matrix.

Element 25 is a phosphor matrix, comprising at least one layer of phosphor material. In some embodiments, the phosphor materials are those used in current OLED devices. Some display devices are hybrid devices that combine fluorescent (dmac-dps, dmac-dmt for blue light) and phosphorescence (for red/yellow light). Some OLEDs use thermally active delated fluorescence. Typically, phosphor materials are organometallic doped with iridium, platinum, or titanium. For example, Ir(ppy)3 contains iridium as the central metal atom and emits green light. Ir(piq)2(acac) is an iridium-based phosphorescent emitter, which emits deep blue light. Ir(MDQ)2(acac) is a blue-emitting phosphorescent material based on iridium. PtOEP: Platinum octaethylporphyrin is a phosphorescent material known for emitting red light. Ir(2-phq)3 is an iridium-based phosphorescent emitter that emits yellow light. FIrpic: is a blue-emitting phosphorescent material based on iridium and fluorine. PmIr is a phosphorescent material that emits blue light, composed of polymers with incorporated iridium complexes. PFO-DBTO2 is a blue-emitting phosphorescent material based on polyfluorene. Btp2Ir(acac) is a green-emitting phosphorescent material based on iridium. Ir(ppy)2(acac) is a green-emitting phosphorescent material containing iridium. DPVBi is an efficient blue phosphorescent emitter that is used to produce blue OLEDs. The yellow phosphorescent emitter is Ir(tptpy)2(acac). Other phosphorescent materials use phosphorescent pigments that contain compounds like strontium aluminate, which is doped with rare earth elements like europium or dysprosium, for use in highlighters, emergency signs and markings. Some glow-in-the-dark paints or dial indicators contain phosphorescent pigments based on zinc sulfide or strontium aluminate. Luminous elements on some watch and clock dials may consist of phosphorescent materials like tritium-based paints (though tritium is radioactive) or non-radioactive compounds like strontium aluminate.

Element 26 represents a birefringent plate. A birefringent plate is an anisotropic material, for example, a uniaxial or a biaxial crystal. A birefringent plate that is a uniaxial crystal may have its crystal optic axis oriented in an arbitrary direction. The direction may be in the plane of the plate. The direction may be perpendicular to the surface of the plate. In some embodiments, the birefringent plate is an A-plate, a C-plate, or an O-plate. In some embodiments, the plate is composed of multiple birefringent materials or is a coating on a substrate.

Element 27 is a camera. A camera is an imaging system and comprises a lens group to focus light and form a real image onto an imaging sensor or film. In some embodiments, for example, a camera is used to capture information about a user or a user's environment. A camera may operate in the visible spectrum. An RGB camera is an example of a color camera. Generally a color camera records an image by assigning intensity values to each pixel, each pixel sensitive to a color (or wavelength). In some embodiments, the color camera has red (R), blue (B), and green (G) pixels. A camera may alternatively operate in the infrared (IR) part of the electromagnetic spectrum. In some embodiments, multiple cameras, a camera array, or a camera system capture an image. In some embodiments, a depth camera captures information about depth or sense gestures and poses and they can be of any type. In this disclosure, a "depth camera" is a camera that records the distance between the camera and the distance to an object point. In some embodiments, an RGBD camera captures a color image and a depth map. A depth camera may use active illumination or ambient light, and it can include multiple cameras. Stereo cameras, light detection and ranging (LIDAR) cameras, and time-of-flight cameras are examples of active depth cameras. A depth camera can also use optical coherence tomography sensing (i.e., autocorrelation). It can use infrared (IR) illumination to extract depth from structure or shading. Depth cameras can incorporate gesture recognition or facial recognition features. Depth can also be estimated from conventional cameras or a plurality of conventional cameras through, for example, stereo imaging. A camera system can include any combination of these cameras.

Element 28 is a mechanical actuator that can physically move the elements to which are connected via an electrical or other type of signal.

Element 29 depicts a generic viewer or user of the invention described herein. The light from a point of a virtual image with monocular enters both eyes of the viewer.

Element 30 represents an electronic signal that is used in the electrical system that accompanies the display system to modulate the optical elements or provide feedback to the computer.

Element 31 represents a virtual image, which is the position at which a viewer will perceive an image created by the display systems disclosed herein.

Element 32 depicts a generic AI module. Example AI modules may include a neural network, a transformer, or other deep learning or ML algorithms. An AI module may comprise several AI modules that interact with each other, for example, by each feeding its own output content into the input of the others. In some embodiments, an AI module comprises several AI modules performing interrelated tasks, for example, composing a movie, such that one module produces audio content and another visual content, with the audio content affecting the video content and vice versa. In some embodiments, multiple AI modules are configured to individual tasks in parallel. Generally, a "computational module" is a device configured to process an input in a specified way. Computational modules tend to have specific functions and are usually different from generic processors in, e.g., a computer.

AI is any intelligent operation produced by a machine. Intelligent operations include perception, detection, scene understanding, generating, or perceiving information, or making inferences. The terms "neural network," "artificial neural network," or "neural net" refer to a computational software architecture that are example implementations of AI and that is capable of learning patterns from several data sources and types and making predictions on data that it has not seen before. The types, algorithms, or architectures, of neural networks include feedforward neural networks, recurrent neural networks (RNN), residual neural networks, generative adversarial networks (GANs), modular neural networks, or convolutional neural networks (CNN) (used for object detection and recognition). Neural networks can comprise combinations of different types of neural network architectures. The parameters of a neural network may be determined or trained using training data. Neural networks can be supervised or unsupervised. The learning can be completed through optimization of a cost function. In some embodiments, the neural network architecture is a radial basis network, multi-layer perceptron architecture, long-short term memory (LSTM), Hopfield network, or a Boltzmann machine. Neural network architectures can be one-to-one, one-to-many, many-to-one, many-to-many. Any of the AI algorithms can be used in the AI-based embodiments in this disclosure. For example, a GAN may use an optimization by stochastic gradient descent to minimize a loss function. An LSTM or RNN may use a gradient descent algorithm with backpropagation.

A "transformer" is a machine learning model in deep learning that relies on self-attention to weigh input data in diverse ways. Transformers are often used in computer vision and natural language processing (NLP). They differ from RNNs in that the input data is processed at once, rather than sequentially. Generative pre-trained transformers and bidirectional encoder representations from transformers are examples of transformer systems. Applications include video or image understanding, document summarization or generation, language translation, and the like.

Learning algorithms may be supervised or unsurprised. Some supervised learning algorithms used to implement the embodiments disclosed herein include decision trees or random forest, support vector machines, Bayesian algorithms, and logistic or linear regression. Unsupervised learning gains information by understanding patterns and trends in untagged data. Some algorithms include clustering, K-means clustering, and Gaussian mixture models. In some embodiments, non-neural network computational methods are used to generate display content. In some embodiments, neural networks are combined with other computational methods or algorithms. Other computational methods include optimization algorithms, brute force algorithms, randomized algorithms, and recursive algorithms. Algorithms can implement any mathematical operation or physical phenomena.

Figure 2A:
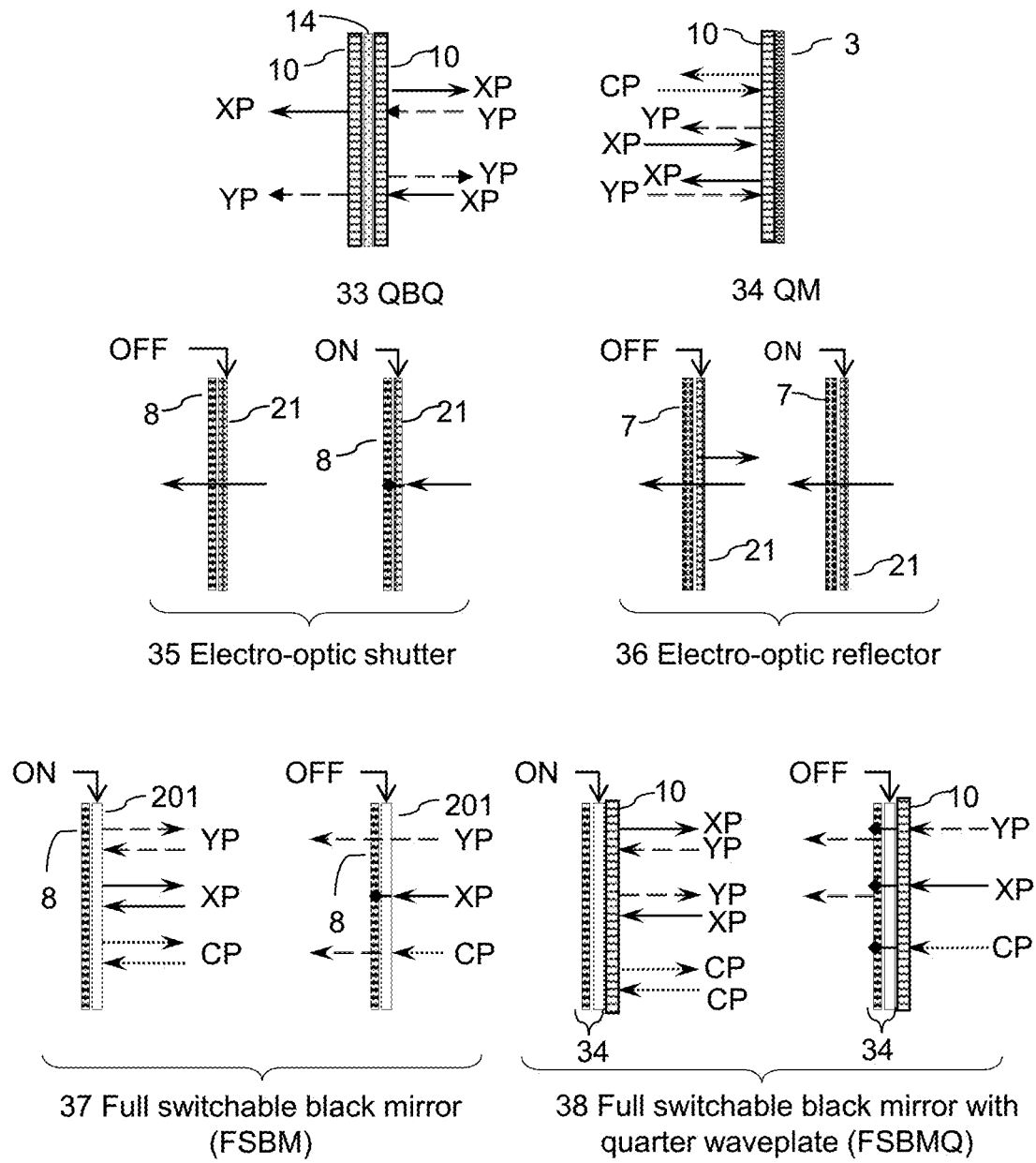
FIGS. 2A through 2D illustrate various arrangements of the elements from FIG. 1 to produce different architectures of the folded-optical-display embodiments described in this invention.

FIGS. 2A through 2D show how components of FIG. 1 can be combined to produce functional elements, architectures, subassemblies, sub-systems, and FECs. In some embodiments, these are integrated into a single, monolithic element, e.g., where a substrate is coated with various films or coatings. In some embodiments, they may be discrete components arranged with or without air gaps between them. In FIG. 2A, a QBQ 33 comprises a QWP 10, a beam splitter 14, and another QWP 10. Light incident on a QBQ is partially reflected and partially transmitted, and the QBQ acts as a HWP for both the reflected and transmitted portions, converting x-polarized light (XP) into y-polarized light and vice versa. In some embodiments, the beam splitter is a PBS. A QM 34 comprises a QWP 10 and a mirror 3. It reflects all light, and it converts x-polarized light into y-polarized light and vice versa (or, equivalently, horizontally polarized light into vertically polarized light). It does not change the polarization state of circularly polarized light.

An electro-optic shutter 35 comprises an LC plate 21 and an absorptive polarizer 8. When the LC plate is ON, it rotates the polarized incident light such that it is aligned perpendicular to the absorptive polarizer and is absorbed by it. When the LC plate is OFF, it leaves the polarization unchanged and parallel to the absorptive polarizer which transmits it. An electro-optic reflector 36 comprises an LC plate 21 and a PBS 7. When the LC plate is ON, it rotates the polarization such that it aligned along the transmit orientation of the PBS. When the LC layer is OFF, the light passing through it is aligned such that the PBS reflects it.

A fully switchable black mirror (FSBM) 37 comprises an absorptive polarizer 8 and a full switchable mirror 201, which may be an EO material. In the ON state, the full switchable mirror 201 is on and reflects light of all polarizations. In the OFF state, the switchable mirror transmits the light, and an absorptive polarizer 8 extinguishes x-polarized light, transmits y-polarized light, and transmits only the y-component of circularly polarized light. A full switchable black mirror with quarter waveplate (FSMBQ) 38 comprises an FSBM 34 and a QWP 10. In the ON state, it reflects all light and interchanges x-polarized with y-polarized light (and vice versa). It reflects circularly polarized light without changing the polarization. In the OFF state it extinguishes circularly polarized light, transmits y-polarized light, and coverts x-polarized light into y-polarized light and transmits the result.

Figure 2B:
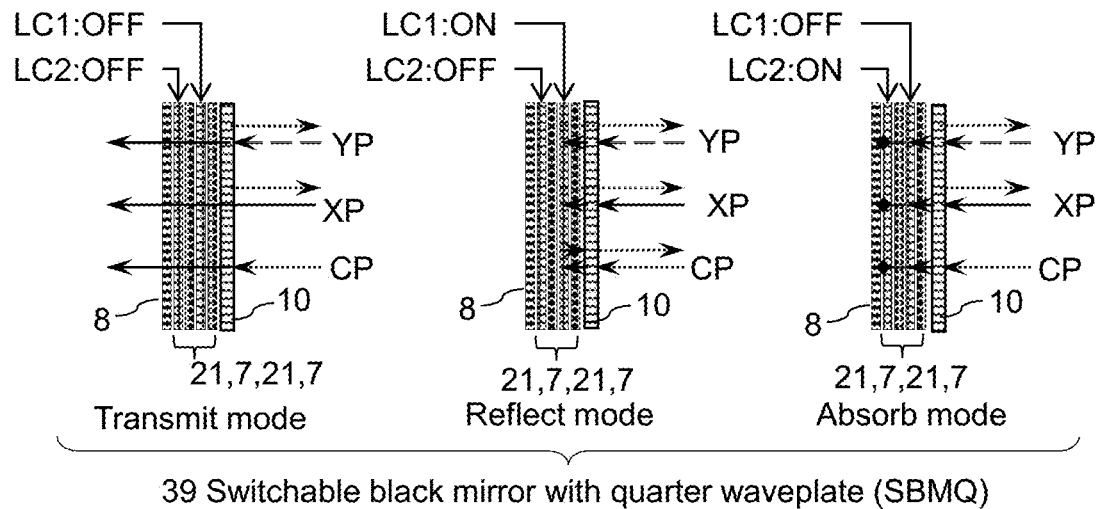
Figure 2B:
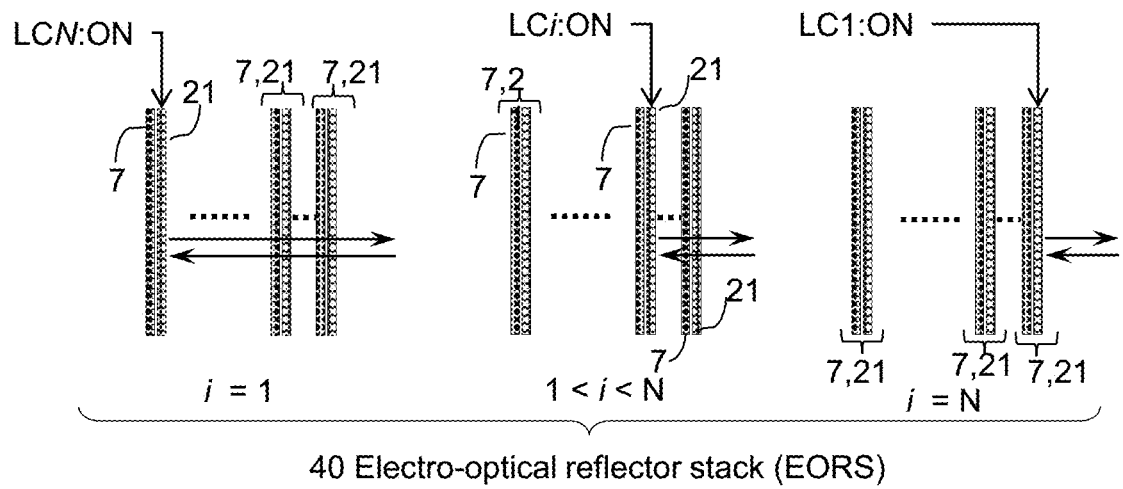

Shown in FIG. 2B are two switchable reflective stacks. A switchable black mirror with quarter waveplate (SBMQ) 39 comprises a QWP 10, followed by two alternating layers of LC plates 21 and PBSs 7, and finally one absorptive polarizer 8. The difference between the FSBMQ and the SBMQ is their corresponding polarization dependence. In the former, the total reflectivity of the material is changing, agnostic to the polarization of the incident light, whereas the latter element produced a polarization-dependent reflectivity. For the SBMQ 39, when both LC plates are OFF ("transmit mode"), all incident polarizations transmit an x-polarized component; incident linear polarization reflect circular polarization. Incident circular polarization reflects light that depends on whether it is right- or left-circularly polarized. When the first LC plate is ON and the second OFF (reflect mode), all light is reflected as circularly polarized. When the plate LC plate is OFF and the second LC is ON (absorb mode), incident light that strikes the absorptive layer and is extinguished, and no light is transmitted through the layers. An electro-optical reflector stack (EORS) 40 comprises a stack of N alternating PBS 7 and LC plates 21. All but one LC plate is in the OFF state, and the LC plate that is in the ON state reflects the incident x-polarized light. All other layers transmit light. By varying which LC layer is in the ON state, the EORS modulates the optical depth or optical path or the length that the light must travel through the stack before it is reflected by a cross-polarized PBS layer next to the ON LC layer. In some embodiments the LC plates and PBSs are configured to reflect y-polarized light.

Figure 2C:
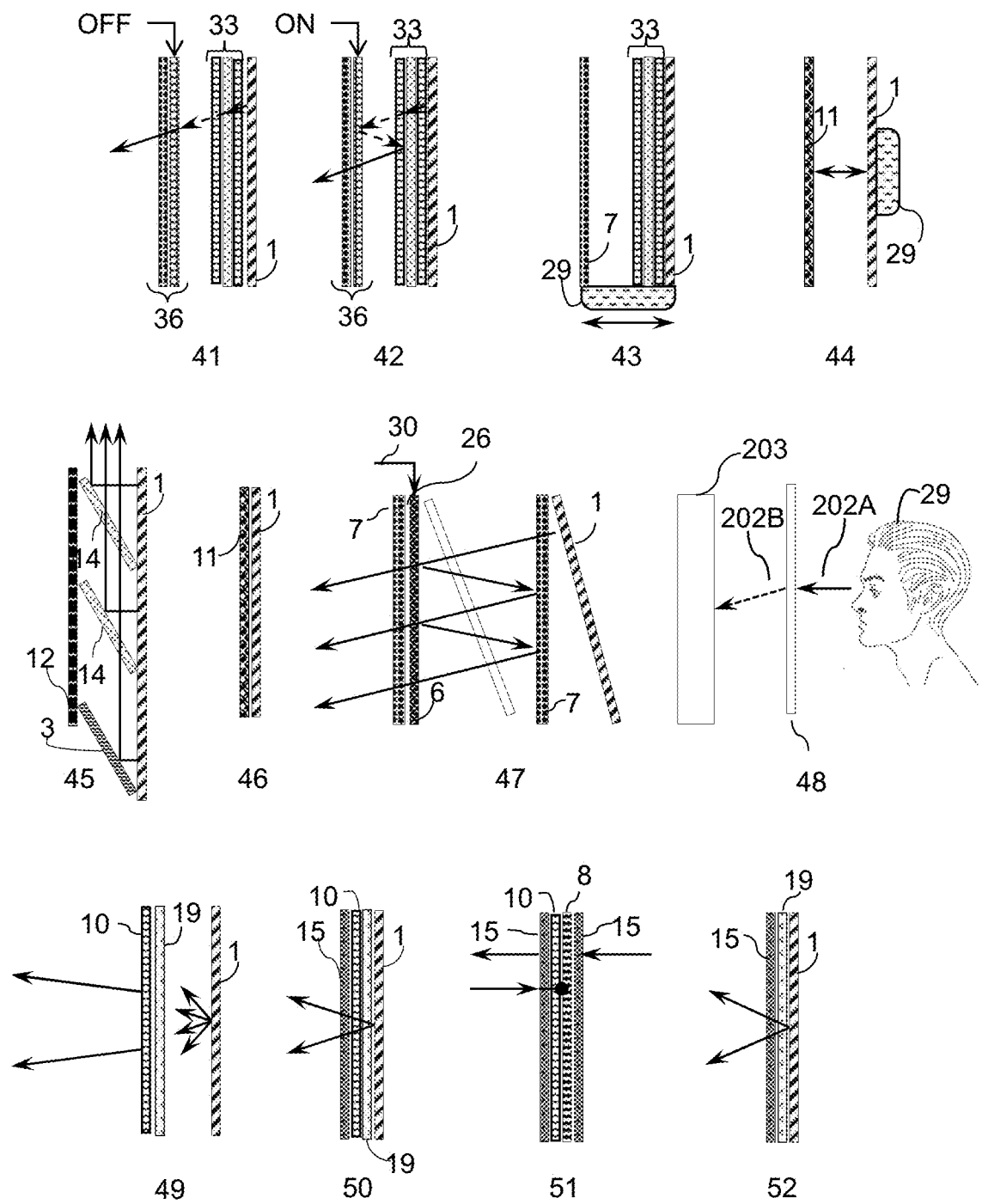
Figure 2D:
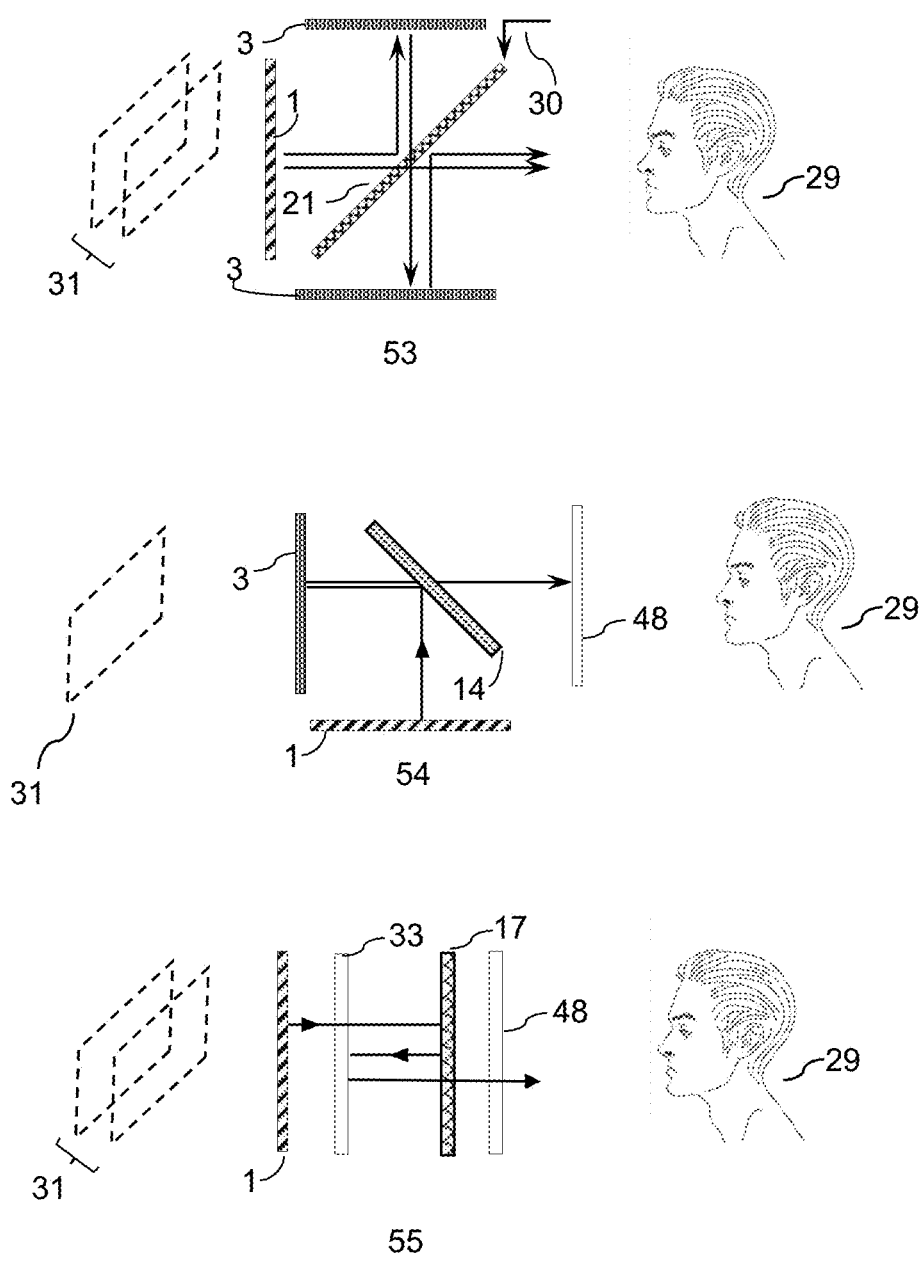

Shown in FIG. 2C are further combinations of elements and how those combinations are used in conjunction with a display. In some embodiments, these form an FEC. In some embodiments, they serve as pre-cavity optics or post-cavity optics to profile the light before or after, respectively, traveling through an FEC. A switchable FEC in the OFF state 41 and in the ON state 42 is optically coupled to a display. Light from the display passes through a QBQ 33 followed by an electro-optic reflector 36. In the OFF state, the light directly exits the device to be viewed by an observer. In the ON state, the light is forced to travel one round trip in the cavity, and the displayed image appears to be deeper compared to the actual location of the display. In some embodiments, the monocular depth of the resulting image is approximately twice as far as that of the display itself.

A mechanically actuated FEC 43 is coupled to a display 1. The display sends light through a QBQ 33 and a PBS 7 set on a mechanical actuator 29. The actuator shifts the set of elements to create longer or shorter optical path lengths for the light and hence shorter or longer monocular depths. In a second mechanically actuated system 44, the display 1 itself is coupled to a mechanical actuator 29. The actuator can shift the display relative to an angular profiling element 11 to force the light to change directionality or to become collimated. In some embodiments, the angular profiling layer is a lenslet array such that the mechanical movement of the display changes the object distance and therefore impacts the collimation. In some embodiments, the display is "macro-formed," meaning it may have mechanical waves or bends induced onto it by the mechanical actuators so that the directionality or collimation of the light that comes out of the angular lenslet array is impacted in a desired way. In some embodiments other elements, such as a beam splitter or mirror, are macro-formed.

In some embodiments, the display is mechanically shifting because of the actuator's motion along a translational axis to impact the directionality of the exit light from the apertures. The mechanical actuation mechanism may be arbitrarily engineered. In some embodiments, the mechanical actuator is an array of ultrasonic transducers; in some embodiments, the mechanical translation is performed by a high rotation-per-minute brushless motor; in some embodiments, the mechanical movements are delivered via a piezo- or stepper motor-based mechanism.

A segmented FEC 45 is optically coupled to a display 1 that is partitioned into segments, i.e., it is a segmented display. Light from the bottom segment is reflected by a mirror 3, and light from the upper segments is reflected by subsequent beam splitters 14. An absorptive matrix 12 absorbs unwanted stray light. In some embodiments the absorptive matrix is a uniform attenuator to substantially absorb all the light incident on it uniformly across its surface. This is an example of an off-axis FEC. In some embodiments, the FEC produces a multifocal image. The FEC can be arbitrarily engineered to produce the desired number of focal planes.

An angular-modified display 46 consists of display 1 layer followed immediately by an angular profiling element 11, which may be a directional film here. The angular profiling layer might be a lenticular lens array to provide stereopsis to the viewer, or it might be a lenslet array or any other angular profiling layer to provide autostereoscopic 3D or provide different images to different angles. The angular profiling layer is an example of pre-cavity optics.

An example of a tilted-component FEC 47 may be coupled to a tilted display 1, which sends light into the FEC comprising an "internal polarization clock" whose ends are composed of PBSs 7. In between the PBSs 7 is an EO material 6 that acts as a polarization rotator and a birefringent plate 26, such that different angles of propagation result in different phase retardation of polarization. Another EO material 6 acts as shutter element that uses an electronic signal 30 that turns the light into a desired polarization so that only one of the round trips are allowed to exit the cavity, and the transmitted light has traveled a desired optical path or depth. This is a representation of a coaxial FEC with polarization clocks and segmented gated apertures with desired gating mechanisms. In some embodiments, each of these elements is segmented, such that light from different portions of a segmented display travel different distances.

An aperture optic 48 lies between a viewer 29 and a component 203 of the display system. In some embodiments, the component is an FEC. The aperture serves to take an ambient light ray 202A that is incident on it and modify it. In some embodiments, the transmitted light ray 203 has a different amplitude or direction. In some embodiments, the incident light ray is fully extinguished, and the aperture optic removes all or a substantial amount of the ambient light incident on it. In some embodiments, the aperture optic includes a polarizer. In some embodiments, the aperture optic includes an antireflection element. In some embodiments, the aperture optic is just a transparent material, such as a piece of glass.

A modified display 49 is a display 1 followed by a micro-curtain 19 and a QWP 10 to function as pre-cavity optics. This allows desired profiling of the light of the display. The pre-cavity optics can adjust the polarization, angular distribution, or other properties of the light entering the cavity. Another pre-cavity subassembly 50 shows of a stack of elements: a display 1, a QWP 10, a micro-curtain layer 19, and an antireflection element 15. This subsystem is used in many disclosed systems and is categorized as a display. The micro curtain can be arbitrarily engineered, and it allows for control of the directionality of the light and the visibility of the display. The AR layer allows for reduction of ambient or internal reflections of the systems that use this subcomponent. In some embodiments, the AR element is a coating on substrate.

Subassembly 51 is a sub-assembly consisting of an AR element 15 and an absorptive polarizer 8 on one side facing a viewer and outside world, and a QWP 10 another optional AR element 15 or film on the side that faces the display from which light exits. In some embodiments, the AR element is a coating on substrate. In this disclosure, 48 is an example of aperture optics called an ambient light suppressor. In some embodiments, the ambient light suppressor is the final set of optical elements that the light experiences before exiting the display system. In some embodiments, the ambient light suppressor further comprises a directional film or angular profiling layer to produce angular profiling of the light exiting the system. Subassembly 52 is a subassembly of display 1 with micro curtain layer 19 and an AR element 15 on top.

An example of an off-axis multifocal FEC 53 comprises two mirrors 3 on the top and bottom, a display 1 at the back, and an angled PBS 7 with LC plate 21 in the middle such that the electronic signal 30 to the LC can change the length that the light must travel before it exits the cavity. In some embodiments, a stack of such angled PBS-on-LC splitters such that the length of the light travel can be programmed or controlled in multiple steps. In some embodiments, the mirror is a QM to rotate the polarization of the light. A viewer 29 sees a plurality of virtual images 31. The viewer perceives the depth to be the monocular depth of the image, and light from every point of the image enters both eyes.

A simple off-axis FEC 54 comprises a display 1 coupled to display optics. The display light is reflected by a beam splitter 14, then reflected by a mirror 3, and then transmitted through the same beam splitter. The light may optionally pass through an aperture optic 48 to suppress stray light before being seen by a viewer. A viewer 29 sees a virtual image 31. The viewer perceives the depth to be the monocular depth of the image, and light from every point of the image enters both eyes. In some embodiments, the beam splitter is polarization dependent and additional wave plates are included to perform polarization profiling of the light for increased light efficiency.

A coaxial FEC 55 shows display 1 which passes through a QBQ 33; the light is reflected by a reflective polarizer 17, then reflected by the same QBQ. This reflection by the QBQ rotates the polarization by 90 degrees, so that it passes through the reflective polarizer. An aperture optic 48 may optionally filter out stray light before being viewed by a viewer. A viewer 29 sees on or a plurality of virtual images 31. The viewer perceives the depth to be the monocular depth of the image, and light from every point of the image enters both eyes.

Figure 3A:
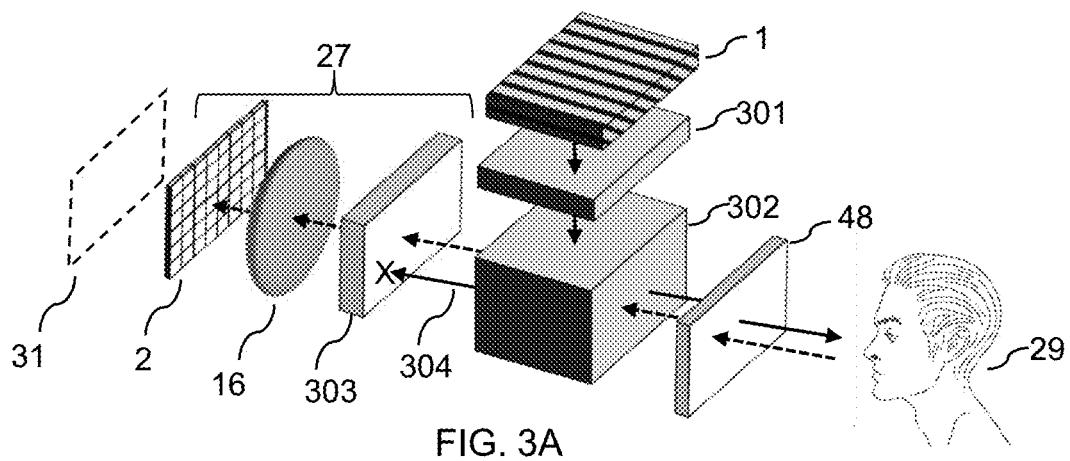
FIGS. 3A through 3C illustrate the different embodiments of stray light removal from a coaxial teleconferencing system, the different embodiments including a combination of computational techniques and optical component techniques.
Figure 3B:
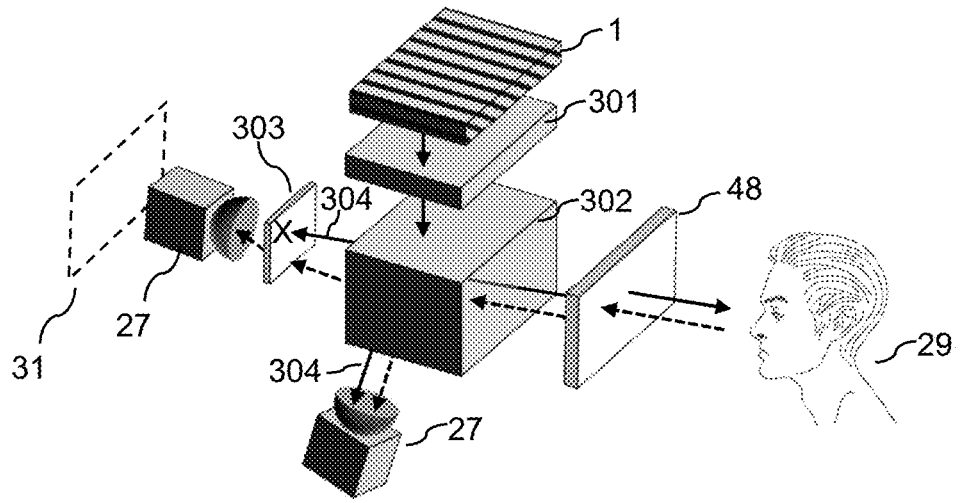
Figure 3C:
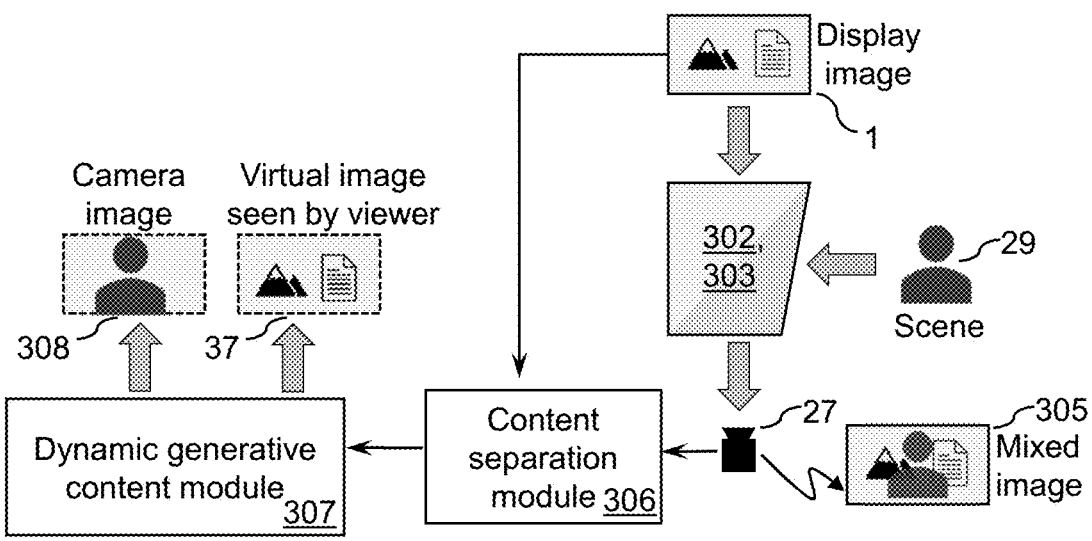

FIGS. 3A through 3C illustrate a set of embodiments of immersive teleconferencing and video applications. In some embodiments, a set of computational methods assists in the immersion experience. FIG. 3A depicts an embodiment in which a display 1 emits light, corresponding to a display image. The light first travels through pre-cavity optics 301 and then through display optics 302. (The display, pre-cavity optics, and display optics together compose a display system.) In some embodiments the display optics 302 includes an FEC, and the display system is a virtual display system. In some embodiments the display optics includes an aperture optic 48 after the FEC. In some embodiments, the aperture optic includes a polarizer and antireflection element. Though these are just examples, any suitable configuration of elements may be used in an aperture optic. The light is profiled and redirected to a viewer 29, who sees a virtual image 31. Simultaneously, ambient light enters the display optics 302. In some embodiments, this light is ambient light that scatters from the viewer. In some embodiments, light from other objects in the viewer's environment enters the display optics. This light exits the display system and passes through a reflection removal module 303. In some embodiments, the reflection removal module is polarization dependent. In some embodiments, it depends on wavelength, intensity, or coherence of the incident light. The ambient light is imaged onto sensor 2 by lens group 16. In some embodiments, the sensor and lens group, and, optionally, the reflection removal module, are part of a camera 27. In some embodiments, the reflection removal module 303 is external to the camera. In some embodiments, the display produces stray light 304 that is directed to the sensor 2. The reflection removal module 303 removes at least some of that stray light from being detected by sensor 2 without significantly impacting the ambient light. To do this, the reflection removal module filters the ambient light from the stray light based on a difference in polarization, intensity, frequency content, wavelength, coherence, or some other optical property.

Importantly, while the viewer is looking at the virtual image 31, he is simultaneously making eye contact with the camera. If the captured image of the viewer is displayed to participants in a teleconferencing application, it will therefore appear as if the viewer is making direct eye contact. That is, the capture image is an eye-contact image.

FIG. 3B shows an embodiment in which a display 1 emits light through pre-cavity optics 301 into display optics 302 and through an aperture optic 48 system to produce a virtual image 31 viewable by a viewer 29. Ambient light scattered from the viewer entries the display optics. This ambient light, as well as some potential stray light 304 from the display, enters a plurality of cameras. Each of the cameras may have a lens and a sensor and optical subsystem. The cameras are in different positions. In some embodiments, their optical axes do not coincide. In some embodiments, the plurality of cameras operates at different wavelengths or have active illumination, such as infrared (IR) illumination and capture. In some embodiments, the cameras are part of a camera system to capture depth maps. In some embodiments, the cameras are identical but just capture different views of the ambient light. A reflection removal module 303 may block some stray light 304 from the display. In some embodiments, the viewer is not making eye contact with any of the cameras, and the multiple camera images are fused together computationally to produce a cohesive image of the viewer, without display light, such that it appears as if the viewer is making eye contact with one of them, and by consequence with anyone seeing the camera image. The captured image is an eye-contact image.

FIG. 3C shows a flow diagram for computational methods that improve the stray light rejection for the camera and camera systems of FIGS. 3A and 3B. A display image 1 and a scene, potentially including a user 29, both send light into the display system's display optics 302 and, in some embodiments, a reflection removal module 302. The display image first may pass through pre cavity optics. Some of the light from each is captured by a sensor or a camera 27 producing a mixed image 305. The mixed image contains information about both the display image content and the scene/viewer.

The camera sends the mixed signal, and the display sends the display image, to a content separation module 306, which separates the display image from the ambient light of the viewer. In some embodiments, the content separation module filters the display image from the ambient light based on its spatial or temporal frequency content. After the two images are separated, a dynamic generative content module 307 may further process the two images. The output may be used to modify the display image so that the viewer sees a corrected virtual image 37. The camera image 308, which may be used by a software application such as a teleconferencing application and displayed on other display systems or on the present display.

Figure 4A:
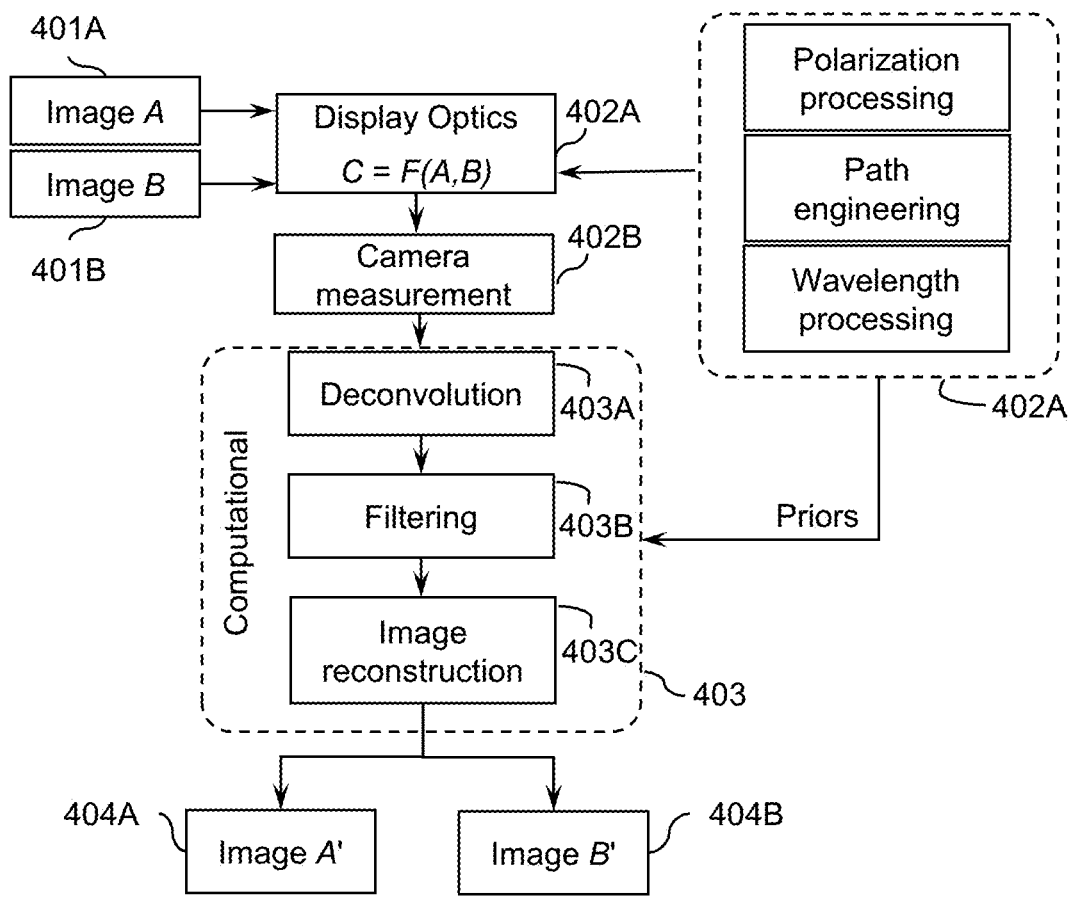
FIGS. 4A and 4B illustrate flow diagrams for operation of the invention described and a method of updating display content using content captured by the camera.

FIG. 4A shows a flow diagram. Image A 401A and Image B 401B enter the display optics 402A and measured by a camera measurement 402B. In some embodiments, these two images are the display light and the ambient light from a viewer. In some embodiments, the camera records an image C that is a function F of images A and B:C=F(A,B). This mixed image enters computational step 403. In some embodiments, C undergoes convolution 403A, filtering 403B, and image reconstruction 404C steps to output modified images Image A' and Image B'. In some embodiments, these images are a modified image to display on the display panel and a modified image to be recorded by the camera. The display optics includes optical hardware 402A that modifies the optical paths of images A and B based on polarization processing, path engineering, and component placement.

Figure 4B:
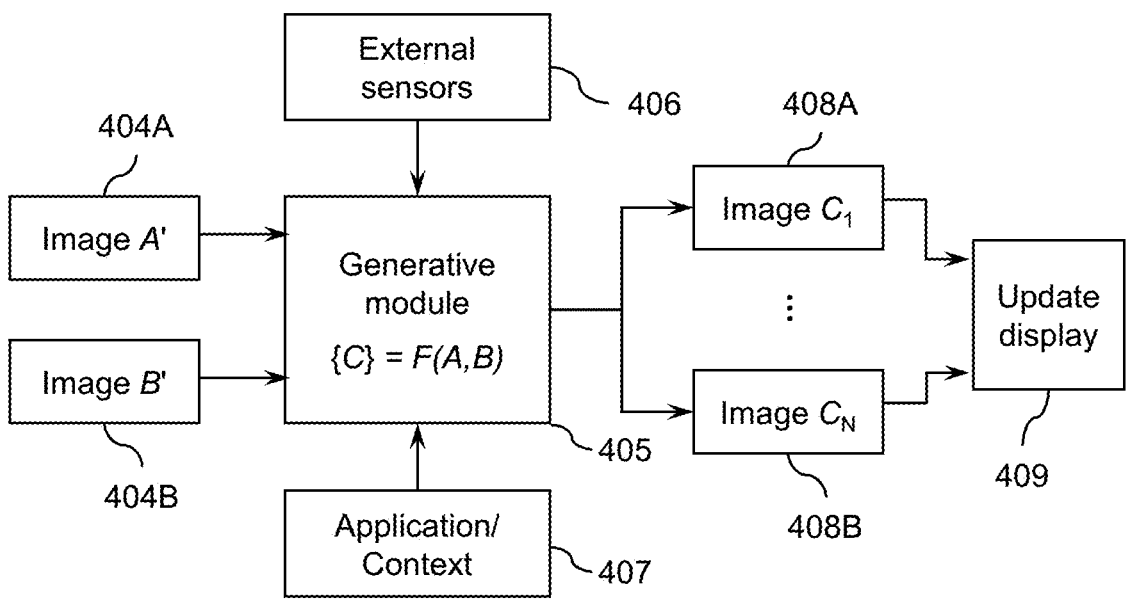

FIG. 4B shows a flow diagram that serves to update the display content. The modified images, Image A' 404A and Image B' 404B are fed into a generative module 405, which also receives, as input, information from external sensors 406, which may include user inputs or user information through various sensors. It may also include meta data about the sensors. The generative module produces a set of modified images {C} that are a function of all the input data. The first image C1 408A through the n-th image Cx 408B may be used in an update display block 409 to modify the display image. The images may be modified images of the viewer, or the viewer's environment, or the viewer along with synthetic layers or annotation layers of information as background or foreground.

FIG. 5A shows an example embodiment of the perspective embodiment of FIG. 3A. Display 1 emits light toward a beam splitter 14, which reflects the light to a mirror 3. The mirror and beam splitter serve as the display optics in this embodiment. The mirror reflects the light back through the beam splitter, after which it is viewed as a virtual image by a viewer 29. (The display optics here are the simple off-axis FEC 54 of FIG. 2D. In some embodiments, a different FEC architecture is used.) Ambient light from the viewer passes through an aperture optic 48 is reflected by the beam splitter and directed downward. In some embodiments the polarization state of the ambient light (or signal) is different from that of the stray light (or reflection). Further, some stray light from the display is also directed downward. An absorptive polarizer 8, which serves as the reflection removal module, is oriented such that it absorbs most of the display light and passes most of the ambient light. The ambient light is then focused by lens group 16 onto sensor 2. The lens group and sensor may be disposed in the same housing and form a camera. The viewer sees a virtual image 31 while simultaneously making eye contact with the sensor (or camera). The captured image is an eye-contact image.

FIG. 5B shows a similar embodiment. In this case, display 1 emits light through some pre-cavity optics, which is a first polarizer 8A, before entering display optics 302, which may comprise an FEC and an aperture optic. The ambient light from the viewer 29, along with some stray light from the display strikes a second polarizer 8B. The ambient light forms an image on a camera 27, and the stray light is removed by the interaction of the polarizers. In this embodiment, the first polarizer and second polarizer are both absorptive polarizers, which can be modeled as uniaxial crystals with complex refractive index (to account for absorption). The first polarizer may be an e-type polarizer, such that the transmission axis and the optic axis are oriented to transmit the extraordinary polarization modes of the polarizer. The second polarizer may be an o-type polarizer, such that the transmission axis and the optic axis are oriented to transmit the ordinary polarization modes of the polarizer. For both e- and o-type polarizer, the transmission of the light depends on the angle of incidence of the night. With both types of polarizers present, this angle-dependent leakage is reduced. Such that the camera image has virtually no stray light form the display, regardless of incident angle. The aperture optic in FIGS. 5A and 5B may comprise a polarizer. It may comprise an antireflection element. In some embodiments, the aperture optic is just a transparent material, such as a piece of glass.

In some embodiments, the polarizer itself shows birefringence (i.e., an anisotropic real refractive index). In some moments, the polarizers are dye-infused birefringent elements. In some embodiments one or more polarizers have an extinction ratio that depends on its distance from the optic axis, i.e., the extinction ratio is macro-formed.

The properties of such polarization-dependent pre-cavity optics and reflection removal modules may be arbitrarily engineered, according to number of elements, shape, size, and location relative to other elements of the system. For example, FIG. 5C shows the absorptive polarizer 8 from FIG. 5A. A first light ray 501A from the display may have polarization S0 and be normally incident, such that it is extinguished. A second ray 501B may have a polarization S1 and incident at a different angle such that exhibits leakage and is partially transmitted. By introducing a birefringent plate 26, the polarization of the second ray may be converted into S1' such that it is substantially absorbed by the polarizer, without modifying the first ray 501A. In this embodiment, the reflection removal module described in FIG. 3A comprises the absorptive polarizer 8 and the birefringent plate 26.

Similarly, FIG. 5D shows an absorptive polarizer 8, which is segmented into an array of sub-polarizer elements with different transmission axes. Display 1 emits multiple rays from a given pixel, sending the light through the display optics 302. Different rays are incident on the different segments to experience different polarization effects. The orientation and arrangements of the transmission axis of the sub-polarizer elements is determined to minimize or eliminate angle-dependent transmission through the polarizer.

In a general case, shown in FIG. 5E, the reflection removal module includes a volume of elements. Each element, e.g., first element 502A or second element 502B, is a birefringent or polarizing element. The birefringent elements have varying crystal optic axes and principal indices of refraction. The polarizing elements have varying transmission axis orientations. The linear dimension of the elements may be subwavelength and include diffraction effects. In this way, the total impact on a light ray depends specifically on both its angle and its incident position. A first ray 501A enters the set of elements with a first angle at a first position and experiences a first sequency of elements. A second ray 501B experiences a completely different set of elements. In some embodiments, layers of elements may correspond to a programmable LC matrix that dynamically varies the birefringent properties based on applied voltages to the matrix.

Other variations of polarization-dependent reflection removal module include the embodiments in FIG. 5F, which is a pile-of-plates polarizer 503. In simplest form, this component is a stack of plates, such as beam splitters or other transparent elements. Based on the polarization- and angle-dependent Fresnel coefficients, the transmission through the stack depends on angle and polarization, such that a ray with incident polarization and angle $S(\theta)$ will have a transmission $T(\theta, S(\theta))$, i.e., a transmission that depends explicitly on the angle and also implicitly through the polarization-dependence.

FIG. 5G shows an embodiment of a polarization-sensitive reflection removal module made of layers or polarization-dependent elements, such as absorptive polarizers 8 and birefringent plates 26. In some embodiments an LC matrix 4 is included and controlled by an electronic signal 30 that applies a voltage. This embodiment is like that in FIG. 5E.

FIG. 5H shows an embodiment in which the display 1 and an external environment 504 (which may include a viewer) send light through the display optics 302. The light then passes through an angular-profiling layer 11 and then through an absorptive polarizer 8. In some embodiments, the angular profiling layer is birefringent such that it acts on only the display light. In such a case, the ambient light travels through it unimpeded, while the steeper rays of the display light are blocked or redirected toward normal incidence on the absorptive polarizer. In some embodiments, the angular profiling layer introduces haziness to the image that is recorded by the camera due to microstructure artifacts. The haziness may be mitigated by a dehazing computational process.

FIG. 5I introduces an embodiment in which the optical subsystem includes an absorptive polarizer 8 whose geometry is not planar. In this embodiment, the polarizer is bent such that different rays traveling at different angles still are incident on the polarizer normally. In some embodiments, such as in FIG. 5J the absorptive polarizer 8 is curved. In some embodiments, the curved polarizer is adhered to another optical element, such as a lens. In some embodiments, a birefringent plate 26 is also curved and modifies the polarization of the incident light.

The embodiment of FIG. 5K shows the reflection removal module integrated into camera 27, which receives light from display 1 after propagating through the display optics 302. The camera includes an LC matrix 4, an absorptive polarizer 8, a lens group 16, and a sensor 2. The LC matrix acts as an addressable birefringent material that adjusts the polarization of incident portion of light.

FIG. 5L shows a reflection removal module integrated into camera 27. Light first enters through lens group 16, then passes through an absorptive polarizer 8, which may be located in the focal plane of the lens group. The lens serves to adjust the angle of light rays, which further changes the impact on the light rays by the polarizer. The polarizer may be curved or segmented, as described in the previous embodiments. Any remaining stray light will pass on to a sensor 2, which detects ambient light of a user and environment. Similarly, 5M shows a camera 27 that receives light through a first lenslet array 5, which collimates the light. In the focal plane is an absorptive polarizer 8, oriented to absorb stray light from a display. The ambient light travels a similar path but is then imaged by a second lenslet array 5 onto a sensor 2.

FIG. 5N is a catadioptric-style reflection removal module integrated into camera 27. The ambient light and stray display light enter through an absorptive polarizer 8 which has curved surfaces and therefore optical power to form an image or otherwise focus light. The light is incident on a second polarizer, a reflective polarizer 17. The two polarizers have the same pass axis. Ambient light is oriented along the common transmission axis and passes through to the sensor 2 to produce a captured image. Stray light that passes through the first polarizer is reflected and bent by the reflective polarizer such that it is incident on the absorptive polarizer a second time for more absorption and removal of stray light. Both the curvature of the polarizers and their separation distance may be arbitrarily engineered.

The embodiment in FIG. 5O shows a display 1 and a viewer 29 both sending light through display optics 302 and through an aperture optic 48. The viewer light (ambient light) and some of the display's stray light pass through an absorptive polarizer 8. The light then passes through a birefringent plate 26, which is a uniaxial crystal or biaxial crystal in some embodiments. The crystal optic axis is cut so as to produce double refraction, where the display stray light is the extraordinary light component that gets shifted and misses a camera 27. The ambient light from the viewer is detected by the camera. In some embodiments the double refraction is assisted by a prism. In some embodiments, multiple double refraction elements are combined.

The embodiment in FIG. 5P is a reflection removal module within camera 27, which includes a lens group 16 to collect light (shown are rays passing through the center of the lens). Behind the lens group is a set of absorptive polarizers that are tilted relative to their position from the optic axis of sensor 2. In some embodiments, the tilt is in two transverse directions. Each tilted polarizer receives light predominantly normal to its surface. In some embodiments, the polarizers and lens are integrated into a single Fresnel lens.

Figure 5Q:
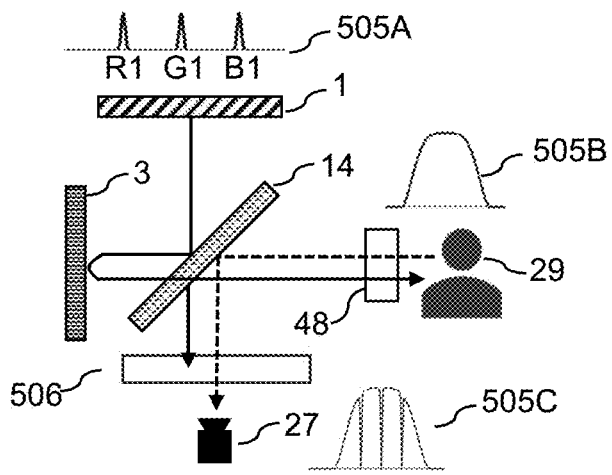
FIGS. 5A though 5U illustrate a set of embodiments that use optical hardware components to mitigate stray light in immersive applications.

FIG. 5Q shows an embodiment in which the reflection removal module is wavelength dependent. Light from display 1 has a display spectrum 505A. Light form a viewer 29 or his external environment has an ambient spectrum 505B and enters the system through an aperture optics 48. In some embodiments the display spectrum has narrow bands compared to the ambient spectrum. Both sets of light travel through display optics which include here a beam splitter 14 and a mirror 3. The display optics may be any FEC. The ambient light and some stray light travel downward through a wavelength dependent reflection removal module 506 that is a set of absorptive notch filters to absorb the R1, G1, and B1 spectral components of the display light. The result is a camera spectrum 405C that is largely identical to the ambient spectrum and includes ambient light but not stray light.

Figure 5R:
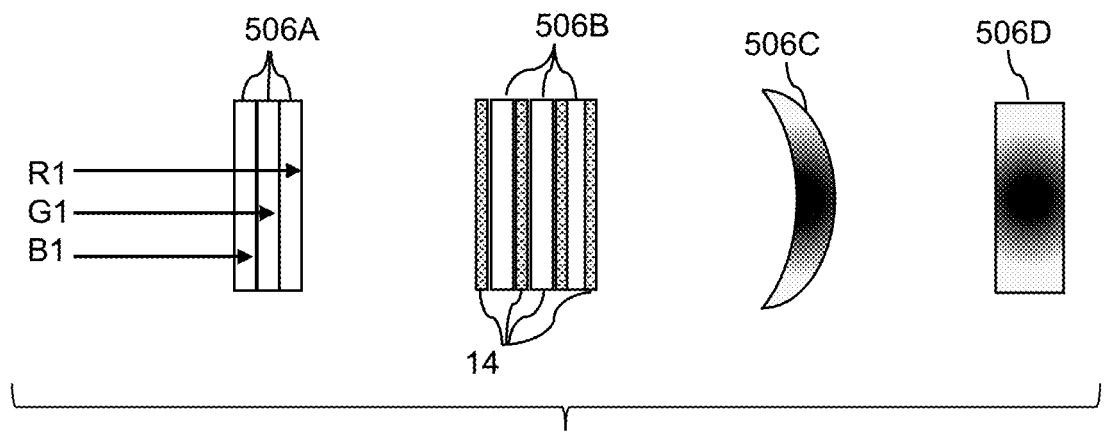

FIG. 5R shows some embodiments of how to construct a wavelength-dependent reflection removal module 506. This component 506A may be a stack of three notch absorbers, each to absorb R1, G1, and B1 of the display light. In some embodiments, the display spectrum is absorbed and re-emitted in a wavelength range that the camera is insensitive to. In some embodiments, the wavelength dependent reflection removal module is a set of such subsystems interspersed with semi reflective elements such as beam splitters 14 to produce Fabry-Perot-like interference effects 506B. In some embodiments, the wavelength dependence is affected through thin-film interference. The reflection removal module may include a curved wavelength-dependent element 506C and/or have a spatially varying wavelength dependence 506D. For example, in some embodiments, the reflection removal module is thinner at the edges than at the center so that higher angled light experiences the same path length as normally incident light.

Figure 5S:
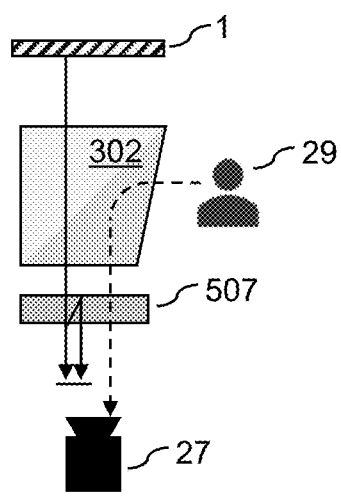

Some embodiments rely on path-length differences in the form of interference effects. In the embodiment in FIG. 5S, some stray light from display 1 and some ambient light from a viewer 29 travel through the display optics 302 and are incident onto an interferometer. The interferometer may be a glass plate or beam splitter. In some embodiments, it is a Mach-Zehnder interferometer or a Michelson interferometer. Interference effects will be seen if the coherence length $L_c$ of light is longer than the path length difference PLD of the interferometer. In this embodiment the display light has a longer coherence length $L_{c1}$ and the ambient light has a short coherence length $L_{c2}$, such that $L_{c1}$>PLD>$L_{c2}$. In this case the display light can experience deconstructive interference on a sensor or camera 27 and be effectively eliminated. The relatively incoherent ambient light still passes through and forms an image.

Figure 5T:
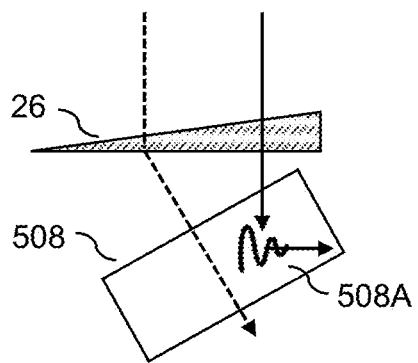

FIG. 5T is an embodiment in which a birefringent plate 26 is shaped as a prism. Its anisotropy is such that it is effectively transparent to the stray light of a display but causes the ambient light to tilt. Both sets of light are incident on a nonlinear material 508, but at different angles. Because of phase matching effects, the stray light is absorbed in a nonlinear process, such as two-photon absorption process 508A, and produces light outside of the detection band of the camera (either outside the spectral window, or at a different direction beyond the camera aperture) The ambient light is unimpeded because it is traveling at a direction that does not phase match in the nonlinear materials.

Figure 5U:
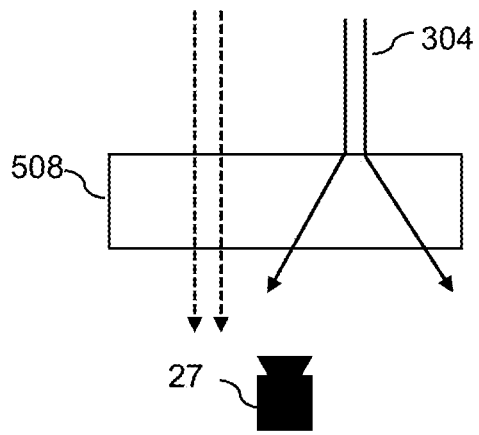

FIG. 5U is another example of nonlinearly induced reflection removal. In some embodiments the polarization state of the stray light 304 is oriented such that it experiences a large nonlinear constant in a nonlinear material 508, which may be a photorefractive crystal, and the ambient light does not. In some embodiments, the nonlinearity is a defocusing nonlinearity wherein the refractive index decreases where the incident light is bright. The result is that the display light is strongly defocused, lowering the SNR of ambient-to-stray light on a camera 27.

Figure 6A:
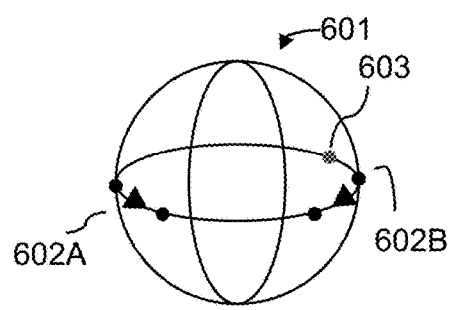
FIGS. 6A through 6H presents an analysis of polarization-based mitigation methods for immersive applications and stray-light removal.

FIGS. 6A through 6H analyze a polarization-dependent reflection removal module. FIG. 6A shows the Poincaré sphere 601, which identifies each possible polarization state of light as a point on the surface of the sphere. Linearly polarized light 603 corresponds to equatorial points (with the angle of the polarization vector rotating continuously with the azimuthal angle around the sphere). The northern and southern poles correspond to left- and right-hand circular polarization. Other points correspond generally to elliptical polarization states. Generally, a first polarization state 602A and a second polarization state 603B are transformed along different paths as they propagate through polarizing elements. In some embodiments, two polarization states that begin as orthogonal end up not orthogonal. In some embodiments, secondary elements are included to restore orthogonality.

Jones and Stokes vectors and the corresponding transmission matrices of polarization-dependent elements usually invoke the paraxial approximate, exactly valid only for normal incidence. But the transmission depends generally on the angle of incidence (AOI), both because of the angle-dependent Fresnel coefficients of transmission and reflection at the interface between two materials, but also because of the angle- and polarization-dependent propagation constant within the material. A light beam can be decomposed into its s- and p-polarized components $A_s$ and $A_p$. The matrix M that defines transmission through an element produces new components $A_s'$ and $A_p'$:

$$\begin{pmatrix} A_s' \\ A_p' \end{pmatrix} = M(\theta, \phi) \begin{pmatrix} A_s \\ A_p \end{pmatrix} \quad \text{(Eq. 1)}$$

Where $\theta$ is the polar angle (relative to the system optical axis) and $\phi$ is the azimuthal angle. For N elements (including an "element" corresponding to free-space propagation of a fixed distance), the output field can be written as $$\begin{pmatrix} A_s' \\ A_p' \end{pmatrix} = \prod_j^N M_j(\theta, \varphi) \begin{pmatrix} A_s \\ A_p \end{pmatrix} \quad \text{(Eq. 2)}$$

The transmission T itself is the ratio of the output energy to the input energy: $T=(A_s'^2+A_p'^2)/(A_s^2+A_p^2)$. For polarizing elements, such as a linear polarizer, some important figures of merit are the diattenuation and the extinction ratio. In devices such as LCD screens, angle-dependent contrast is a figure of merit. All these quantities depend on angle and wavelength. For normally incident light, a pair of ideal crossed polarizers extinguishes all the light completely. However, as the AOI increases, the extinction, even of ideal polarizers, decreases, most strongly along the bisecting line between the two polarizers' transmission axis. The reason is that the effective angle between the two transmission axes of the polarizers decreases because of geometric effects. Similarly, for light polarized in a certain state and incident on a polarizer, the transmission depends on the angle of incidence.

Figure 6B:
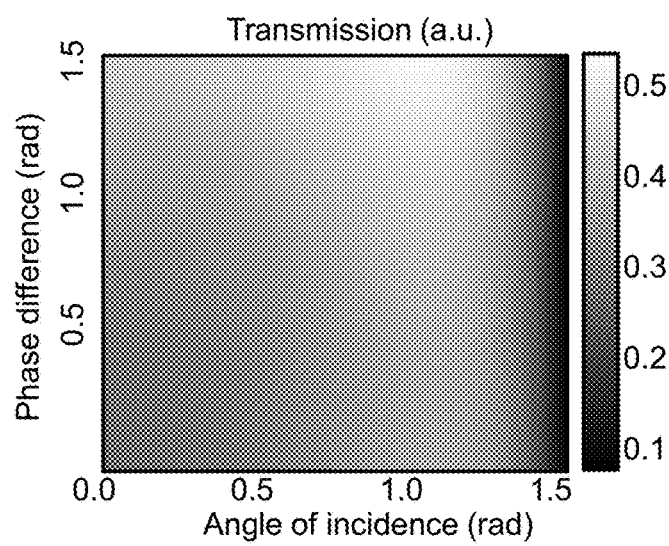
Figure 6C:
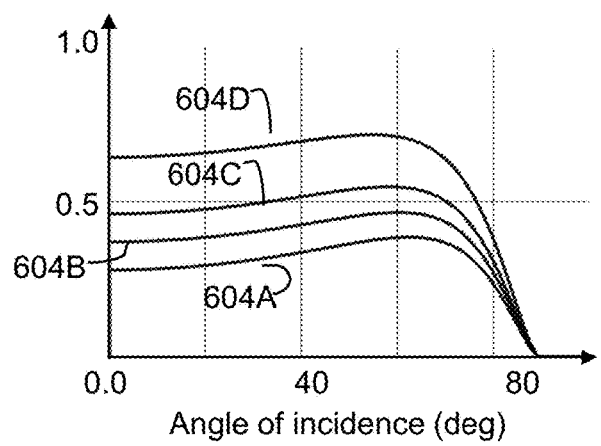
Figure 6D:
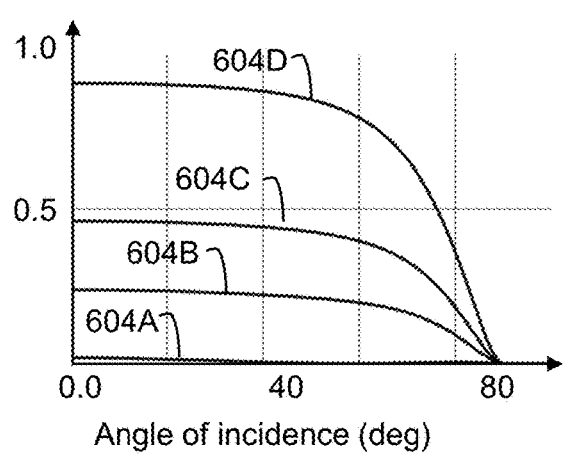

FIG. 6B shows a contour plot of the transmission of light through a linear polarizer whose transmission axis is oriented at 45 degrees relative to the plane of incidence. The horizontal axis is the angle of incidence of the light ($\theta$). The vertical axis is the relative phase between the s- and p-polarizations of the incident light. FIG. 6C shows a cross section of the plot in FIG. 6B for s- and p-components in the ratio 0.8:0.2. Specifically, the relative phase difference is shown for 0 degrees 604A, 60 degrees 604B, 90 degrees 604C, and 180 degrees 604D. In this figure, the transmission is not monotonic, but increases to a maximum incident angle and then decreases. FIG. 6D shows the same plot but with the ratio of s- and p-amplitudes reversed, 0.2:0.8. Specifically, the relative phase difference is shown for 0 degrees 604A, 60 degrees 604B, 90 degrees 604C, and 180 degrees 604D.

To mitigate this effect of AOI on transmission, birefringent elements may be introduced to modulate the polarization of the light. For example, an A-plate, and O-plate, or a C-plate may be used to compensate the polarization of the light. If it is desired to extinguish the light completely, then the birefringent element is designed to minimize transmission. In some embodiments, the transmission is not necessarily minimized, but its gradient is minimized to improve the uniformity of transmission with incident angle. If T is the transmission of the light to be extinguished, an example minimization procedure would be:

$$\|\nabla T\|_{l2} \quad \text{(Eq. 3A)}$$

$\|\nabla T\|_{l2}$ minimize, $$\text{subject to } \begin{pmatrix} A_s' \\ A_p' \end{pmatrix} = \prod_j^N M_j(\theta, \varphi) \begin{pmatrix} A_s \\ A_p \end{pmatrix} \quad \text{(Eq. 3B)}$$

where l2 corresponds to the standard 1–2 norm. In this optimization procedure, in some embodiments a different norm is used, for example 1–1. In some embodiments, the optimization is performed over the parameters of the matrices $M_j$. In some embodiments, the stray-light transmission $T_S$ is to be minimized, while the ambient-light transmission $T_A$ is to be maximized. In this case, the function to be minimized may be, for example, $\|\nabla T_S - \nabla T_A\|$.

Alternatively, an angle-dependent transmission matrix $\overline{M}$ may be coupled to a second matrix that acts as an inverse to the original:

$$M(\theta, \varphi)\overline{M}(\theta, \varphi) = N(\varphi), \quad \text{(Eq. 4)}$$

which is independent of the angle of incidence on the elements. The inverse matrix may be constrained by the similar restrictions above.

Figure 6E:
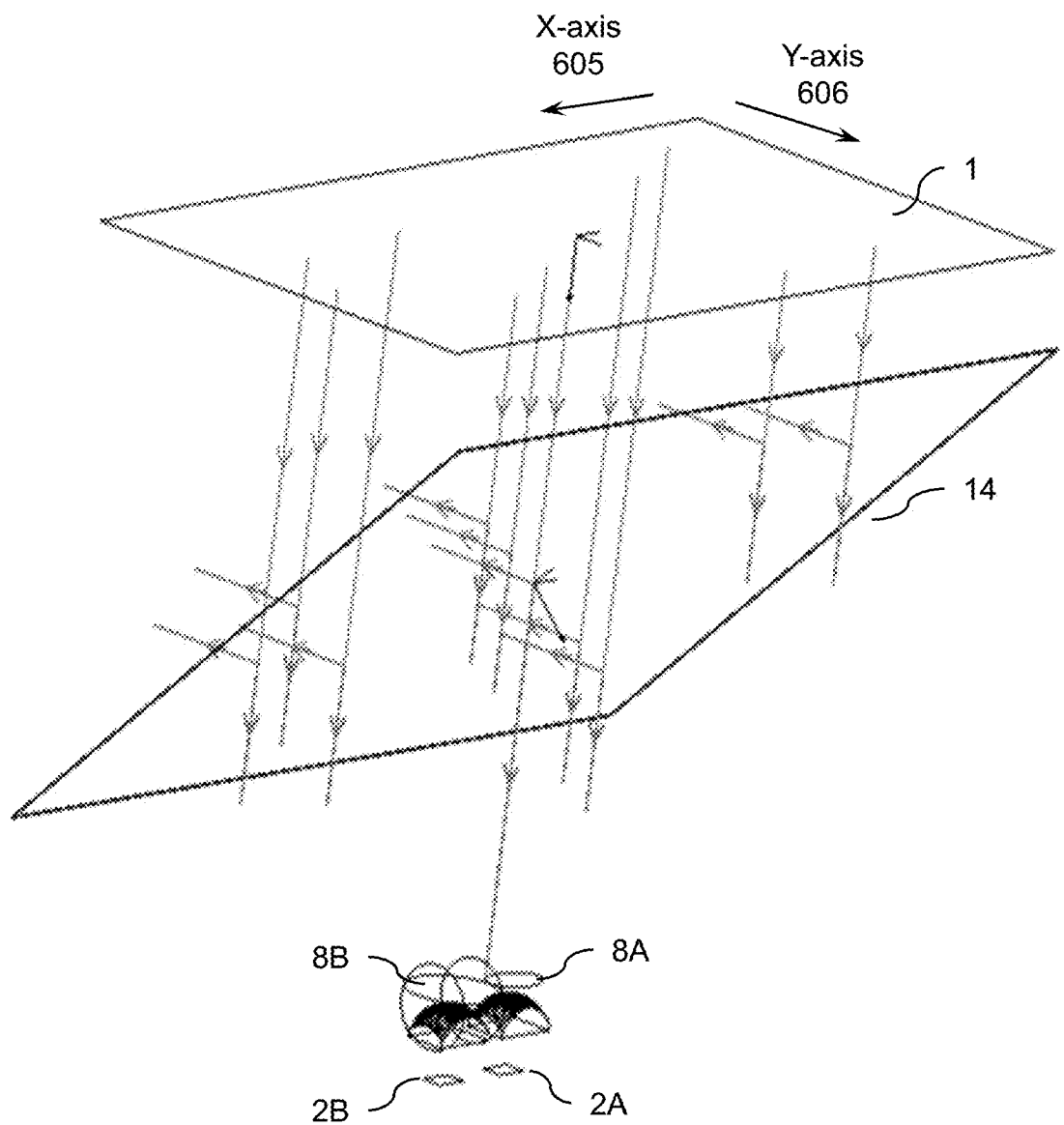

FIG. 6E shows two perspective views of a simulation ray diagram using one of the FECs above to evaluate the crosstalk between the x- and y-polarizations. In this test design setup, display 1 directs light to tilted beam splitter 14 that is placed between the display 1 and two sensors 2A and 2B. The display is x-polarized, i.e., polarized along x-axis 605. Sensor 2A has an absorptive polarizer 8A oriented in the x direction. Sensor 2B has a set of three absorptive polarizers 8B oriented in the y-direction, i.e., along the y-axis 606. Absorptive polarizer 8A is set on top of sensor 2A and perpendicular to the incoming light rays. The three absorptive polarizers 8B are set in such a way that one of them is on top of sensor 2B perpendicular to the incoming rays and the other two are placed on the sides of 2B covering stray rays coming from the sides.

Figure 6F:
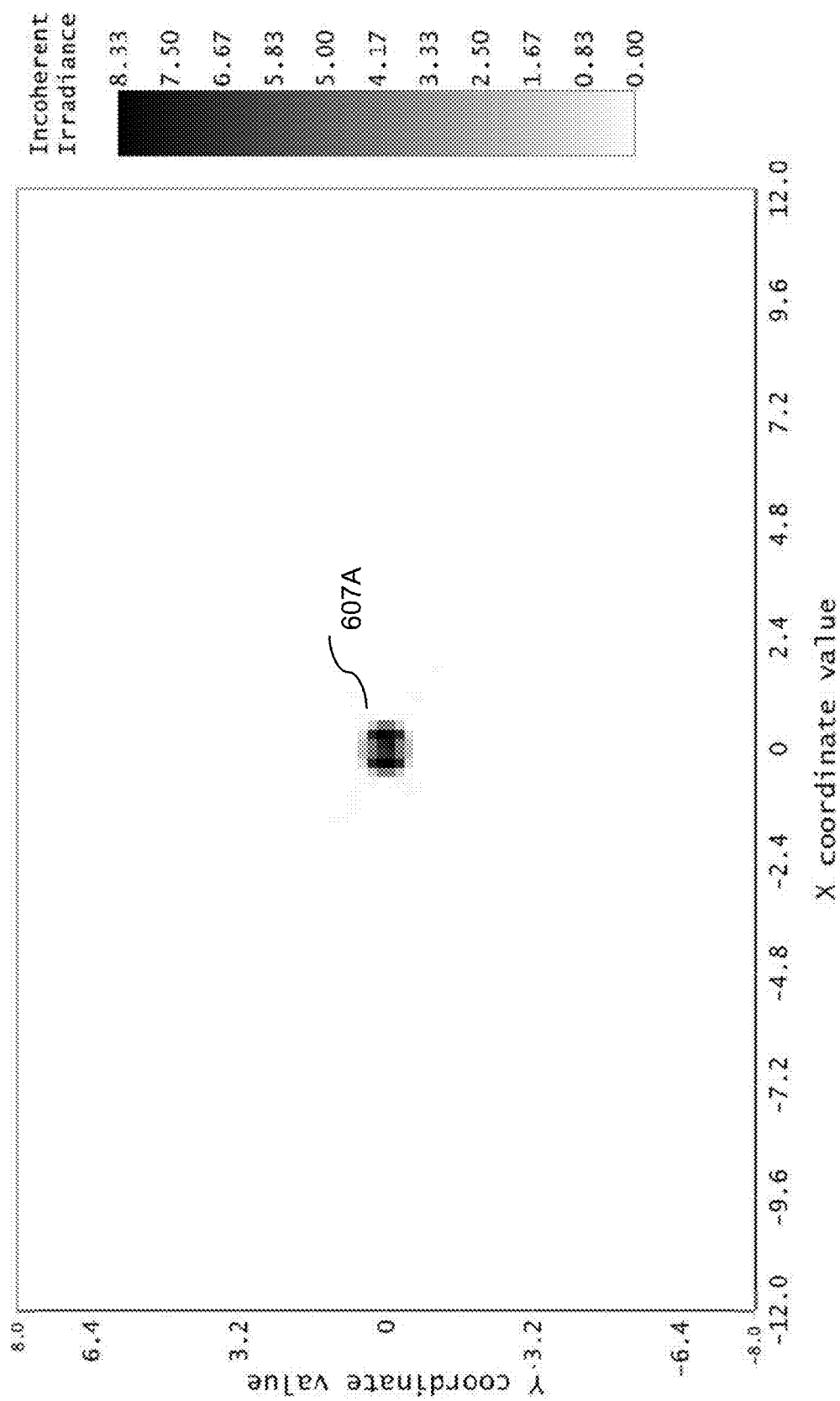
Figure 6G:
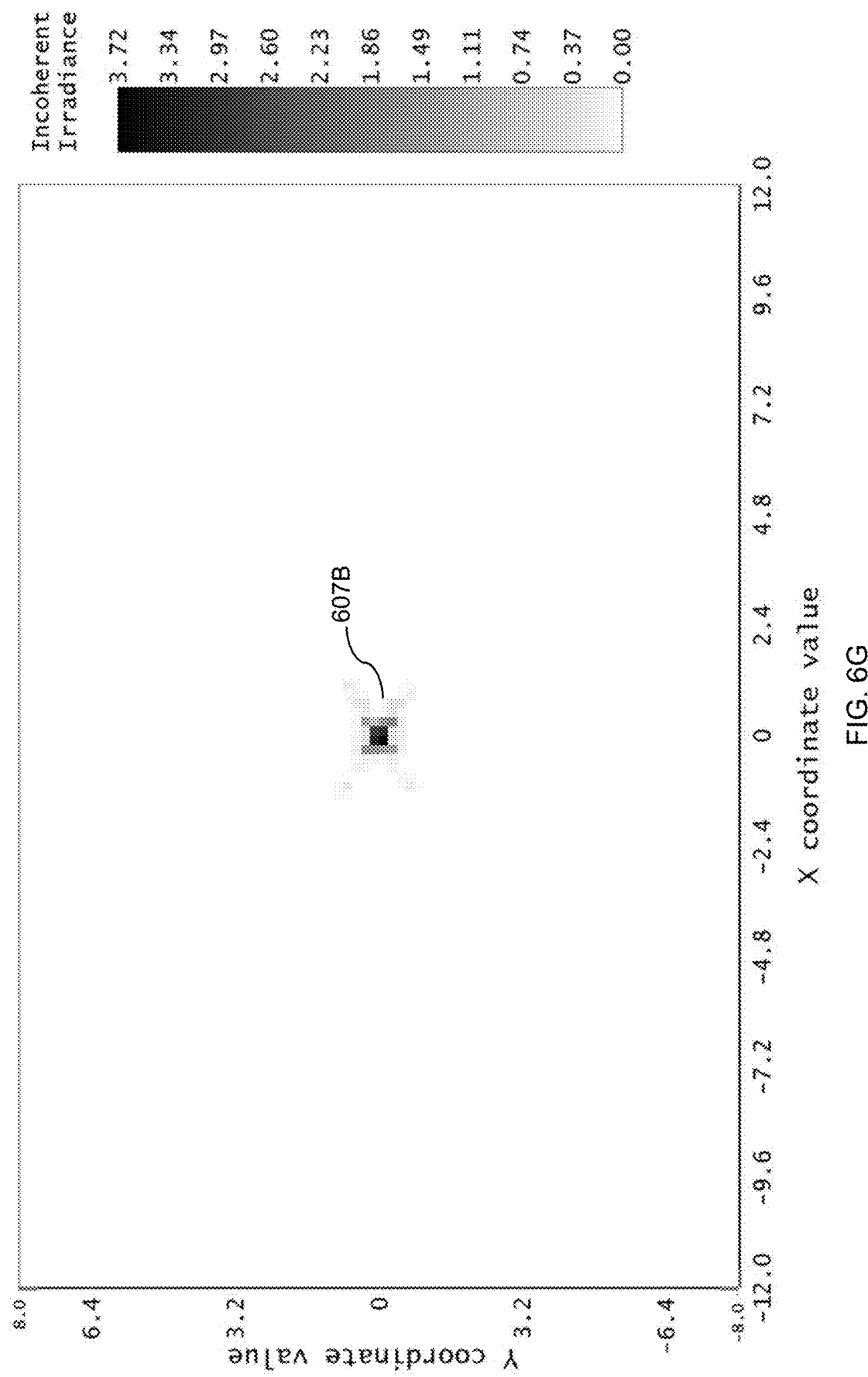
Figure 6H:
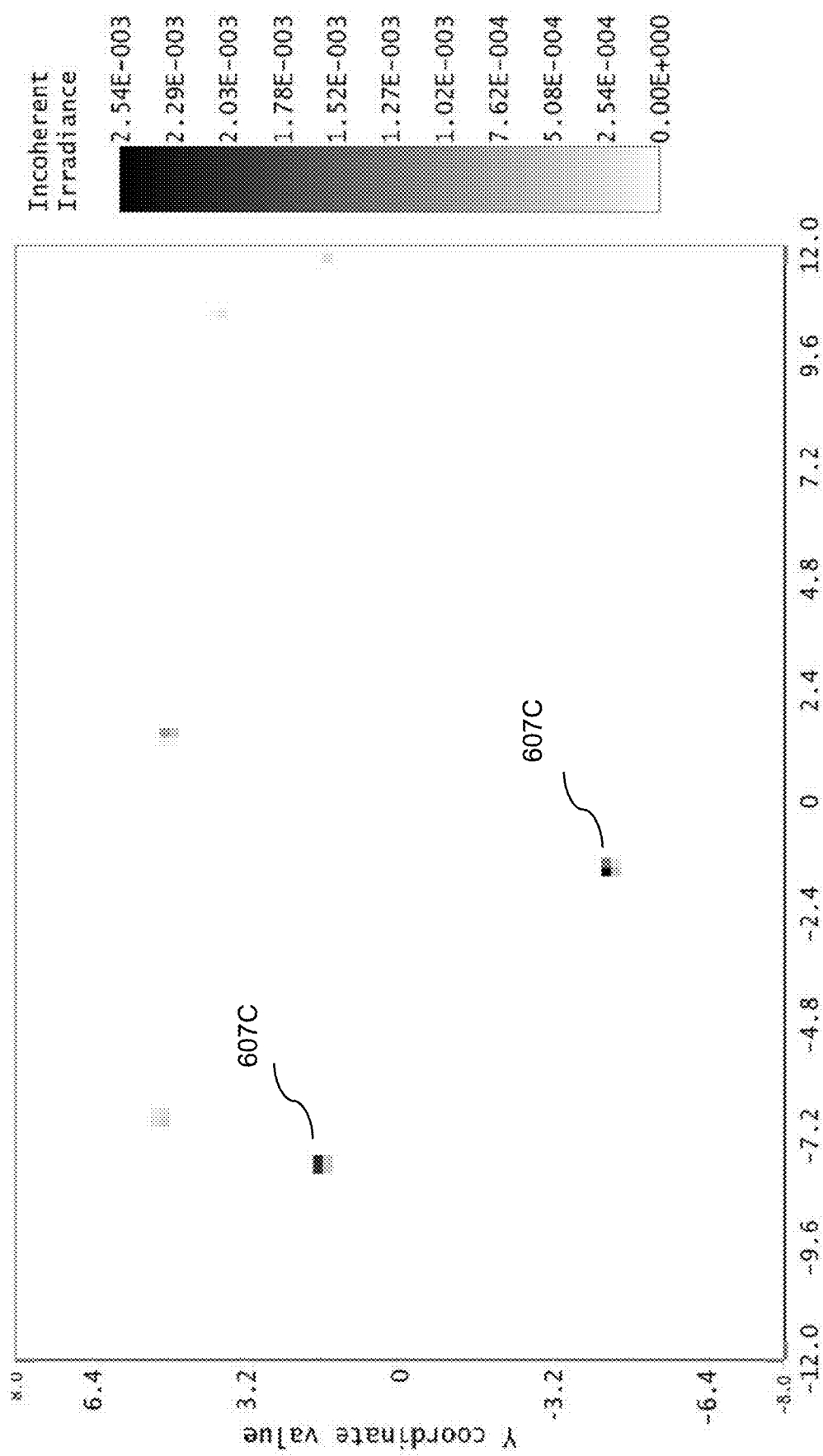

FIG. 6F shows the captured image 607A of sensor 2A, which is expected if display 1 is x-polarized. FIG. 6G shows the captured image of sensor 2B resulting from ignoring the polarizers 8B located on the sides. Captured image 607B shows that part of the polarization in the x-direction leaks into the y-direction due to some internal reflections causing stray rays. FIG. 6H shows the image of sensor 2B considering polarizers 8B located on the sides. The image shows that the leakage of x-polarization into the y-polarization is strongly eliminated with only the appearance of noise 607C.

FIGS. 7A through 7J illustrate different embodiments of virtual imaging systems with coaxial teleconferencing abilities that implement geometry to mitigate stray light from the camera or camera system.

Figure 7A:
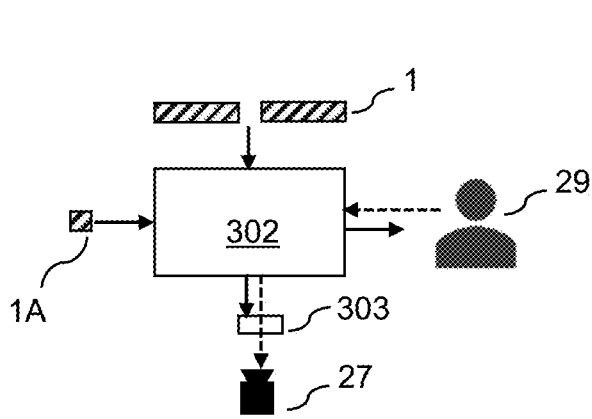
FIGS. 7A through 7J illustrate a set of embodiments of camera systems using different geometries for immersive applications that employ virtual display systems.

FIG. 7A shows an embodiment in which display 1 has a secondary display 1A, where the secondary display shows a portion of the image content. Both display sources emit light into the display optics 302 but from different directions. Both sources send light to a viewer 29. The ambient light from the viewer enters the display optics and is directed to camera 27. In some embodiments, the field of view of the camera is restricted so that any stray light from displays comes from only the smaller secondary display. Any pre-cavity optics or post-cavity filtering, such as a reflection removal module 303, may be smaller and designed for only the secondary display.

Figure 7B:
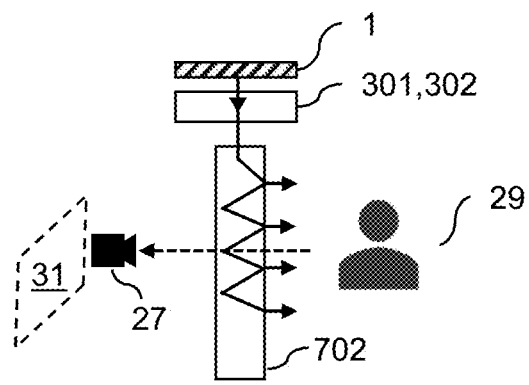

FIG. 7B shows an embodiment in which light from display 1 passes through pre-cavity optics 301 and display optics 302, which may comprise an FEC to produce depth modulation. The light then is coupled into an optical waveguide 702 that leaks the display light on the side facing a viewer 29 who sees a virtual image 31. The outcoupling of the display light may be produced by a surface grating on a surface of the optical waveguide. The optical waveguide allows ambient light coming from the viewer 29 to go through it and reach camera 27. The transparency of the waveguide may be due to a polarization state of the ambient light or a spectrum. Like in FIG. 7A, this embodiment allows separating internal reflections coming from light emitted by display 1 from the image of viewer 29 located outside the system. Unlike other embodiments, the ambient light does not travel through the display optics.

Figure 7C:
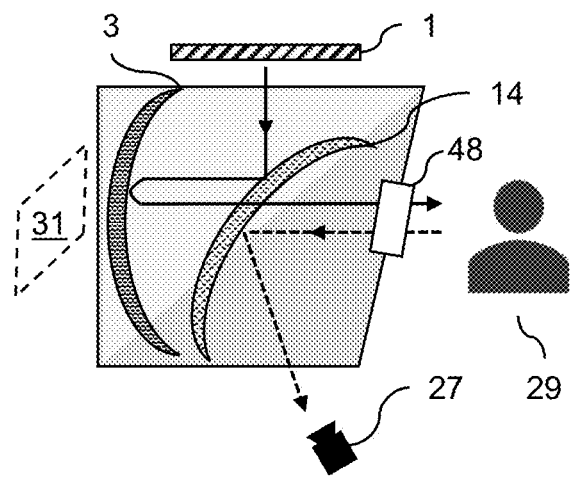

FIG. 7C depicts an embodiment in which light from a display 1 is reflected by a curved beam splitter 14 toward a curved mirror 3, and back through the curved beam splitter to produce a virtual image 31 for a viewer 29. Ambient light from the viewer is incident on an aperture optics 48, reflected by the curved beam splitter, and captured by a camera 27, such the viewer is making eye contact with the camera. In some embodiments the camera is tilted so that stray light from the display does not enter it. In some embodiments, the curvatures of the mirror and beam splitter are designed to produce a real image of the viewer on the camera and simultaneously defocus any potential stray light. The defocused light is consequently dimmer and less noticeable in a captured image. The curvature of the beam splitter, which is a semi-reflector, and the mirror serve to magnify or minify the image, or to adjust the optical path length by directing light rays along different paths that if only flat elements were used.

Figure 7D:
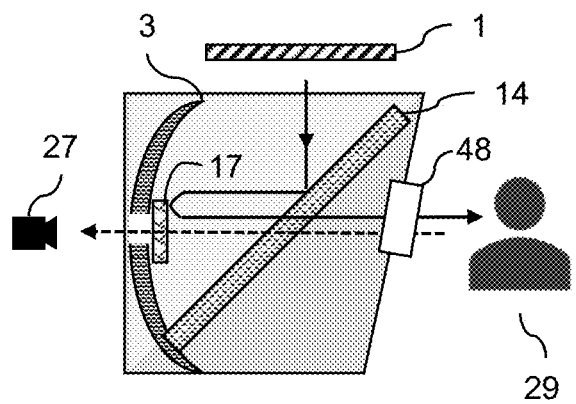

FIG. 7D depicts an embodiment in which camera 27 is placed behind a mirror 3 which has a gap. Ambient coming from viewer 29 is incident on an aperture optic 48, travels through a beam splitter 14 and through a reflective polarizer 17, whose pass angle is oriented to transmit the polarization state of the ambient light. Light from display 1 is first reflected by beam splitter 14. The polarization state of the display light is substantially cross polarized with the reflective polarizer, so the display light is reflected by it and the mirror 3, transmitted by the beam splitter 14 and viewed by the viewer. In some embodiments, the beam splitter is a PBS, and additional polarization profiling is executed on the display light to increase the light efficiency.

Figure 7E:
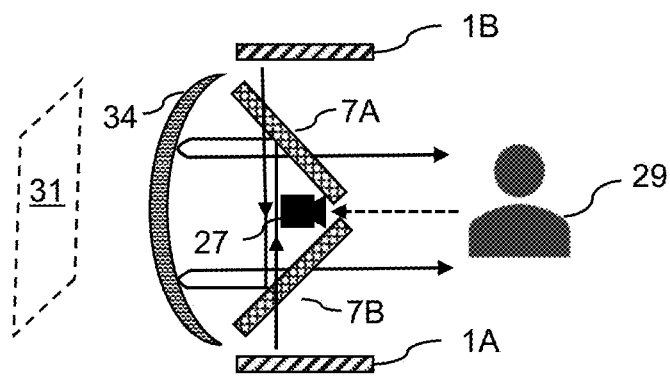

FIG. 7E depicts an embodiment in which two PBSs 7A and 7B are placed such that there is a gap between them allowing ambient light from a viewer 29 to be collected by camera 27, disposed between them. The first PBS 7A deflects light coming from the first display 1A toward a QM 34, and a second PBS 7B deflects light coming from a second display 1B to the same QM 31. The QM reflects the light and rotates the polarization by 90 degrees, such that it goes through the PBSs and produces a virtual image 31 for the viewer 29. In some embodiments, the corners and edges of the PBSs and mirror are designed to minimize the apparent gap between them.

Figure 7F:
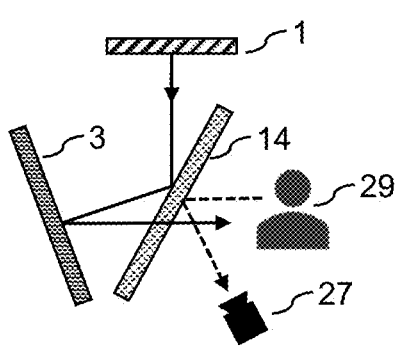

FIG. 7F is an embodiment in which a display 1 emits light that is reflected by a beam splitter 14 and reflected by a mirror 3. In this embodiment, the beam splitter is tilted at an angle different from 45 degrees relative to the vertical. The mirror is also titled such that the display light exits the system horizontally to be viewed by a viewer 29. But because of the tilt of the beam splitter, ambient light from the viewer is tilted in a different direction, toward camera 27. The camera itself may be tilted such that the display is outside the field of view of the camera and therefore the display light cannot enter the camera aperture.

Figure 7G:
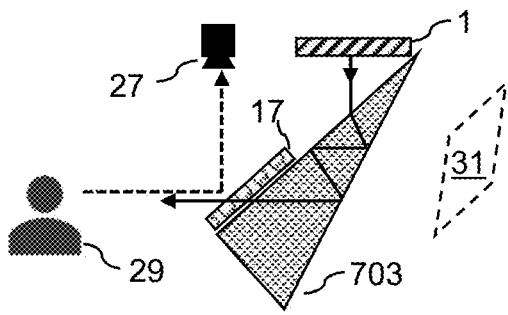

FIG. 7G shows an embodiment that relies on total internal reflection (TIR). Light from a display enters prism 703, which is tilted at an angle. Because of the angle, the light experiences TIR and is reflected multiple times within the prism, until the angle of incidence is such as to be below the critical angle, whereupon it exits the prism. The light, which is polarized along the pass angle of a reflective polarizer in some embodiments, passes through a reflective polarizer 17 to be viewed by a viewer 29 and form a virtual image 31. Ambient light from the viewer is cross polarized with a reflective polarizer 17, reflected by it, and captured by a camera 27. Note here that there is no stray light or leakage between the display and the camera.

Figure 7H:
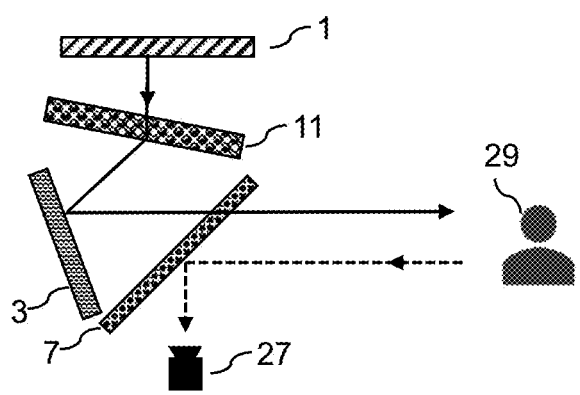

In FIG. 7H, the display optics have a tilted geometry. Light from display 1 passes through an angular profiling layer 11 that directs the rays to a mirror 3, which reflects the light through a PBS 7 to a viewer 29. The angular profiling layer serves to eliminate potential stray light from the display to a camera 27. Ambient light from the viewer (or his environment) is cross polarized with, and reflected by, the same PBS and is captured by the camera.

Figure 7I:
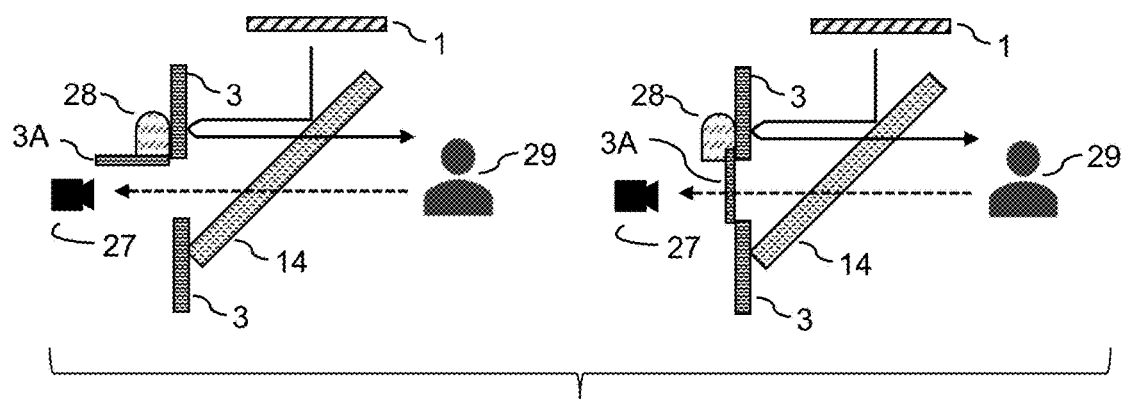

FIG. 7I shows an embodiment in which the display optics includes a mirror 3 that includes a secondary mirror 3A. Light from display 1 is reflected by a beam splitter 14, then reflected by mirror 3 (or secondary mirror 3A, depending on the light ray's position) and is transmitted by the beam splitter in route to a viewer 29. When a mechanical actuator 28 tilts the secondary mirror down, the entire display content is visible for the viewer. When the actuator tilts the secondary mirror up, the ambient light from the viewer can enter the display optics through the beam splitter 14 and be recorded by a camera 27. In some embodiments, the display is synchronized out of phase with the camera, such that the camera is capturing light precisely when the display is not emitting light. In this embodiment, the secondary mirror is moveable by the actuator while the (primary) mirror remains fixed in place.

Figure 7J:
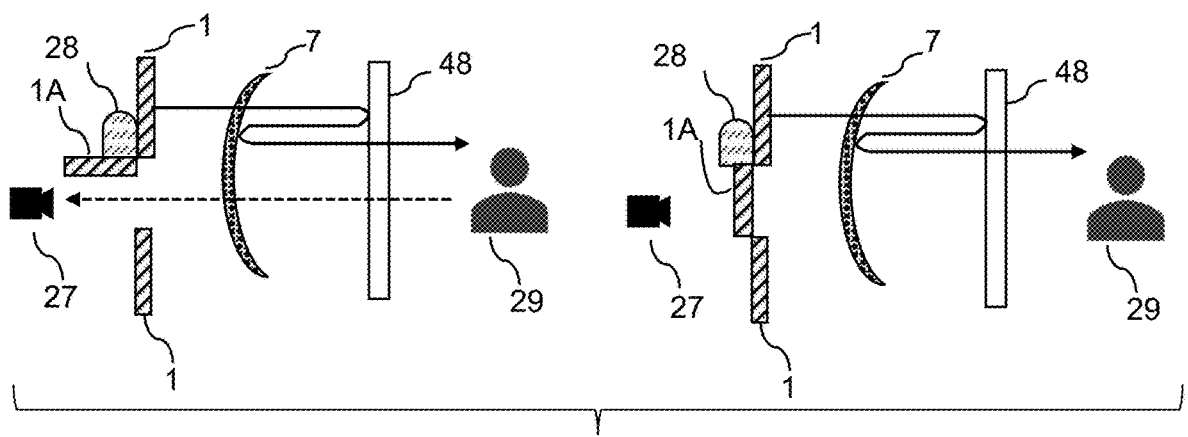
Figure 8A:
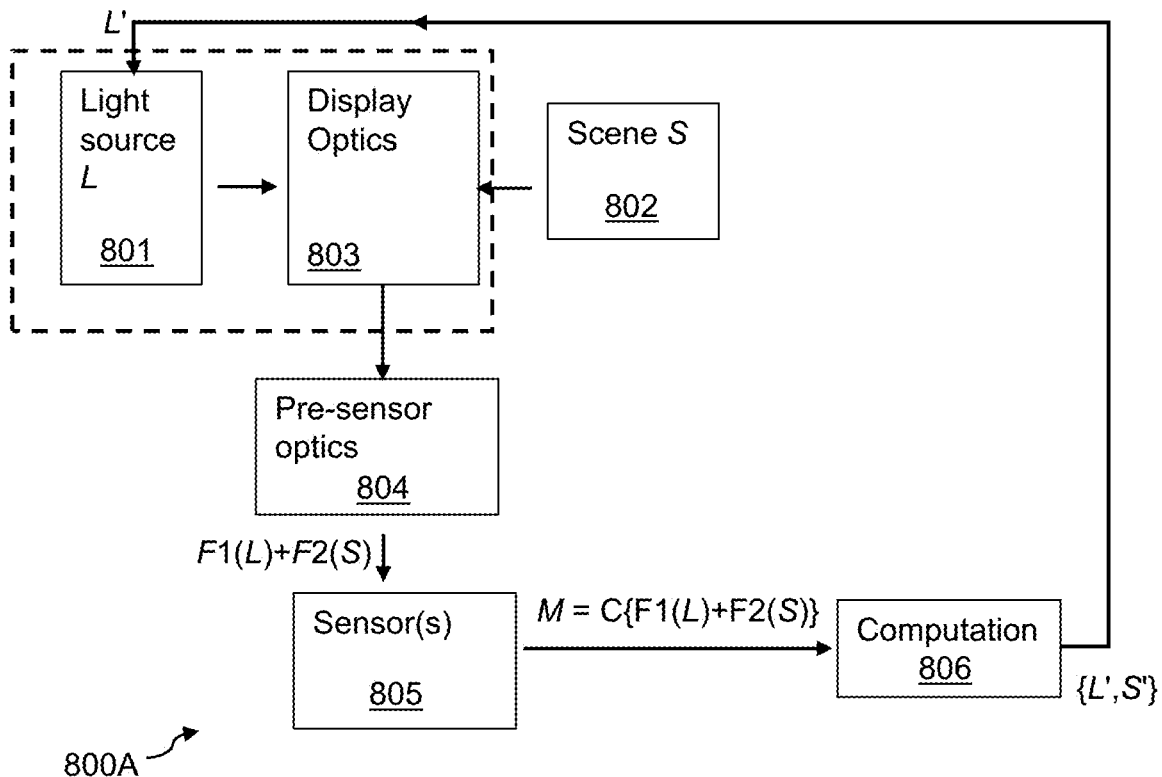
FIGS. 8A through 8N illustrate computational embodiments for use with the present invention using multi-camera systems.

FIG. 7J shows an embodiment in which display 1 has a secondary display 1A that is controlled by a mechanical actuator 28. The secondary display is moved by the mechanical actuator while the (primary) display is fixed. The display emits light through display optics which comprises here a curved PBS 7 and an aperture optic 48. The two elements in combination reflect the light between them multiple times before it exits the display optics to be viewed by a viewer 29. When the actuator tilts the secondary display upward, the ambient light from the viewer enters the display light and is captured by a camera. When the secondary display is tilted downward, the camera is blocked. The motion of the actuator up and down in both FIGS. 7I and 7J are synchronized with the frame grabbing operation of the camera and the refresh rate of the display, such that the camera is capturing light precisely when the display is not emitting light. FIGS. 8A through 8N show embodiments using computational techniques for producing coaxial teleconferencing systems and computing eye-contact images. In some embodiments, the algorithm requires multiple steps, including (1) receiving image information from one or a plurality of sensors, (2) inputting the information into a neural network, which has been trained on a training set of image, (3) outputting separated images of the ambient light (also called the "signal") and the stray light (also called the "reflection"), (4) applying image restoration functions, such as image sharpening, or deblurring to improve the quality of the ambient light, and (5) sending the resulting ambient light to the display for use in, e.g., a teleconferencing application.

In some embodiments, the reflection removal problem is part of the general blind source deconvolution problem, or blind image separation. It can be modelled as the superposition of a reflection image and a background image:

$$I = I_R + I_B, \qquad \text{(Eq. 5)}$$

where I is the resulting image of the scene, $I_R$ is the reflection image, and $I_B$ is the signal image. Most recent algorithms use some sort of neural networks to learn features of the image and identify what is background and what is reflection. In some embodiments, a general algorithmic pipeline is as follows: (1) Receive input image information from a plurality of sensors; (2) Estimate depth using a depth estimation network such as a convolutional neural network. The network may be trained by minimizing a loss function using a stochastic gradient descent method such as:

$$\text{Min} \sum_{n,x} \|A_n(x) \cdot I_n(x) - A_n(x) \cdot I_c(x + B_{n,c} \cdot d(x))\|^2. \qquad \text{(Eq. 6)}$$

where $I_c$ is a reference image, $I_n$ the other images, d is the normalized disparity value, x is the pixel coordinate, n is the index of the images, and $B_{n,c}$ is the baseline difference between the reference image and the n-th image.

The next step is to (3) feed the resulting images from the depth estimation network into an image segmentation network that identifies "signal" and "reflection" features labelled in the images and groups them into single physical objects in the images. The next step is to (4) send the signal and reflection data into an image regeneration algorithm to sharpen blurry edges due to errors in the depth estimation and mislabeling are removed. The curated sharpened and tone-mapped images go into the next step (4), which is a depth mapping network that places the different elements identified in the images in a "signal layer" or "background layer". What is considered "background layer" or "foreground layer" will depend on the application and on the desired perception effect on the user.

FIG. 8A shows a block diagram 800A of such a teleconferencing system. The ambient scene (including a viewer) 802 sends light into a display optics block 803, corresponding to some display optics, such as an FEC. A light source 801 such as a display also sends like into the same optics. The light exits and passes through some pre-sensor optics block 804. In some embodiments the pre-sensor optics block includes the reflection removal module. The resulting signal is function F1 or the light source L and a function F2 of the ambient light S. This light is captured by a sensor or a plurality of sensors in a sensing block 805. In some embodiments, the sensor is a camera or camera system. The resulting mixed images are functions C of the combined functions F1 and F2. Then a computational step 806 extracts the light source and the ambient light source contents to produce computed versions, L' and S', respectively. In some embodiments, the computed light source L' is sent to the light source to update the display content for a subsequent frame.

Figure 8B:
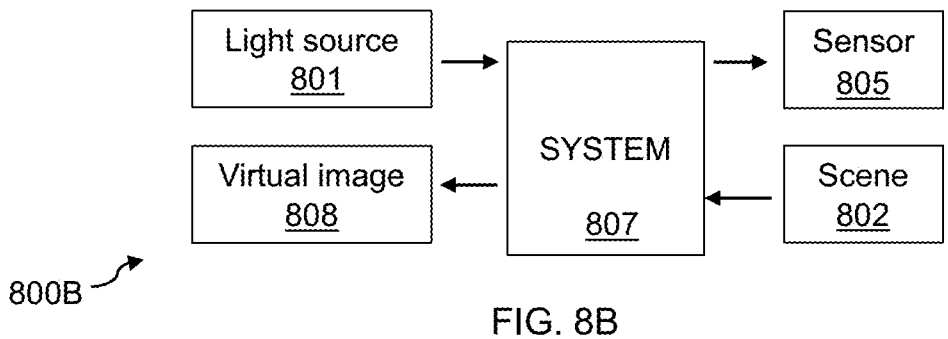

FIG. 8B depicts a high-level block diagram 800B of the entire system, which can be viewed as a two-port scattering system. The incident signals are the light source 801 and the scene 802, which are scattered by the system 807. The scattered components are the information on sensor in sensor block 805 and the virtual image in the virtual image block 808, ultimately viewed by a viewer. If the system is a linear system, it can be represented by a scattering matrix $C_S$, with input matrix A (two components: light source and scene) and output matrix B (two components: virtual image and sensor capture): $B=C_S A$. Ideally, the scattering matrix is the identity matrix. Stray light corresponds to off-diagonal components of the scattering matrix.

Figure 8C:
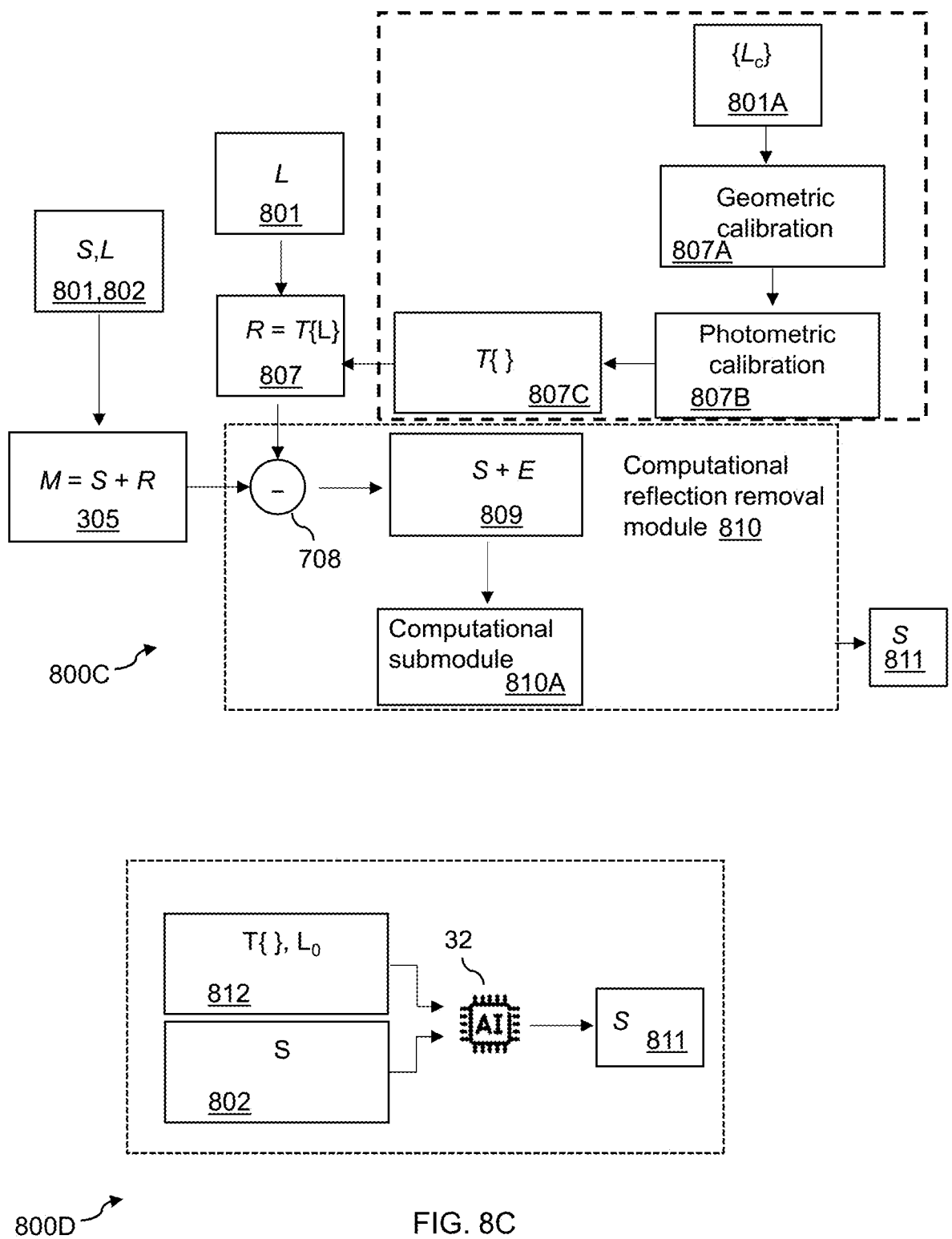

FIG. 8C shows a first block diagram 800C of a method of removing stray light from the captured ambient light and a second block diagram 800D that shows additional or secondary operations. In the first block diagram, the ambient scene light 801 and display light 802 are captured by sensors as a mixed signal M 305. In some embodiments, M is the linear superposition of the two. In some embodiments, M is a nonlinear function of the two sources of light. The light source itself is a display in some embodiments, such as an LCD or OLED panel. The display image that is shown on the display may be computationally transformed and operated on by an operator T{ } to produce a reflection image 807, i.e., the computed stray light in a camera. R and M enter a computational reflection removal module 810. The reflected image R is subtracted from the M in subtraction step 807 to produce the ambient light image without stray light. In some embodiments, the ambient light image may have an error E 809, and a secondary computational submodule 810A reduces the error to produce a final captured image S 811.

In some embodiments, the transformation operator is calculated by inputting a set of calibration images {$L_C$} 801A into a geometric calibration step 807A and a photometric calibration step 807B to calculation the transformation T 807C that is used to determine the operator. In this embodiment, the calibration steps include physical modeling of the display optics, any nonlinearity or spectral sensitivity of the camera, and noise in the system.

The secondary block diagram 800D acts as an alternative to the subtraction step above. In some embodiments, the transformation operator and training data {$L_0$} enter an AI module 32 along with the ambient light image 802. The AI module then separates the ambient light from any stray light to recover S 811. In some embodiments, the AI module is a neural network, and the training data are a set of mixed images, measured reflection images, and/or scene images. In some embodiments, the neural network uses an encoder/decoder architecture. In some embodiments, it is a CNN or GAN.

Figure 8D:
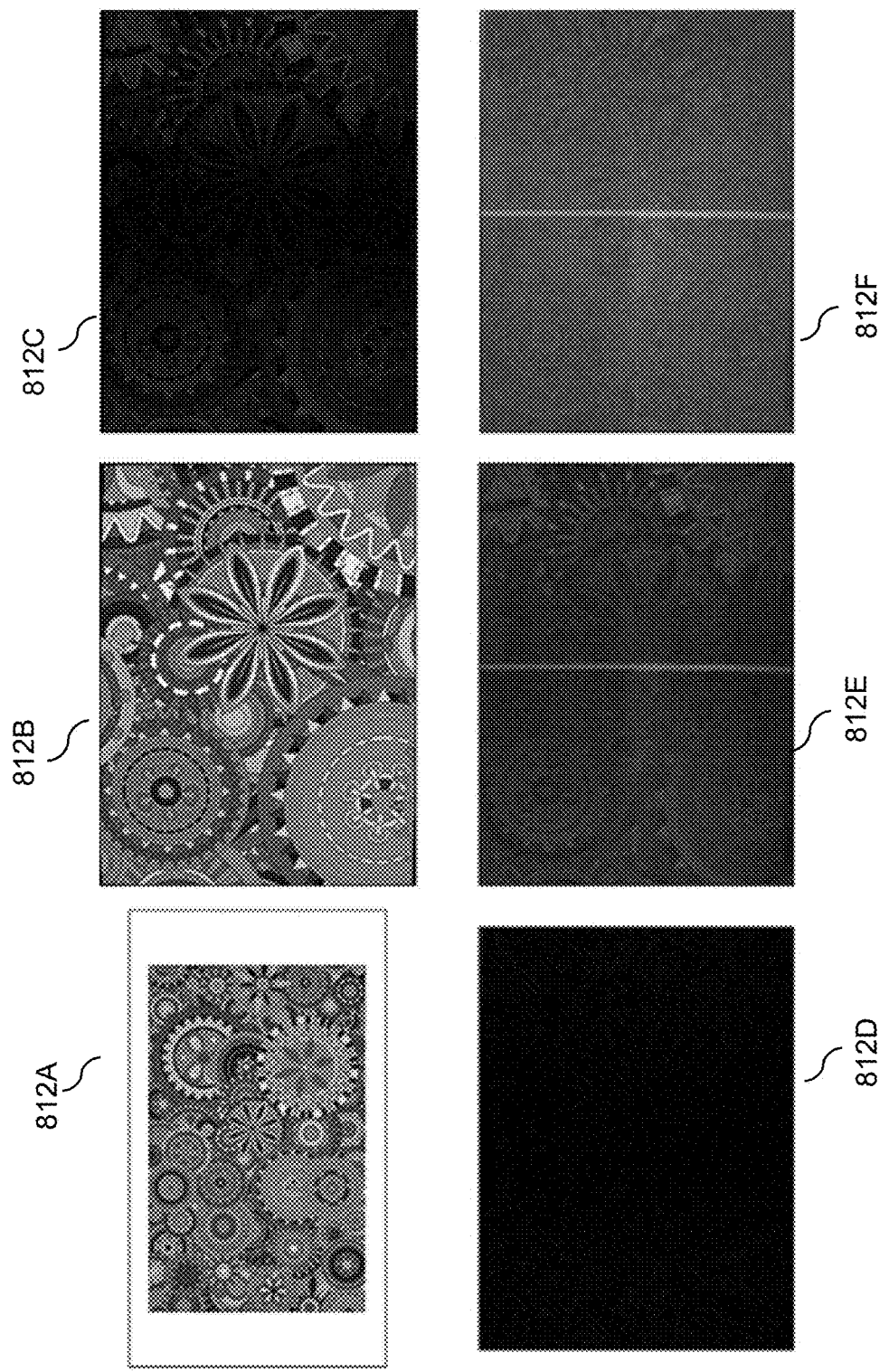

FIG. 8D shows example results of stay-light removal of stray light removal for an embodiment of the block diagram of FIG. 8C. A display image 812A (the light source L) is calibrated 812B to produce a calculated reflection 812C (R), such that the difference 812D between it and the measured stray light is negligible. From the mixed signal 812E (M) is subtracted the calculated stray light to produce an ambient light image 812F (L'). The calibration images are not shown.

If the incident stokes vector is a sum of two different light sources, e.g., stray light from a display and ambient light from a viewer: $S=S_A+S_D$, the following algorithm may be used to separate the components, considering the two-camera case. A first polarizer over a first camera produces a first captured intensity that is a first linear combination of the display (reflection) and ambient (signal) intensities: $C_1=a_{11}I_A+a_{12}I_D$, and likewise for a second camera and polarizer: $C_2=a_{21}I_1+a_{22}I_2$. This is a matrix multiplication $C=AI$, where C is the column vector of camera images, A is the 2×2 matrix of coefficients $a_{ij}$, and I is the column vector of input intensities. The individual intensities may be independently computed by the inverse: $I=A^{-1}C$.

In some embodiments, the camera may introduce nonlinearity in the detected images, such that a camera image $C_i$ may be a nonlinear function $f$ of the two intensities, e.g., $C_1=f(b_{11}I_1+a_{12}I_2)$. In this case, the camera must be calibrated to invert this function. One way of calibrating is to introduce known intensticis into the camera, measure the captured intensity, and create a look-up table to invert captured intensities back to the physical ones. In some embodiments, the calibration must include parameters of the other parts of the system, such as the distance to the display, the polarization of the display light, and the like.

In some embodiments, the algorithm may be a neural network, which consists of an input layer, at least one hidden layer, and an output layer. The input layer is the set of recorded images, and the output layer is the set of desired intensity images. The input and output layer are connected by hidden layers. Each subsequent layer is a function of the previous layer. For example, in a CNN, a node in a layer may be a linear combination of multiple nodes in the previous layer.

Such an algorithm involves inputting training data into the neural network: measured recorded images are propagated through the network and produce output. The output is compared by a suitable norm to the known images of the training data, and a cost function is computed. The cost function may involve the difference between the known images and the calculated ones in the output layer. The output may be backpropagated through the network to recover the input layer data. The parameters of the network (e.g., the weighting parameters) are adjusted until the cost function is minimized. Then, the neural network is trained and will produce recovered images for non-training data, e.g., a set of images of "live" ambient light and stray light. In principle, a neural network algorithm may be implemented with or instead of polarization diversity algorithm. The speed, efficiency, and accuracy of the neural network may be arbitrarily engineered.

FIG. 8E shows an embodiment that may use the computational removal method of FIG. 8A. Display 1 emits light into display optics 302 along with some ambient light. Ambient light, which is incident on an aperture optic, and some stray light exit the system. Some of the light is reflected by a reflective polarizer 17 to be detected by a first camera. The orthogonal polarization is transmitted by the reflective polarizer and reflected and rotated in polarization by a QM 34; the light is then reflected by the same reflective polarizer and detected by a second camera 27. Both polarization signals enter a polarization-based computational reflection removal module 813 to extract the ambient light and eliminate the stray light. FIG. 8F shows a similar setup in which the light transmitted by the reflective polarizer 17 enters the second camera directly.

Polarization diversity involves passing light through a plurality of polarization-dependent elements, each one coupled to an imaging sensor or camera. This includes, but is not limited to the embodiment of FIG. 8E. The incident light has a 4×1 stokes vector S. The components of S are $S_0$, $S_1$, $S_2$, and $S_3$, where $S_0$ is the intensity of the light. Each element has a 4×4 Mueller matrix m. The stokes vector after passing through the element is mS. The intensity recorded by a camera is $P^TMS$, where $P^T=(1\ 0\ 0\ 0)$. For a plurality of N imaging sensors, each capture image $c_i$, where i ranges from 1 to N, each sensor having a polarization-dependent element with a Mueller matrix, the set of images can be stacked in an N×1 column vector C, which is computed from the incident stokes vector S via a polarization matrix M: C=MS. The entries $i^{th}$ row of M correspond to the first row of the Mueller matrix corresponding to the element in front of image sensor i. Generally, M is an N×4 matrix and not invertible. An algorithm to calculate the Stokes vector is to use the pseudoinverse: $(M^TM)^{-1}M^T:S=(M^TM)^{-1}M^TC$. Then with the known Stokes vector, various polarization properties can be calculated. For example, assuming the incident light is linearly polarized, the degree of polarization (DoP) and the angle of polarization (AoP) can be computed: AoP=(½) a tan $(S_2/S_1)$; DoP=$\sqrt{(S_1^2+S_2^2)}/S_0$.

FIG. 8G shows a block diagram of the example embodiments of FIGS. 8E and 8F. The reflection removal module 303 is a polarization subsystem and includes the reflective polarizer and QM of the above embodiments. In some embodiments, the geometry and polarization components differ. For example, in some embodiments, four polarization detections are used instead of two. In some embodiments, the polarization components detect circular polarizations. In some embodiments, the polarization is tuned by a voltage applied to liquid crystal.

The polarization of the ambient light 802 and that of the display light 801 differ, such that the polarization-based computation reflection removal module 810 captures multiples images $C_1\ldots C_N$. The first image 814A $C_1$ may have a first ratio of ambient light to display light, and the n-th image 814B $C_N$ may have an nth-ratio. The different ratios are used to computationally separate the two incident light bundles. In some embodiments the polarization-based computational module uses independent component analysis. In some embodiments, it uses a neural network.

Figure 8H:
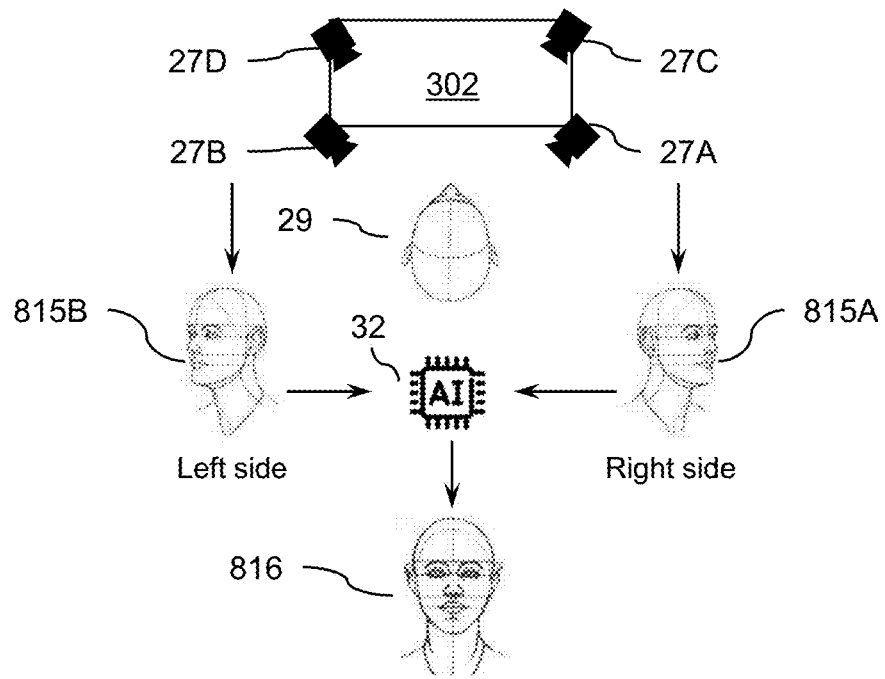

FIG. 8H depicts an embodiment in which a plurality of cameras 27A, 27B, 27C, and 27D are placed around display optics 302 to capture right-side perspectives 815A and left-side perspectives 815B of a viewer 29. The left- and right-side perspectives are fed into an AI module 32 that composes and generates a full-frontal perspective 816 of viewer 29 in which the viewer looks as if he is making eye contact. Computation modules include, but are not limited to, image stitching and image fusion. For example, in some embodiments, a neural radiance field (NeRF) may be used to synthesize a perspective of the viewer such that the viewer is making eye contact with a camera, i.e., to compute an eye-contact image. The NeRF collects a set of images from various camera viewpoints, uses a neural network (such as a feedforward neural network) to model the 3D scene of the viewer and his environment by mapping a scene coordinate to the color at that coordinate, and renders novel views of the viewer/environment. NeRF is trained usually with supervised learning and volume rendering and minimizes a cost function error between the predicted radiance and the actual observation.

The algorithm for NeRF includes collecting training images and reconstruction new perspectives. Specifically, each point in a 3D scene may be modeled as a density and a color. Light travels from a scene to a plurality of cameras along line corresponding to a light ray. Each pixel is an integral along the ray of the colors and densities. Training data is collected. These data are images of a known scene. The pixel data (line integrals) are back propagated to reconstruct the 3D scene. The 3D scene points are then forward propagated to a synthesized perspective. A neural network may use parameters to produce the novel perspective, the parameters adjusted during training to miminimize a cost function, which generally compares the computed scene to the actual scene. Rendering the novel view may be computed using the rendering equation. It may use a ray casting technique.

Figure 8I:
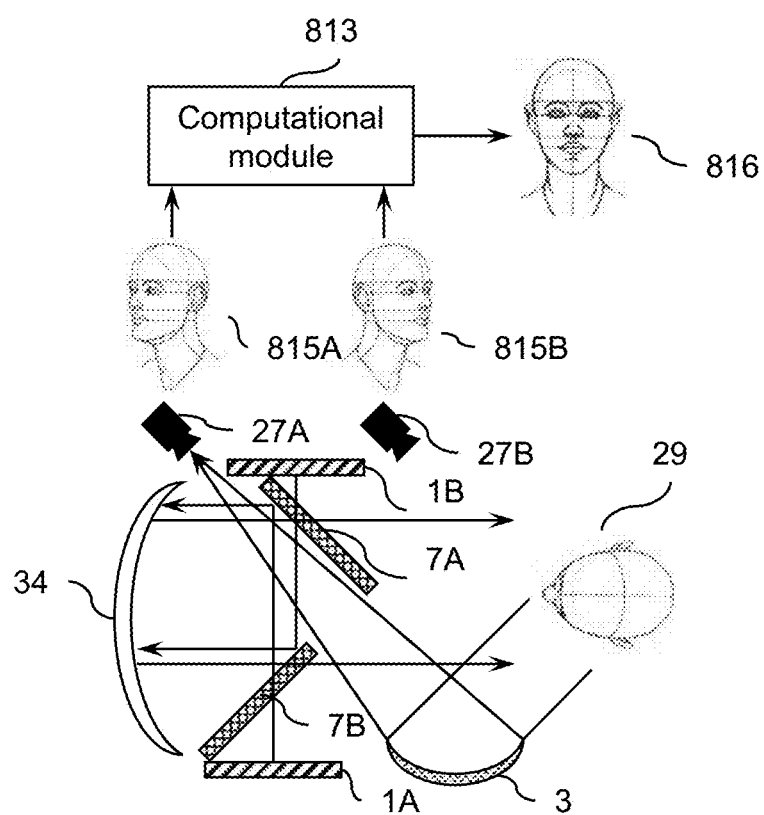

FIG. 8I depicts an embodiment in which two cameras 27A and 27B capturing the left-side perspective 815A and right-side perspective 815B of a viewer 29 are located on one side. Two PBSs 7A and 7B are set such that they leave a gap between them through which the perspective view opposed to the side where cameras are placed is focused on camera 27A by a focusing mirror 3. PBS 7A directs light from display 1A to QM 34, and polarization dependent beam splitter 7B directs light from display 1B to QM 3 as well. The QM reflects the light and rotates the polarization such it passes through the PBSs and is directed to a viewer 29. Computational module 813 composes and generates a full-frontal perspective 816 of viewer 29. Computation module includes, but is not limited to, image stitching and/or image fusion. In some embodiments, NeRF is employed, and the computational module is an AI module. In this embodiment, the cameras also capture the viewer at different depths (based on the mirror focal length). This information may be used to obtain depth information about the scene. In some embodiments, the mirror slightly defocuses the images to gather more information about depth.

Figure 8J:
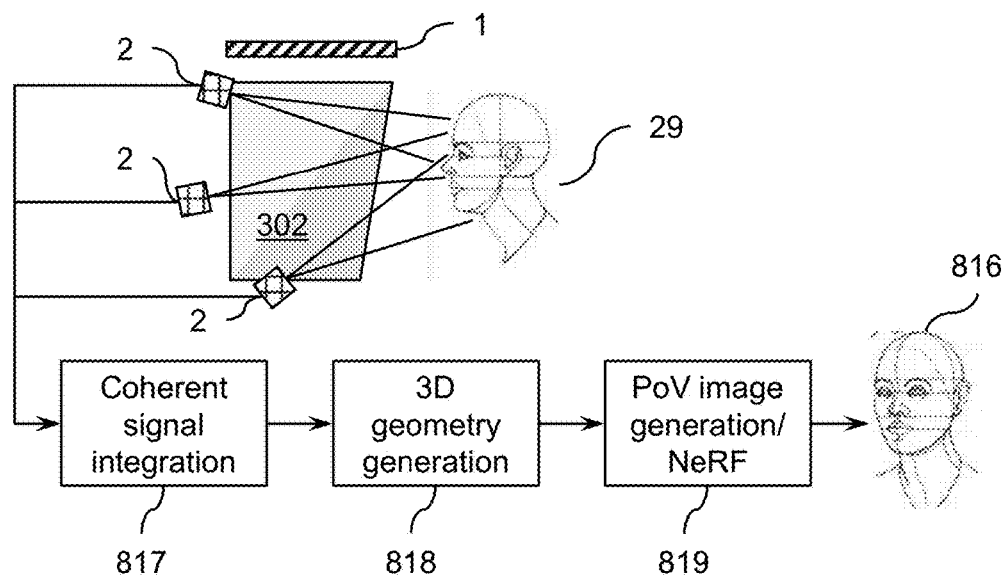

FIG. 8J depicts an embodiment in which multiple imaging sensors 2 capture different perspectives of a viewer 29. The capture timing among all sensors is synchronized to provide a coherent (synchronized) signal for coherent signal integrator 817 in order to generate images in a synthetic aperture manner. The different synthetic generated images are fed into a 3D geometry generation module 818 from which a full-frontal perspective 816 of viewer 29 is generated by a PoV image generation module 819, which may include, but not limited to, NeRF methods to generate a realistic perspective.

Multiple cameras or imaging sensors alleviate the underconstrained problem of reflection removal. A given camera pixel (i.e., a give point on the captured image) of a single camera contains an unknown ratio of ambient light to stray light. Having multiple cameras allows for correlation between those ratios, for example, by comparing those ratios to perspective shifts depending on camera location.

Figure 8K:
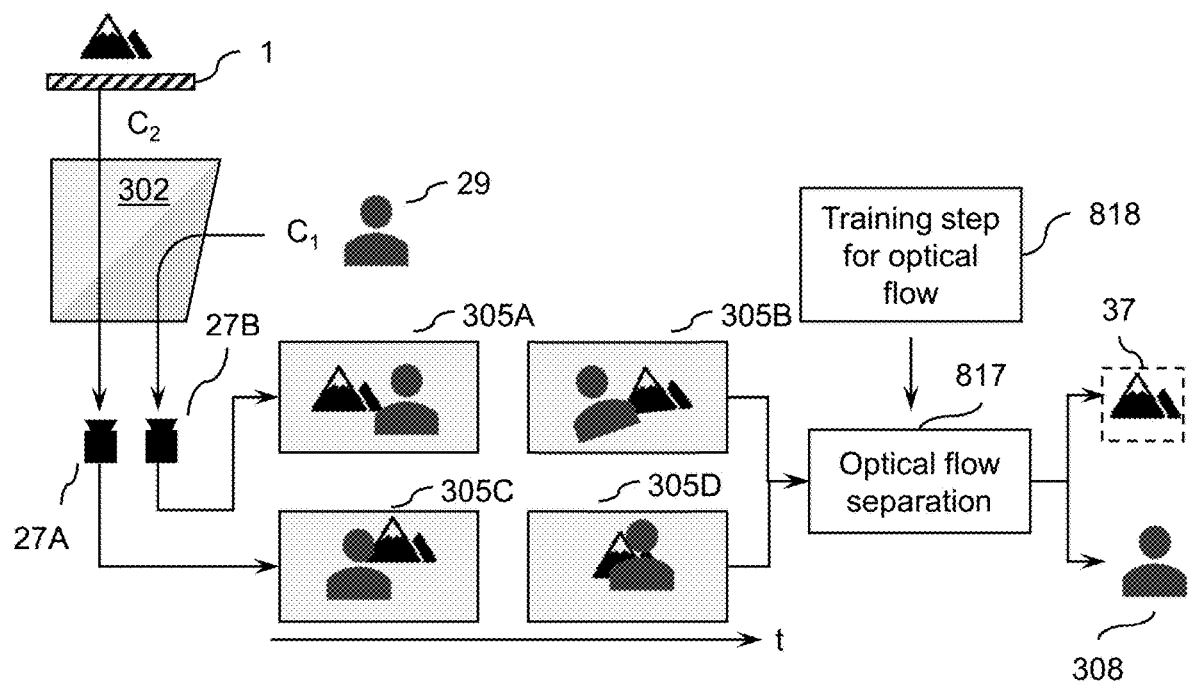

For example, FIG. 8K shows an embodiment using two cameras 27A and 27B to capture the different perspectives of the ambient light of a viewer 29 and stray light from the display 1 after propagation through the display optics 302. The different camera positions produce different parallax shifts of the two bundles of light of a first camera image 305A and a second camera image 305B. Because the display and cameras have fixed positions and orientations, the stray light has a fixed shift that can be calibrated based on the system geometry. In some embodiments, the display is closer to the cameras than the closest in-focus plane of the ambient light. In some embodiments, it is farther than the farthest in-focus plane of the ambient light. Further, as time evolves and the ambient light and display change, different images are captured:

a third image 305C and a fourth image 305D. In some embodiments, the temporal variation is not used, and computations rely on camera images at a single instant. The different optical flow, based on the different perspective shifts, is used by an optical flow separation block 817. In some embodiments, the block is calibrated with a training step for optical flow 818. In some embodiments the optical flow separation is a neural network. The result is a captured image 308 that is separate and free from stray light. In some embodiments, the display image is updated to produce a modified virtual image 37.

Figure 8L:
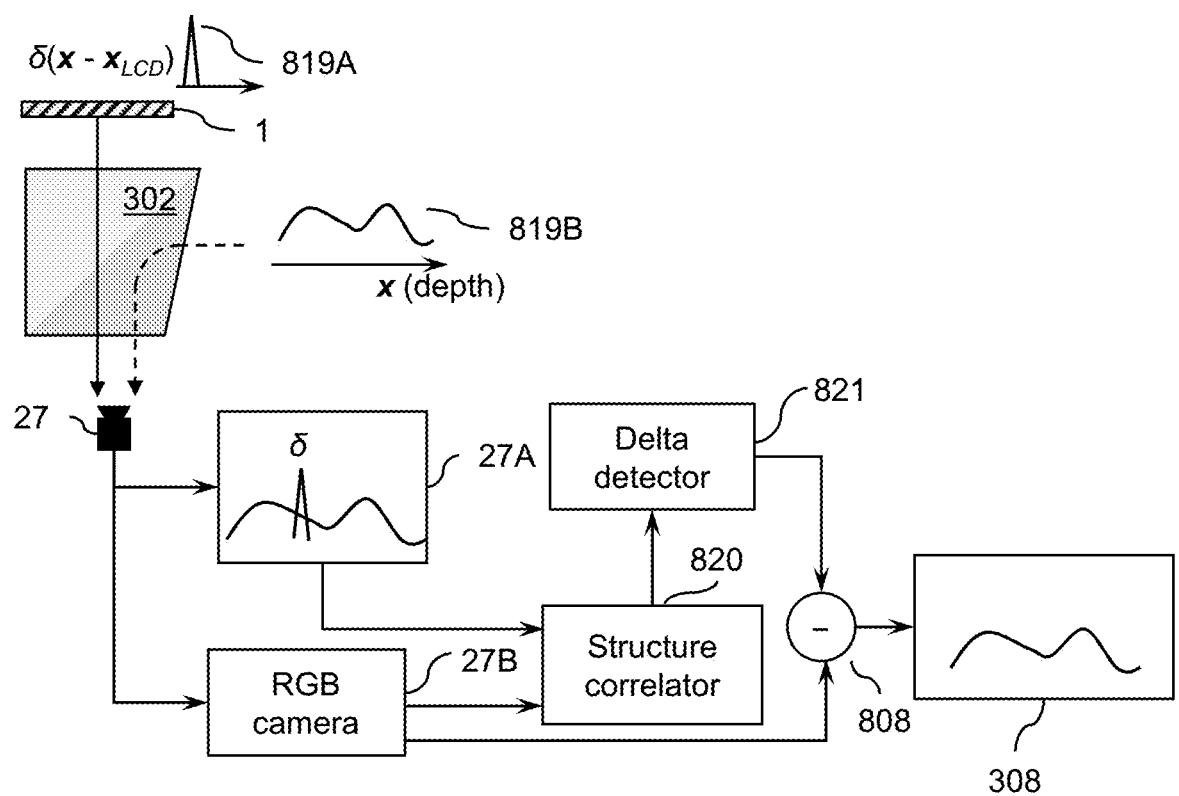

FIG. 8L shows an embodiment that relies on depth measurements and depth-image fusion. Display 1 emits light into display optics 302, and some stray light is detected by a camera 27 which records a conventional color image 27B and a depth image 27A. In some embodiments the color image is an RGB image. In some embodiments, the depth measurements are executed by a different camera than the color measurement, such as a stereo camera or ToF camera. The depth of the entire display panel is constant, corresponding to delta function 819A, or spike, in its own depth map. The ambient light has a piecewise continuous depth map 819B. The two image modalities, depth and color, are correlated by a structure correlator 820 and the depth of the display image is detected in a delta detector step 821. The correlator makes use of the fact that every camera pixel contains a contribution from the same depth due to the display panel's fixed distance. The display content is then subtracted 808 from the color content to computationally eliminate the stray light from the captured image and produce a captured image 308 of the ambient light only. In some embodiments the depth image is calculated by a ToF camera, which may be an amplitude modulated ToF camera. The stray light in this case can be removed by using ToF illumination at multiple frequencies and computationally processing a phasor sum.

Figure 8M:
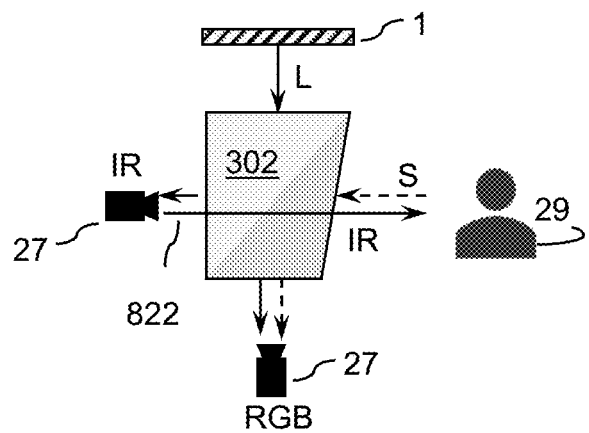
Figure 8N:
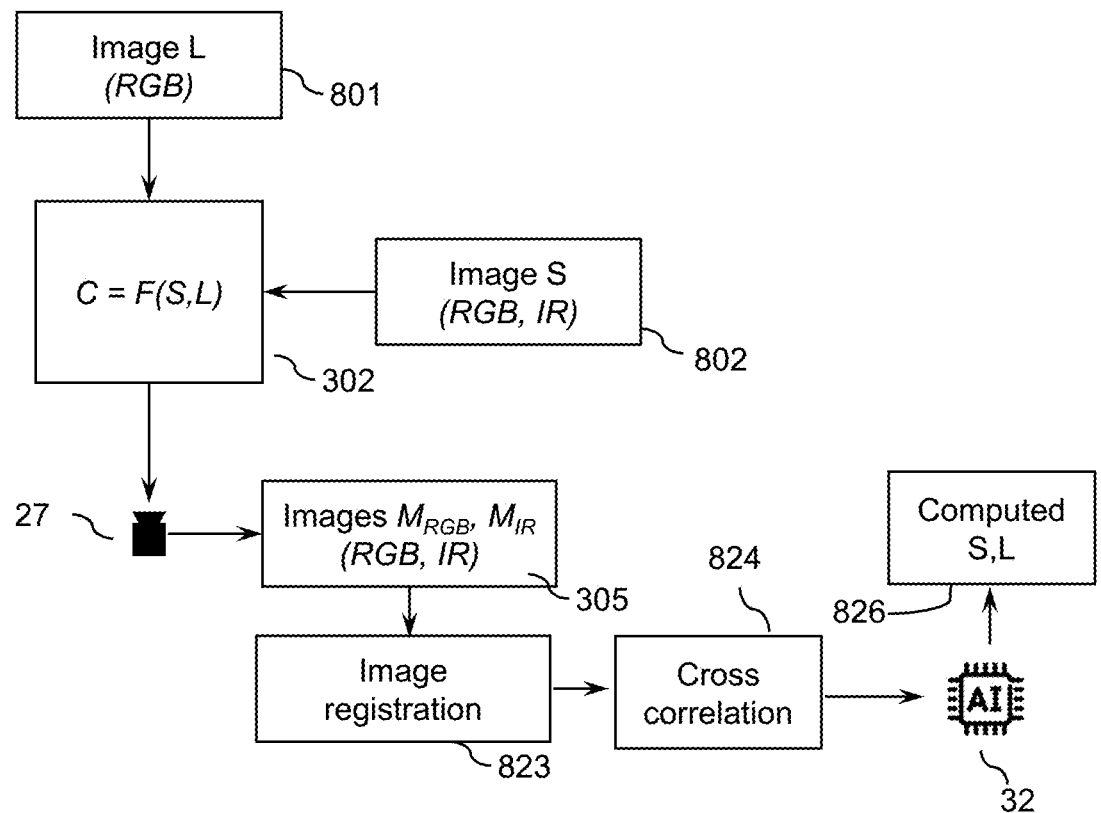

FIG. 8M shows an embodiment that uses image fusion (similar to the depth-image fusion of FIG. 8L). In this embodiment, a display 1 acts as the light source L and emits light into display optics 302, some of which enter a pair of cameras 27. One camera is a conventional color camera (or a grayscale camera), and the other is an IR camera that records electromagnetic signals in the infrared (IR) or near-infrared (NIR) spectrum. Ambient light S from a scene, which may include from a viewer 29, enters the display optics and is also captured by both cameras. Both stray light and ambient light are captured by the color camera, but the display has little or no IR spectral energy/components, so that the IR camera records only, or predominantly, the ambient scene light. In some embodiments, the IR camera is an active camera and emits IR illumination 822, which travels through the display optics, is reflected or scattered by the scene or user, propagates back through the display optics, and is captured by the IR camera. IR captured light is the resulting IR captured image.

A block diagram for executing the image fusion of FIG. 8N is shown in FIG. 8M. The display image 801 has only color components, and the ambient scene light 802 contains both color (e.g., RGB) and IR components. Both enter the display optics 302 and are captured by the cameras 27. Two mixed images 305 are captured in a capture step. One mixed image (e.g., RGB) includes information about both the display and the ambient light, but the other mixed image (IR) contains information about only the ambient light. In some embodiments, the two cameras are physically separated and have a baseline such that they capture slightly different perspectives. An image registration block 823 ensures that the scene points captured in one of the mixed images correspond precisely to the same scene points of the other. The signal enters a cross correlation block 824 which compares the two mixed images together. The correlation extracts the pixels that contain ambient light. The signal then enters an AI module 32 that uses a neural network. This step compares the cross correlated data with a dictionary of training data to output the compute ambient and stray light signals separately. The output step 826 is a computed scene and light source image. The ambient signal is the image ultimately captured by this computational camera system.

Figure 9A:
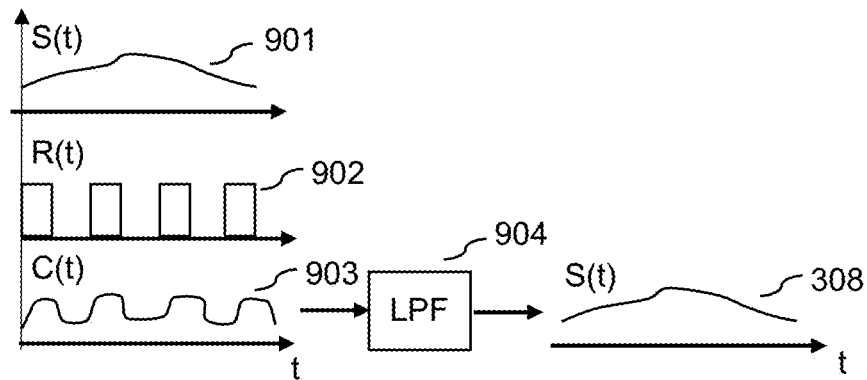
FIGS. 9A through 9D illustrate computational filtering methods to use with the optical system based on frequency content of the display source.
Figure 9B:
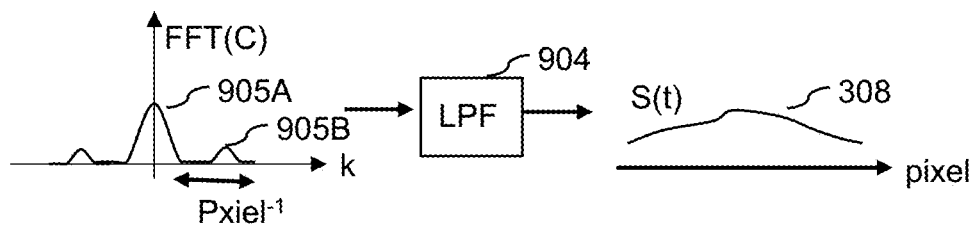

FIGS. 9A through 9D depict a set of filtering methods that use the frequency content of the display image to separate it from the ambient scene light in a computational reflection removal module In FIG. 9, the per-pixel ambient light time variation 901 is slower than the per-pixel stray light time variation 902. This may happen, for example, if the stray light from the display has artifacts due to the display refresh rate of, e.g., 60 Hz, or 144 Hz. The per-pixel captured light time variation 903 is a combination of the two previous time signals. This combination passes through a low pass filter (LPF) 904, which acts as the computational reflection removal module, to eliminate any fast variation, eliminate the stray light and produce a per-pixel output signal 308 that better matches the ambient light. When this filter is executed on all pixels, the resulting captured image 308 has reduced or eliminated stray light. In this embodiment, each graph represents the variation of a single pixel, and the LPF acts on all pixels in parallel FIG. 9B shows a similar filtering method that relies on spatial frequencies. The captured image is spatially Fourier transformed via, e.g., a fast-Fourier transform (FFT) to produce a spectrum that has a lower frequency component 905A and a high frequency component 905B. The high frequency component in some embodiments is due to the pixelation of the display light such that the distance between the two components is approximately the reciprocal of the pixel pitch. The signal passes through a LPF to output signal 308 that matches the ambient light and eliminates the stray light. In some embodiments, the combined signal may pass through a bandpass filter, or high-pass filter, in parallel with the LPF in order to extract the stray light also for further processing. In some embodiments, the spatial spectrum is influenced by microtextures that are imprinted onto the display image content. In this graph, the FFT is a spatial Fourier transform of the mixed image.

Figure 9C:
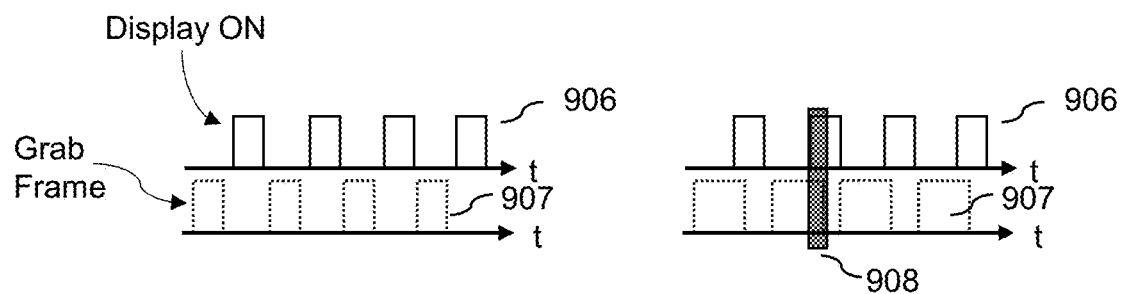

FIG. 9C shows display panel temporal diagram 906, which corresponds to the refresh rate of the display. It also shows a camera temporal diagram 907, which corresponds to the frame grabbing or recording of the camera. If the camera records precisely out of phase with the display being on, there is no stray light. In some embodiments, the synchronization between the two allows for no tray light to be recorded. In some embodiments, the periods of the two signals are not the same (their periods or their duty cycles may differ) such that there is partial overlap 908 of the stray light signal and the frame grabbing signal. In some embodiments, the overlap may be constant for each instant of overlap. In some embodiments, the overlap may differ.

Figure 9D:
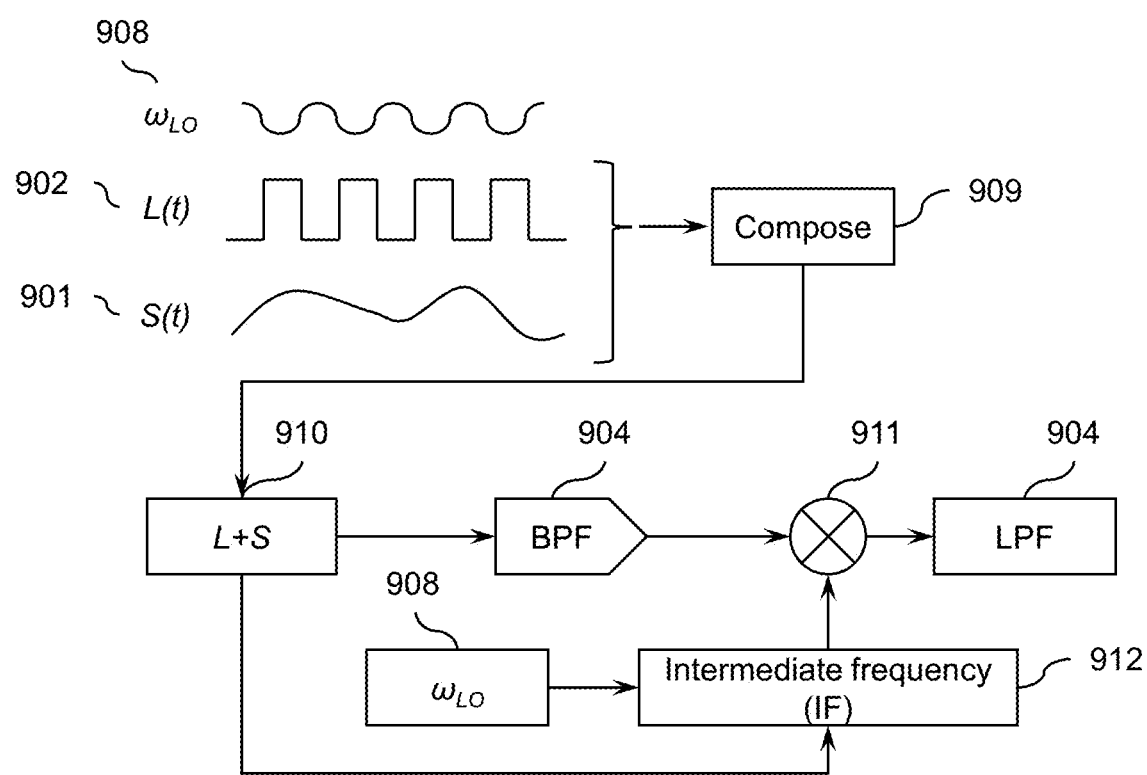

FIG. 9D shows an embodiment that uses a heterodyne filter. The stray light time variation 902 and ambient light time variation 901 are both modulated with a frequency 908 $\omega_{LO}$ set by a local oscillator and then, they are combined in compose step 909 to form a per pixel mixed image time variation 910. Signal 910 is passed through a band-pass filter (BPF) 904, and the resulting signal is fed into mixer 911, which uses, as the intermediate frequency (IF), the difference between frequency 908 and a frequency in the domain of signal 910. The resulting signal from mixer 911 is then fed through a low-pass filter (LPF) 904 to output the desired ambient light signal. In any embodiment that uses a computational reflection removal module, including the filters of FIGS. 9A through 9D, an AI module using a neural network may assist in the reflection removal.

Figure 10A:
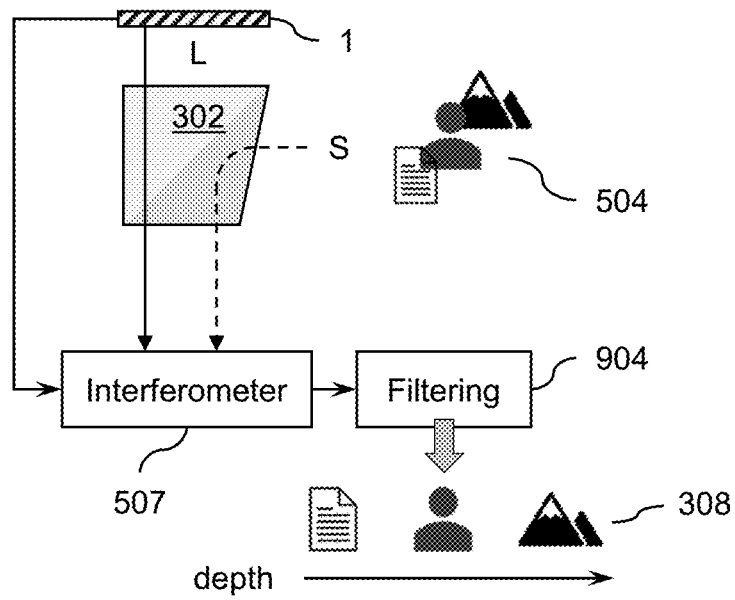
FIGS. 10A through 10D presents alternative embodiments of the combined display/camera system for immersive applications.

FIG. 10A depicts an auxiliary embodiment in which unpolarized light S from a scene 504 with objects at multiple depths is collected by display optics 302 and mixed with partially coherent light L from display 1 into interferometer 507. The interference between S and L light rays allows imaging an object at a certain depth 308 after a filtering stage 904. Depth filtering of signal coming from interferometer 507 could be realized either by changing the relative path between S and L light rays if light L is broadband, or by frequency modulation or chirping if light L is monochromatic.

Figure 10B:
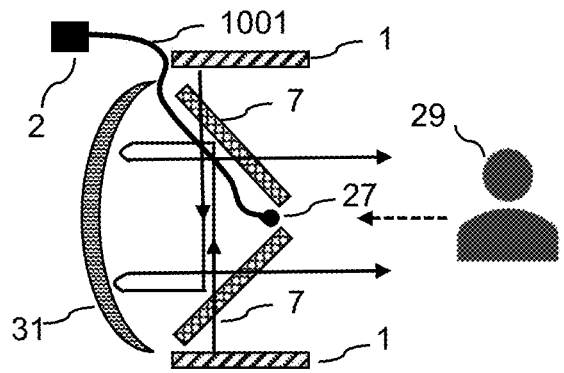

FIG. 10B shows an auxiliary embodiment in which camera 27 is essentially a wide-angle lens coupled to an optical fiber 1001. The fiber directs the ambient light from a viewer 29 to a sensor 2 for image capture. A pair of displays 1 emits light vertically. Each bundle of light is first transmitted by the first polarization dependent beam splitter 7 it sees, and then reflected by the second one toward a QM 31 (quarter waveplate). The QM reflector rotates the polarization by 90 degrees, such that the light is then transmitted by the respective polarization dependent beam splitter, to be viewed by a viewer. The ambient light from the viewer is captured by a small lens coupled to fiber. In this way, the gap between the two beam splitters is minimized.

Figure 10C:
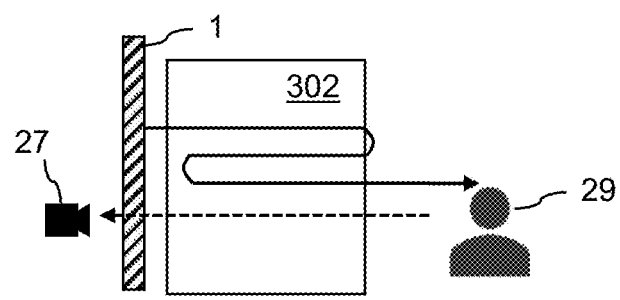

FIG. 10C shows an example of a transparent or a semi-transparent display 1 which emits light into the display optics 301. The light experiences multiple round trips within the optics to be viewed by a viewer. 29. Some ambient light is directed through the same display optics to be viewed by a camera 27 behind the display.

Figure 10D:
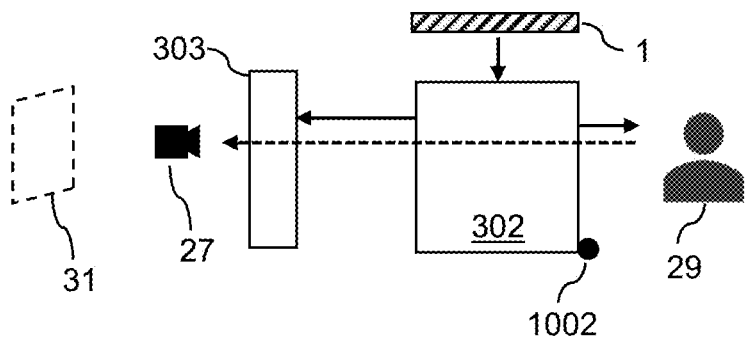
Figure 10D:
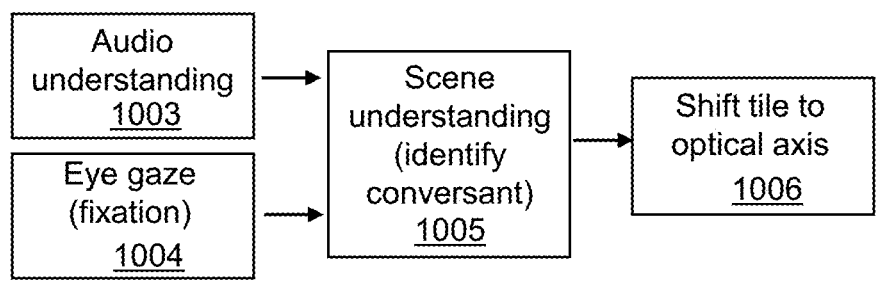
Figure 10D:
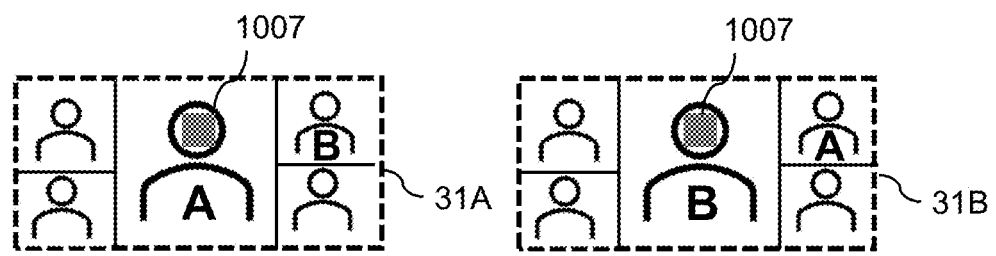

FIG. 10D shows an embodiment in which display 1 emits light into the display optics 301. Some of the light is directed to viewer 29, who sees a virtual image 37. At the same time, ambient light from the viewer enters the display optics 302. The ambient light, and potentially some stray light from the display is incident on a reflection removal module 303 that eliminates or minimizes the stray light, such that the camera captures the ambient light only. The camera and the virtual image are coaxial.

In some embodiments sensor 1002 records information about the viewer 29. The sensor may be an eye or head tracker. In some embodiments, it is an audio sensor, such as a microphone to listen to the viewer. Such sensors may be integrated into the camera itself. The audio and the eye gaze are input as information blocks, respectively an audio understanding block 1004 eye gaze block 1005 that is input into a scene understanding block. For example, in some embodiments, the eye gaze blocks detect the eye fixation of the viewer on the screen in a teleconferencing app. In some embodiments, the audio understanding detects when the viewer says of the teleconferencing app's other user's names. The teleconferencing app may display a virtual image with a set of tiles 31A, where other users of the app are being shown in each tile. In some embodiments one user A may be centered, and a second user B placed to the side. The centered user is coaxial with optic axis 1007 of the camera behind the display optics. The scene understanding block detects which another user the viewer is looking at or speaking to. For example, the viewer may be fixating on or saying the name "user B." The display content then shuffles the tile of user B to the central region of the display tiles 31B, such that user B is now centered with the optic axis 1007 of the camera. In this way, the software module executing the shuffling of these tiles keeps the viewer's current conversation partner centered with the camera such that the conversation parents will always experience the correct eye contact cues.

The eye gaze is detected by an eye tracking system. The eye tracking system captures images of the left and right eye, calculates the center of the pupils. With these coordinates estimated from the images, lines are extended from these coordinates into the images space where the viewer is gazing. The intersection of these two lines corresponds to the gaze position. When the system recognizes the gaze position, it compares that with the coordinates of the nearest tile of the screen and moves that tile to the center. In some embodiments, time delays between gaze tracking and tile shifting are used so that if a viewer's eyes momentarily stray from the tile, the tile is not shifted inadvertently.

In any of the embodiments above, the camera or secondary sensors may include gesture sensing abilities to capture a gesture or a motion of the viewer, such that the gesture or motion can cause a command to be executed in an accompanying computational algorithm. For example, in some embodiments, a gesture camera captures the content on the virtual imaging to which the viewer is pointing and rearranges the display content to bring that indicated content to the center or the display image or to the optic axis of the camera.

The underlying physical challenge is the reciprocity of light: for linear, time-invariant optical systems, light traveling from a source to a detector would follow an identical path, but just in the reverse direction, if the source and detector swapped positions.

Although the invention has been explained in relation to its preferred embodiments, it is to be understood that many other modifications and variations can be made without departing from the spirit and scope of the invention as hereinafter claimed.

In this document, various aspects may be described functionally. While exemplary algorithms may be provided, such functionality may be implemented in any suitable way. One of skill in the art may implement such functionality or algorithms, for example, in hardware, in software, or in a combination of hardware and software. A module (e.g., "computational module", "AI module") may comprise the hardware and/or software, to implement the functionality or algorithm disclosed. For example, in some embodiments an algorithm may be implemented through a module having one or more processors executing computer code stored on one or more non-transitory computer-readable storage media. In some embodiments, a functionality is implemented at least in part through a module having dedicated hardware (e.g., an ASIC, an FPGA). Some modules operate on light optically (e.g., reflection removal module) and may include, for example, optical components alone or optical components that may be controlled electronically. In some embodiments modules may share components. For example, a first function module and a second function module may both utilize a common processor (e.g., through time-share or multithreading) or have computer executable code stored on a common computer storage medium (e.g., at different memory locations).

In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. In some embodiments, the information may be used at least in part to configure hardware such as an FPGA. In some embodiments, an algorithm may be recorded as a software module. The capability may be implemented, for example, by reading the software module from a storage medium and executing it with one or more processors, or by reading the software module from a storage medium and using the information to configure hardware.

In this document, the terms "machine readable medium," "computer readable medium," and similar terms are used to refer to non-transitory mediums, volatile or non-volatile, that store data and/or instructions that cause a machine to operate in a specific fashion. Common forms of machine-readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skills in the art after reading this document, the illustrated embodiments and their various alternatives can be implemented without confinement to the illustrated examples. For example, block diagrams and their accompanying description should not be constructed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in several ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine, but deployed across a number of computational resources.

As used herein, the term "or" may be constructed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be constructed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A coaxial teleconferencing system comprising:
 a display to emit light corresponding to a display image;
 an optical subsystem including an aperture optic and a semi-reflector, the semi-reflector positioned to direct the light through the aperture optic;
 a reflection removal module to (i) transmit ambient light incident on the reflection removal module and to (ii) remove at least a portion of stray light incident on the reflection removal module, the stray light from the display and having an optical property; and
 an imaging sensor (i) to receive the ambient light transmitted through the reflection removal module and (ii) to generate a captured image from the received ambient light.

2. The coaxial teleconferencing system of claim 1, wherein the light corresponding to the display image travels along an optical path within the optical subsystem and exits the aperture optic to form a virtual image viewable from within a headbox, the virtual image having a monocular depth that is different from a distance between the headbox and the display.

3. The coaxial teleconferencing system of claim 2, wherein
 the optical subsystem further comprises a curved semi-reflector to lengthen the optical path of the light, and
 the light is incident on both the semi-reflector and the curved semi-reflector at least twice, thereby forming the virtual image.

4. The coaxial teleconferencing system of claim 1, wherein the captured image is an eye-contact image of a viewer.

5. The coaxial teleconferencing system of claim 1, wherein the reflection removal module comprises a polarizer, and the optical property is a polarization state of the stray light from the display.

6. The coaxial teleconferencing system of claim 5, wherein the polarizer has a curved surface.

7. The coaxial teleconferencing system of claim 5, wherein the reflection removal module further comprises a birefringent plate disposed on a light receiving side of the polarizer to modify the polarization state of the stray light from the display before the stray light is incident on the polarizer.

8. The coaxial teleconferencing system of claim 1, wherein the reflection removal module comprises a wavelength-dependent filter, and the optical property is a wavelength of the stray light from the display.

9. The coaxial teleconferencing system of claim 1, wherein the reflection removal module comprises a nonlinear material, and the optical property is an intensity of the stray light from the display.

10. The coaxial teleconferencing system of claim 1, further comprising a computational module to filter out the stray light from the display after it is received by the imaging sensor based on a temporal or spatial frequency of the display image.

11. The coaxial teleconferencing system of claim 1, further comprising a computational module that (i) receives the display image and computes an expected stray light on the imaging sensor and (ii) subtracts from the captured image the expected stray light.

12. The coaxial teleconferencing system of claim 1, further comprising a computational module that uses a neural network to computationally remove stray light from the captured image.

13. The coaxial teleconferencing system of claim 1, wherein the imaging sensor is part of a camera, and the reflection removal module is disposed between a lens group of the camera and the imaging sensor.

14. The coaxial teleconferencing system of claim 1, configured for teleconferencing, education, or simulation training applications, and the display image is updated to include at least a part of the captured image.

15. The coaxial teleconferencing system of claim 1, wherein the polarizer is an absorptive polarizer, and the reflection removal module further comprises a reflective polarizer disposed after the absorptive polarizer, both the absorptive polarizer and the reflective polarizer having a curved shape and having parallel pass angles.

16. The virtual teleconferencing system of claim 1, wherein the captured image is an image of a viewer.

17. The virtual teleconferencing system of claim 16, further comprising a network connection to receive a video stream, the light emitted by the display corresponding to the video stream, and the virtual teleconferencing system is for teleconferencing, education, or simulation training applications, the video stream including the captured image.

18. The virtual teleconferencing system of claim 16, wherein a monocular depth of the virtual image is different from a distance between the viewer and the display.

19. A virtual teleconferencing system comprising:
 a display to emit light;
 an optical subsystem including a semi-reflector and a reflector to direct the light along a path within the optical subsystem to produce a virtual image, the light incident on the semi-reflector at least twice; and
 an imaging sensor to receive ambient light, the ambient light being directed to the imaging sensor by the semi-reflector, thereby forming a captured image.

20. The virtual teleconferencing system of claim 19, wherein the reflector has a curved shape.

21. The virtual teleconferencing system of claim 19, wherein the semi-reflector is polarization dependent.

22. The virtual teleconferencing system of claim 19, wherein the reflector includes a primary reflector and a secondary reflector, the secondary reflector controlled by a mechanical actuator, and the imaging sensor is disposed behind the secondary reflector.

23. The virtual teleconferencing system of claim 19, further comprising a reflection removal module between the semi-reflector and the imaging sensor to remove at least a portion of stray light from the display before being captured by the imaging sensor.

24. The virtual teleconferencing system of claim 23, wherein the reflection removal module comprises a polarizer.

25. The virtual teleconferencing system of claim 24, wherein the reflection removal module further comprises a birefringent plate to modify a polarization state of the stray light before being incident on the polarizer.

26. An immersive tele-video system comprising:
a display emitting light corresponding to a display image;
an optical subsystem including an aperture optic and a semi-reflector, the semi-reflector positioned to direct the light through the aperture optic;
a plurality of imaging sensors to capture ambient light, wherein the ambient light and stray light from the display enter the optical subsystem and are directed by the optical subsystem to the plurality of imaging sensors; and
a computational reflection removal module to receive information from the plurality of imaging sensors and output a computed image of the ambient light.

27. The immersive tele-video system of claim 26, wherein each plurality of imaging sensors comprises a polarizer and a camera, each polarizer being oriented with a different transmission axis, and the computational reflection removal module uses polarization diversity to remove stray light.

28. The immersive tele-video system of claim 26, wherein each imaging sensor of the plurality of imaging sensors is part of a camera, and the computational reflection removal module renders a perspective image of the viewer based on a capture image from each camera.

29. The immersive tele-video system of claim 26, further comprising:
a network connection to receive a video stream, the light emitted by the display corresponding to the video stream; and
an eye tracking system to modify the display image based on an eye gaze of the viewer,
wherein the immersive tele-video system is for a teleconferencing application.

30. The immersive tele-video system of claim 26, wherein one of the plurality of imaging sensors is part of an infrared (IR) camera.

31. The immersive tele-video system of claim 26, wherein a first imaging sensor of the plurality of imaging sensors is a depth camera and a second imaging sensor of the plurality of imaging sensors is a color camera.

32. The immersive tele-video system of claim 26, wherein the ambient light includes information about a viewer, and the computed image is an eye-contact image of the viewer.

33. The immersive tele-video system of claim 26, wherein the light corresponding to the display image travels along an optical path within the optical subsystem and exits the aperture optic to a viewer, thereby forming a virtual image, the virtual image having a monocular depth that is different from a distance between the viewer and the display.

* * * * *